United States Patent [19]
Yoshida et al.

[11] Patent Number: 5,815,289
[45] Date of Patent: *Sep. 29, 1998

[54] FACSIMILE APPARATUS

[75] Inventors: Takehiro Yoshida, Tokyo; Naoki Sugawara, Yokohama; Tatsushi Tsugawa, Kawasaki, all of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 535,813

[22] Filed: Sep. 28, 1995

Related U.S. Application Data

[63] Continuation of Ser. No. 194,142, Feb. 8, 1994, abandoned.

[30] Foreign Application Priority Data

Feb. 9, 1993 [JP] Japan .................................. 5-044686
Apr. 30, 1993 [JP] Japan .................................. 5-128122

[51] Int. Cl.$^6$ .................................................. H04N 1/32
[52] U.S. Cl. .......................... 358/468; 358/474; 355/24; 399/364; 399/374
[58] Field of Search .................................. 358/400, 474, 358/435, 436, 440, 439, 438, 433, 404, 444, 468, 296, 302; 355/24, 23, 26, 18; 399/374, 363, 364; H04N 1/32

[56] References Cited

U.S. PATENT DOCUMENTS

| | | | |
|---|---|---|---|
| 4,499,500 | 2/1985 | Nagashima | 358/296 |
| 4,763,167 | 8/1988 | Watanabe et al. | 355/14 R |
| 4,806,979 | 2/1989 | Tokoro et al. | 355/14 |
| 4,814,798 | 3/1989 | Fukae et al. | 346/160 |
| 4,814,894 | 3/1989 | Yoshida | 358/298 |
| 4,815,121 | 3/1989 | Yoshida | 379/67 |
| 4,821,107 | 4/1989 | Naito et al. | 358/440 |
| 4,823,375 | 4/1989 | Yoshida | 379/100 |
| 4,829,524 | 5/1989 | Yoshida | 371/32 |
| 4,849,816 | 7/1989 | Yoshida | 358/434 |
| 4,853,740 | 8/1989 | Ushio et al. | 355/319 |
| 4,894,843 | 1/1990 | Yoshida et al. | 375/8 |
| 4,908,719 | 3/1990 | Nonoyama | 358/401 |
| 4,949,189 | 8/1990 | Ohmori | 355/23 |
| 4,990,941 | 2/1991 | Kawai | 399/374 |
| 4,990,965 | 2/1991 | Kiya | 355/319 |
| 5,007,003 | 4/1991 | Suzuki et al. | 364/519 |
| 5,020,096 | 5/1991 | Sakakibara et al. | 379/100 |
| 5,022,072 | 6/1991 | Sakakibara et al. | 379/100 |
| 5,031,179 | 7/1991 | Yoshida et al. | 371/32 |
| 5,075,783 | 12/1991 | Yoshida et al. | 358/439 |
| 5,093,857 | 3/1992 | Yoshida et al. | 379/100 |
| 5,095,371 | 3/1992 | Tanaka et al. | 358/300 |
| 5,157,521 | 10/1992 | Chung | 358/498 |
| 5,172,246 | 12/1992 | Yoshida | 358/406 |
| 5,208,681 | 5/1993 | Yoshida | 358/404 |
| 5,210,621 | 5/1993 | Kinoshita | 358/440 |
| 5,220,439 | 6/1993 | Yoshida | 358/404 |
| 5,227,894 | 7/1993 | Yoshida | 358/441 |
| 5,247,370 | 9/1993 | Takaoka | 358/440 |
| 5,267,052 | 11/1993 | Bannai et al. | 358/444 |
| 5,282,050 | 1/1994 | Ishizuka et al. | 358/400 |
| 5,689,792 | 11/1997 | Acquauiua et al. | 399/374 |

*Primary Examiner*—Edward L. Coles
*Assistant Examiner*—Madeleine A. Nguyen
*Attorney, Agent, or Firm*—Fitzpatrick, Cella, Harper & Scinto

[57] ABSTRACT

There is disclosed a facsimile apparatus comprising a reading circuit for reading an image of an original, a shift arrangement for shifting a position of the image read by the reading circuit, and a transmitting arrangement for transmitting to another facsimile apparatus the image read by the reading circuit. The facsimile apparatus further comprises a control circuit for use in selecting which one is transmitted, the image shifted by the shifting arrangement or the image not being shifted, depending on whether one side of the original is read by the reading circuit or both sides thereof is read by the reading circuit, and depending on whether the another facsimile apparatus performs one side recording or perfect recording.

20 Claims, 68 Drawing Sheets

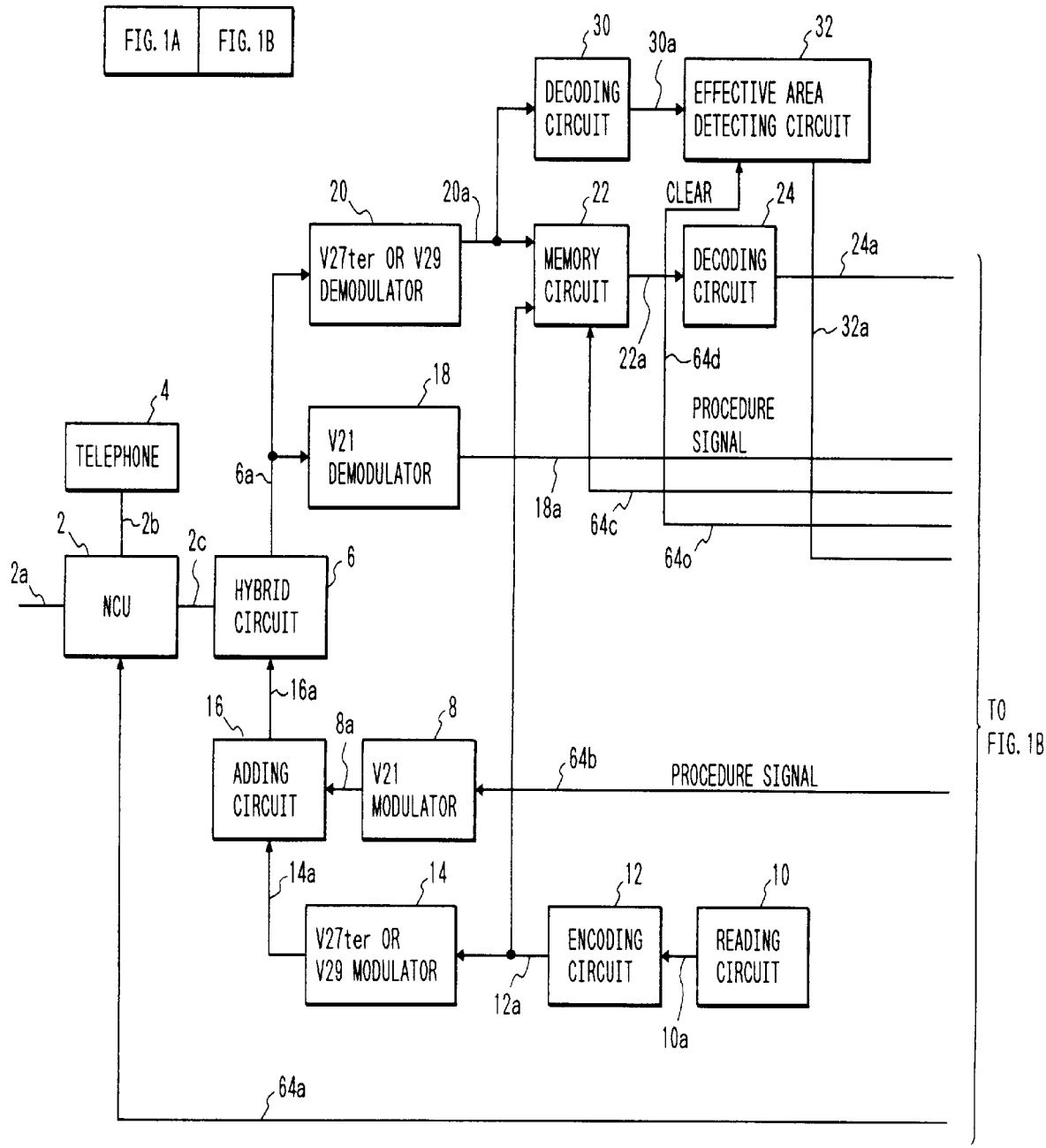

IN SUBSCANNING DIRECTION,
RECORD RECEPTION INFORMATION OF FIRST LINE FROM LEADING END BY 1mm OF RECORDING PAPER SET 1mm NON-PRINTING AREA AT TRAILING END

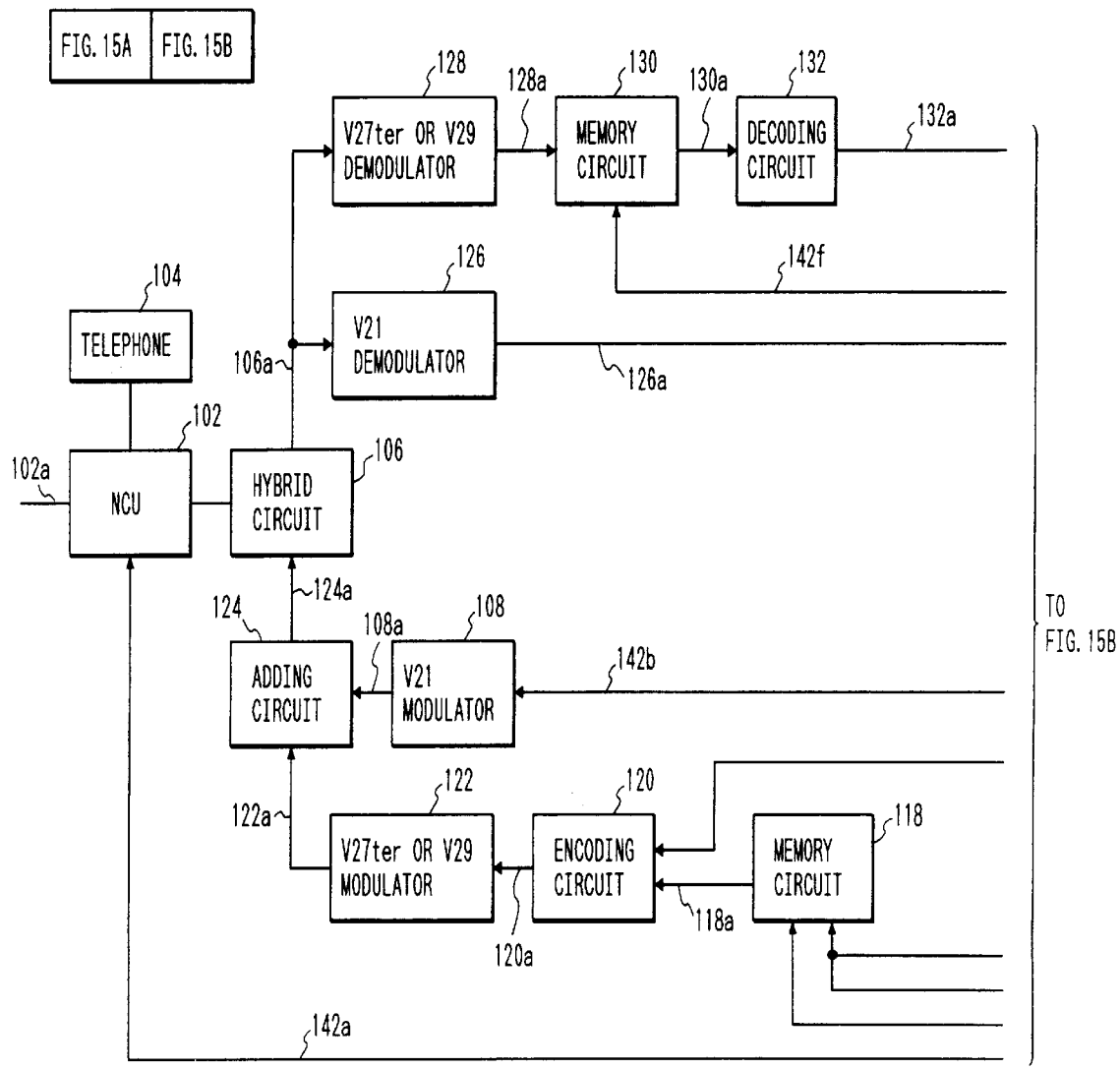

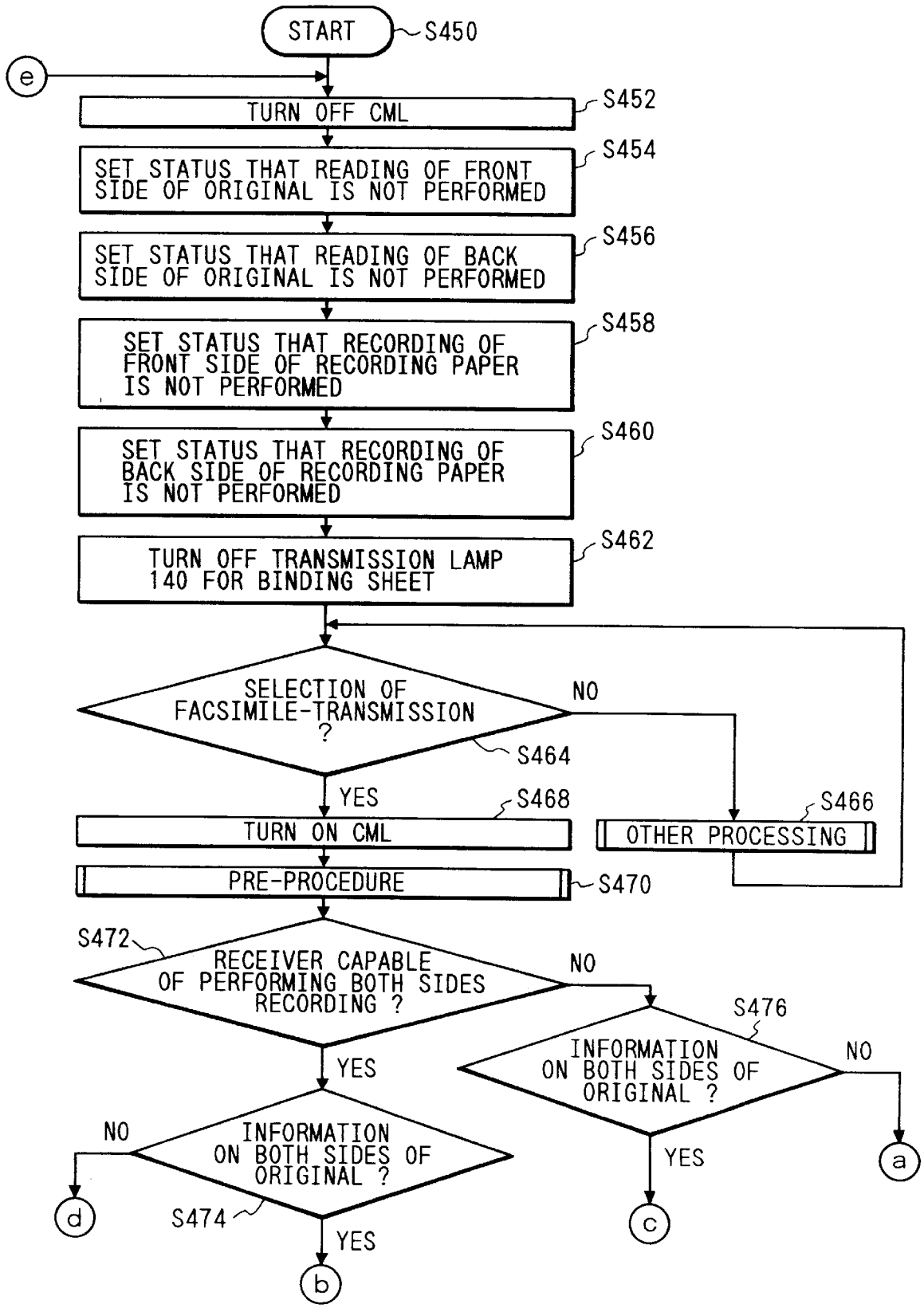

FIG. 20
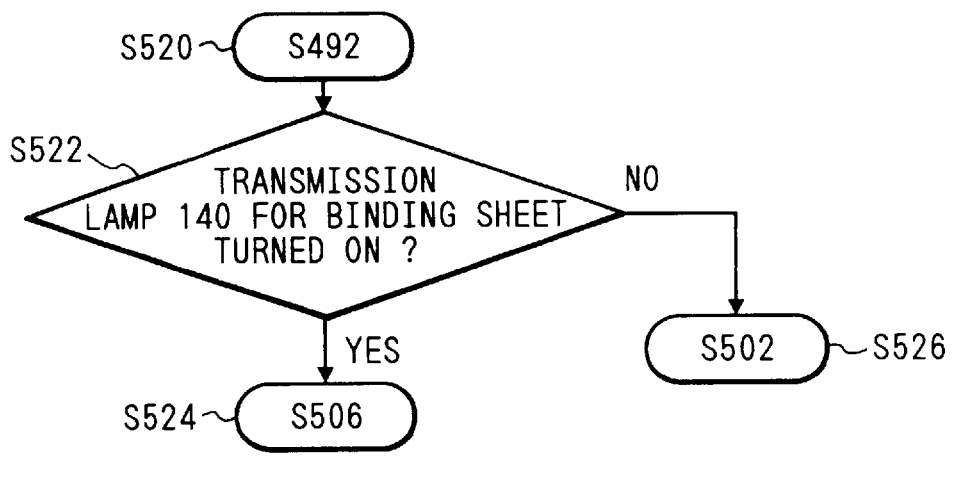
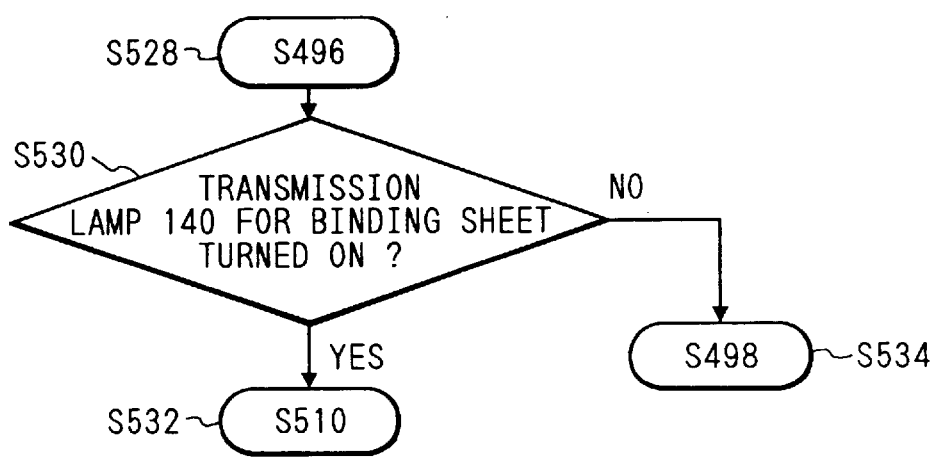

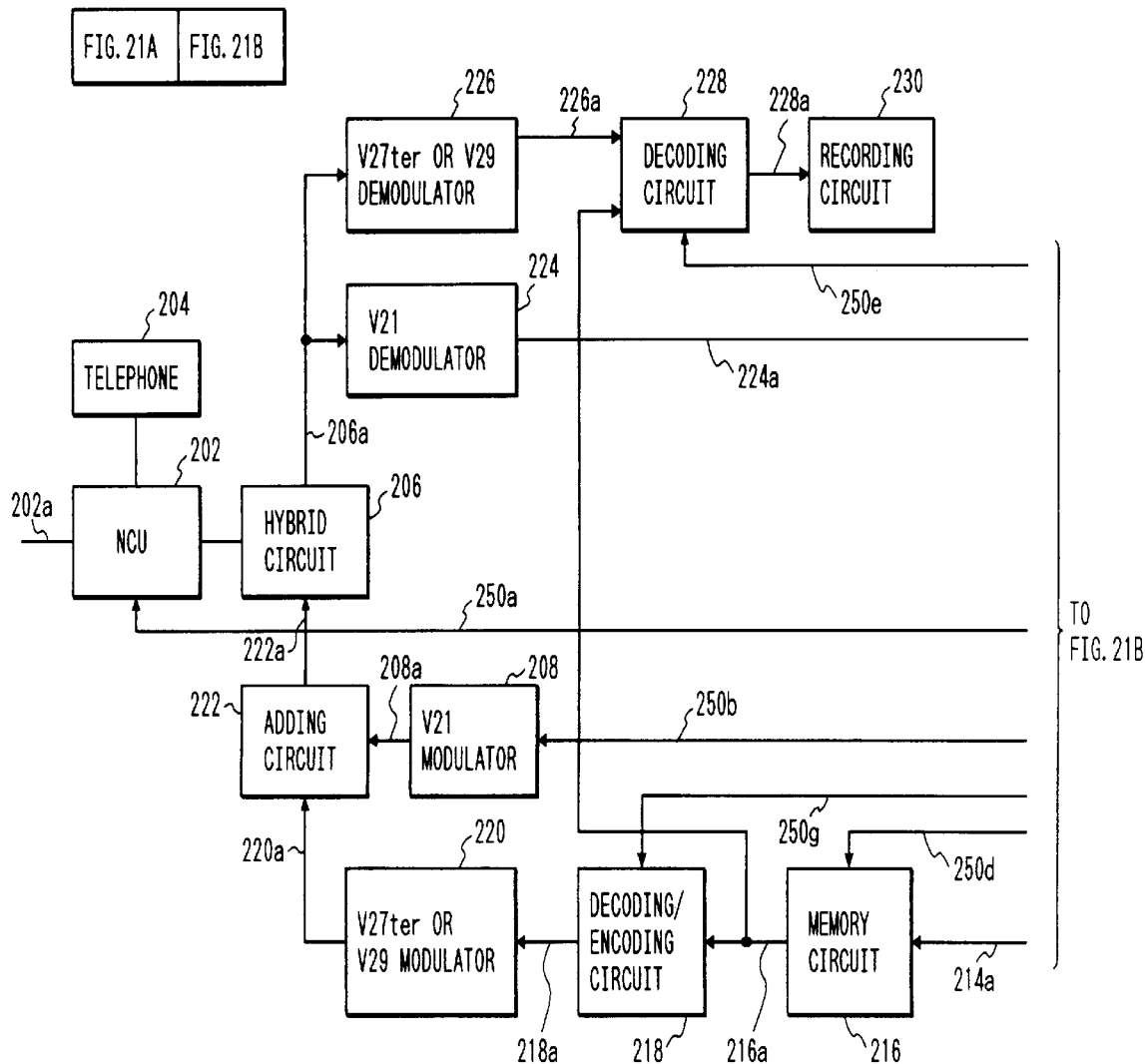

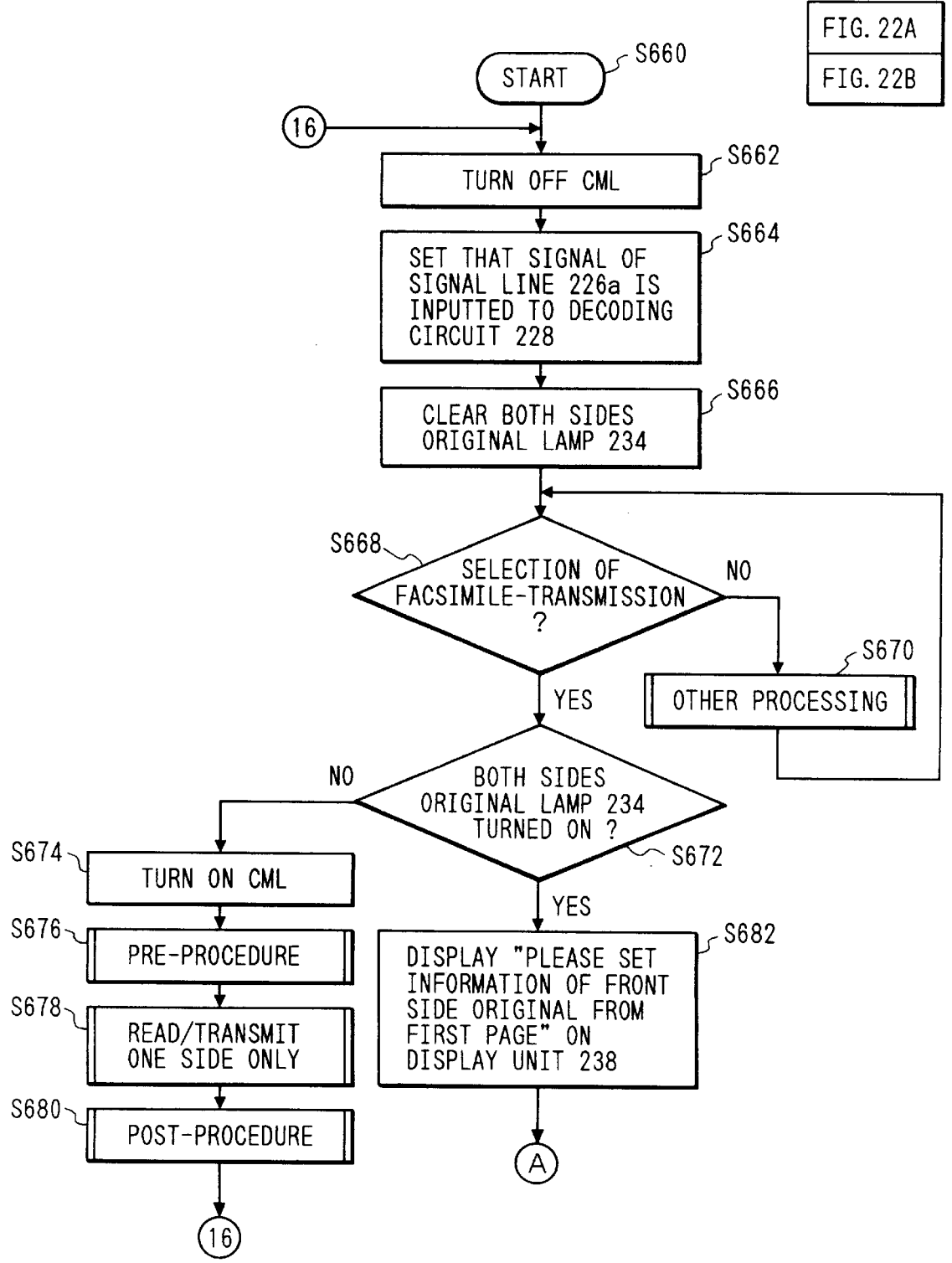

FIG. 26

INSTEAD OF S746

TRANSMIT PAGE INFORMATION OF TRANSMISSION FRONT SIDE COUNTER FROM MEMORY CIRCUIT 216
SET THAT TRANSMISSION FRONT SIDE COUNTER VALUE, FOLLOWED BY FRONT SIDE ARE ADDED TO PAGE NUMBER OF TRANSMISSION SIDE INFORMATION ⟵ S770

INSTEAD OF S754

TRANSMIT PAGE INFORMATION OF TRANSMISSION BACK SIDE COUNTER FROM MEMORY CIRCUIT 216
SET THAT TRANSMISSION FRONT SIDE COUNTER VALUE, FOLLOWED BY BACK SIDE ARE ADDED TO PAGE NUMBER OF TRANSMISSION SIDE INFORMATION ⟵ S772

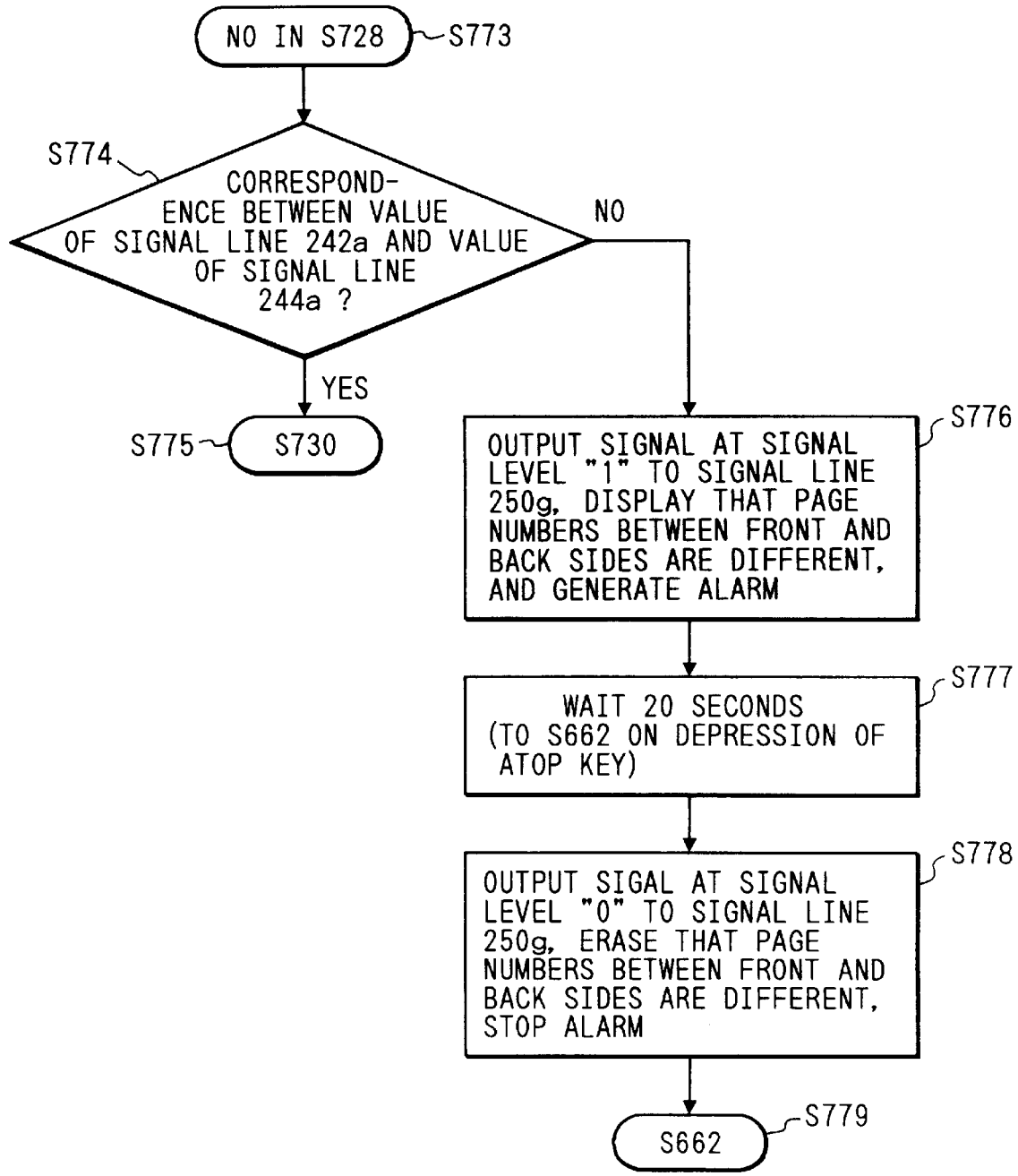

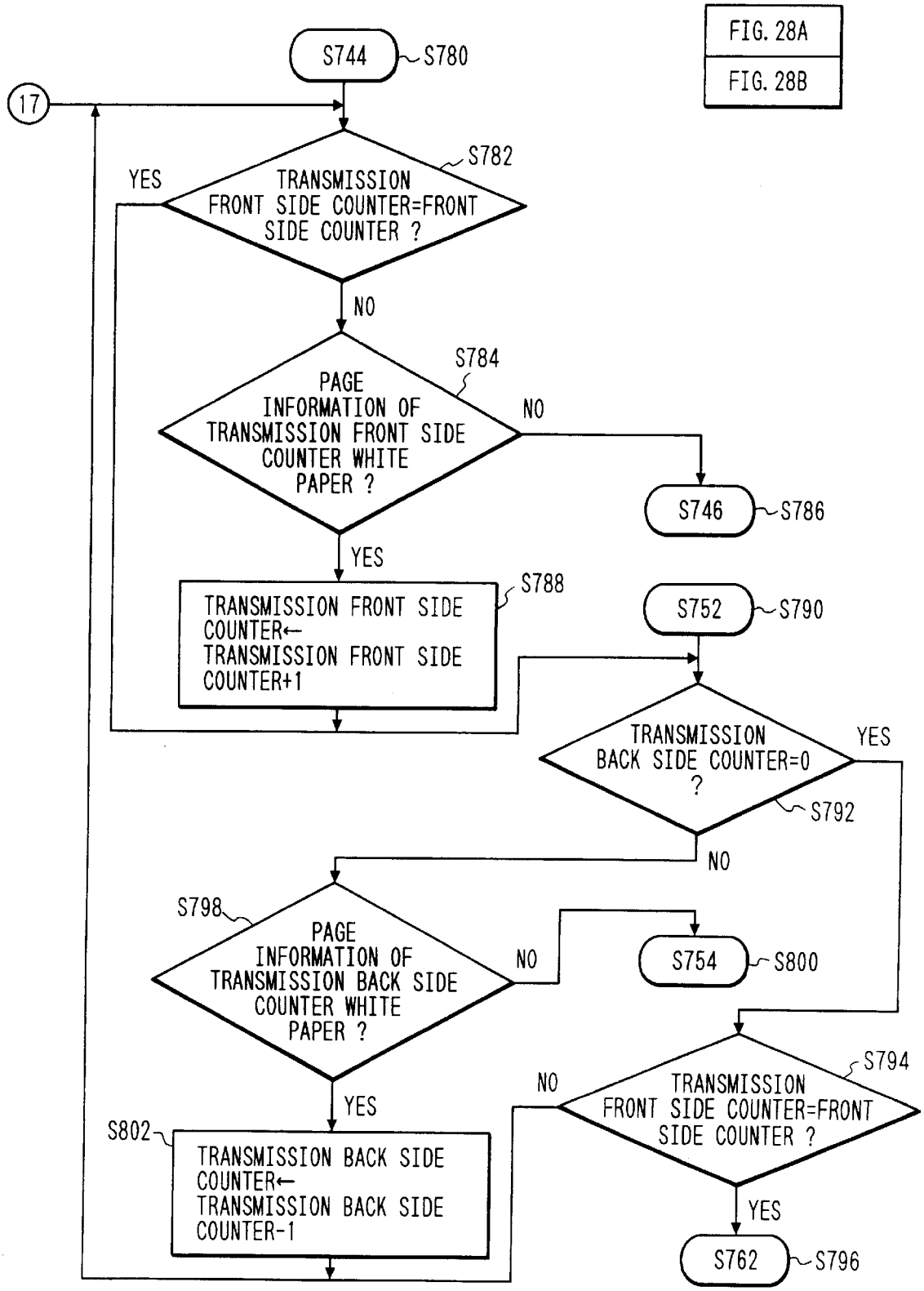

FIG. 39

| FIRST PAGE IMAGE DATA |
| THIRD PAGE IMAGE DATA |
| FIFTH PAGE IMAGE DATA |
| SECOND PAGE IMAGE DATA |
| FOURTH PAGE IMAGE DATA |
| SIXTH PAGE IMAGE DATA |

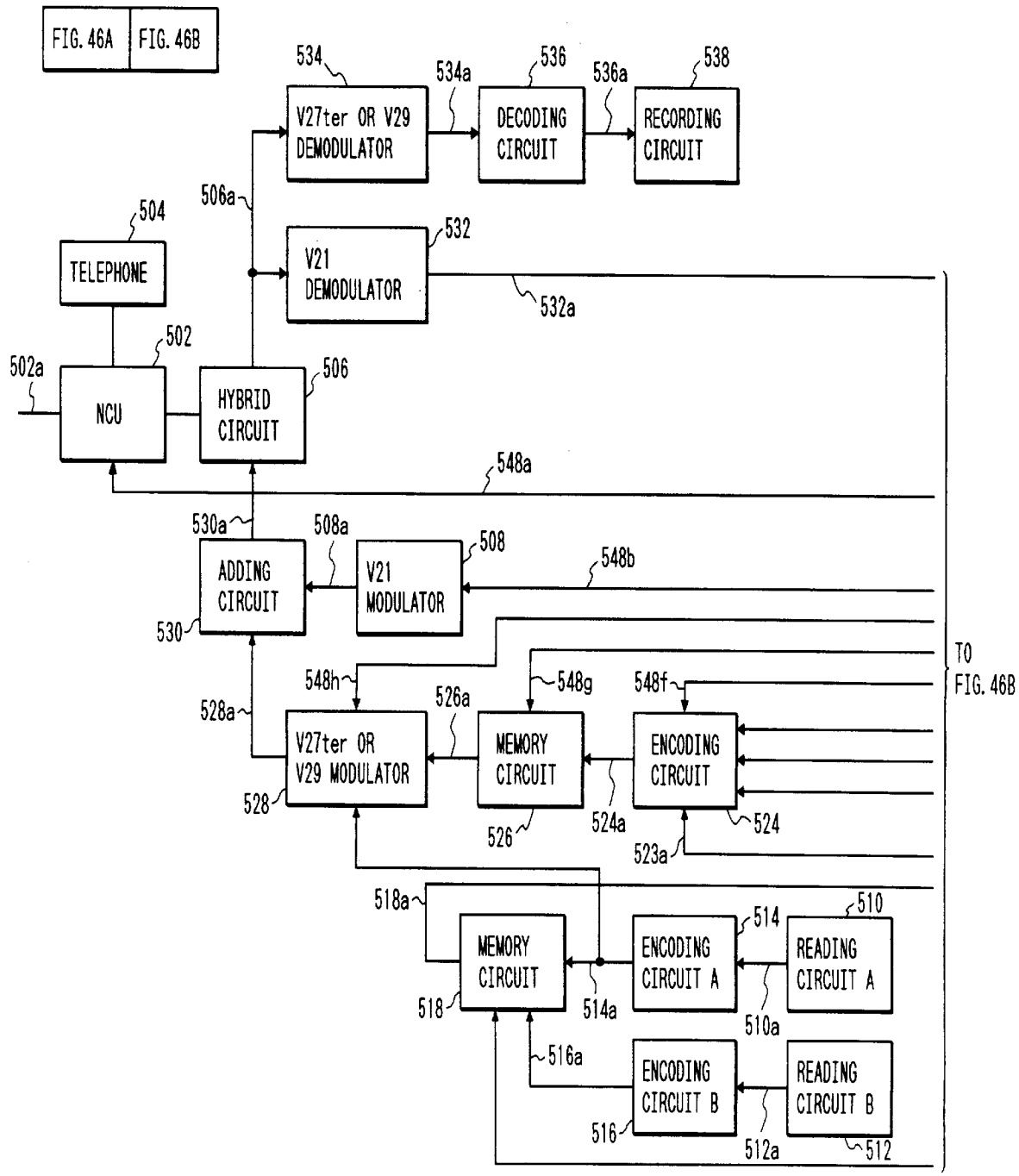

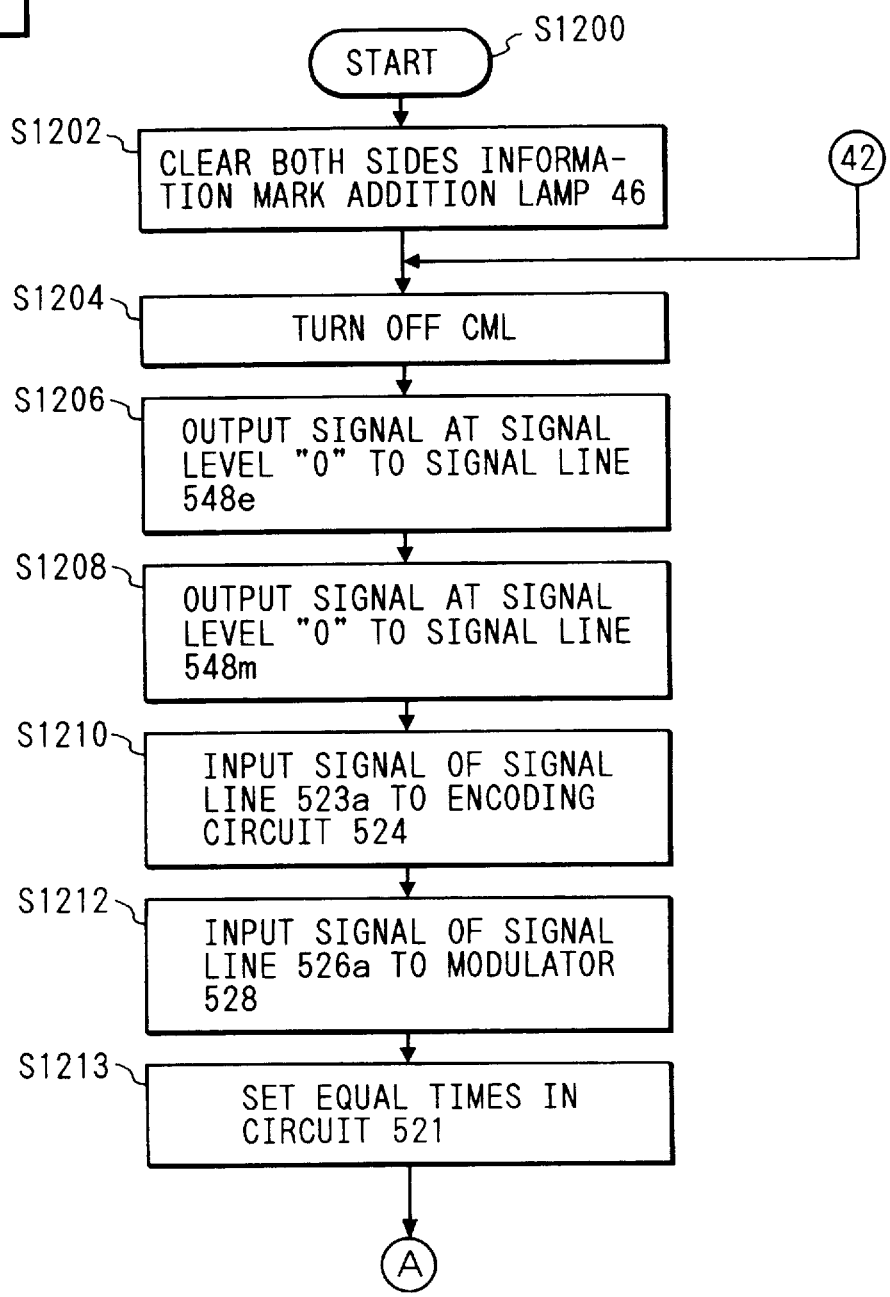

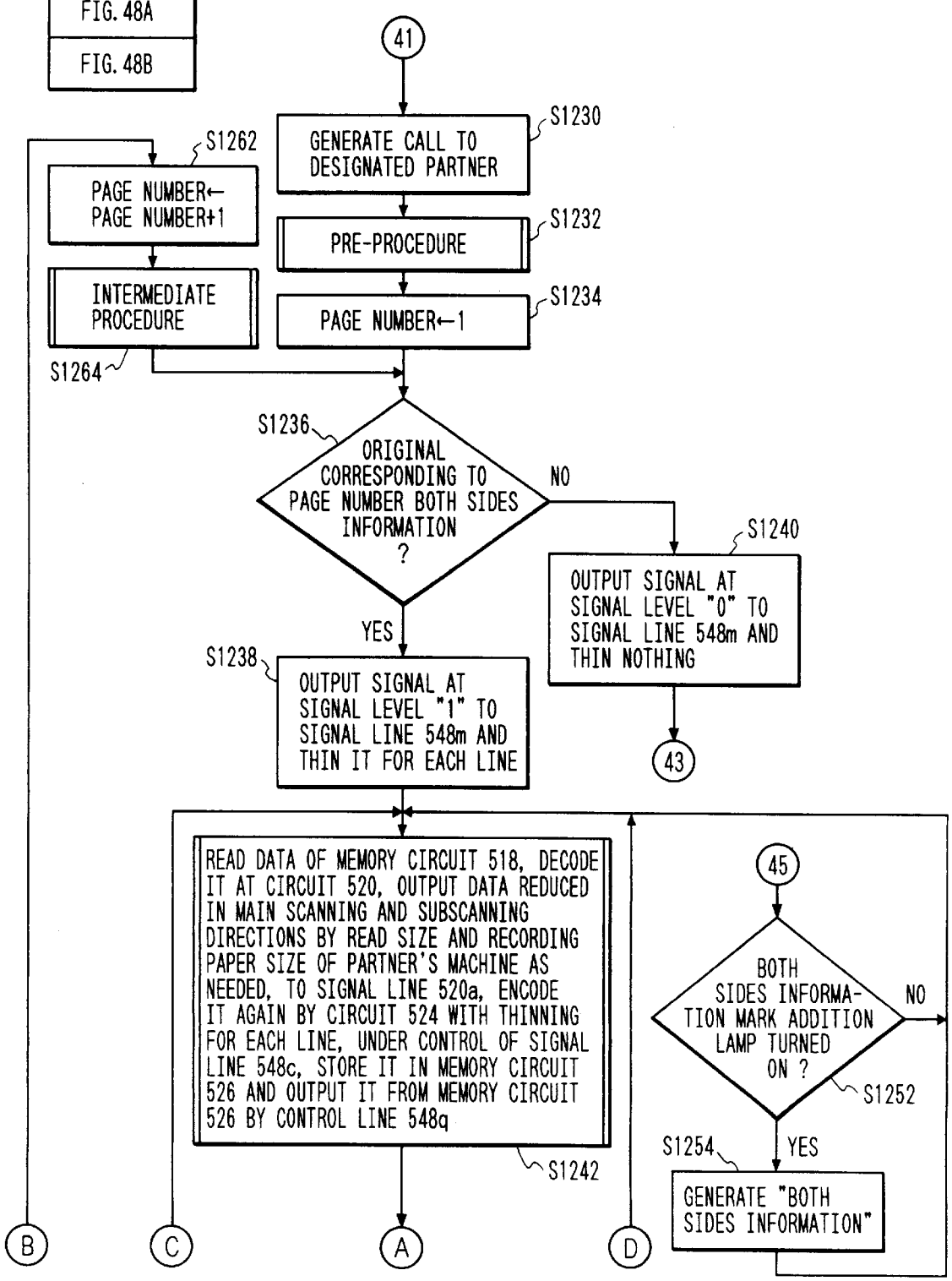

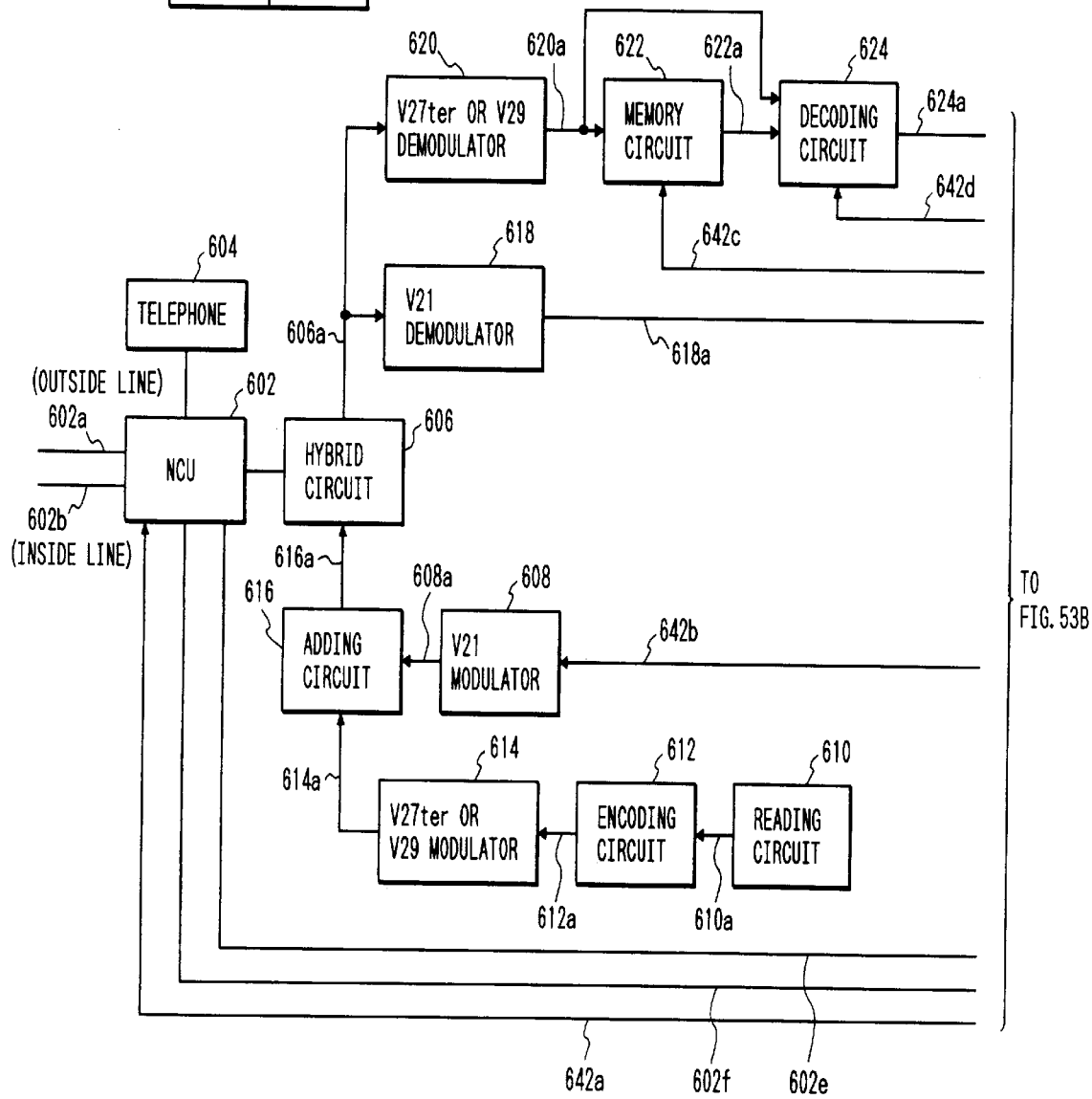

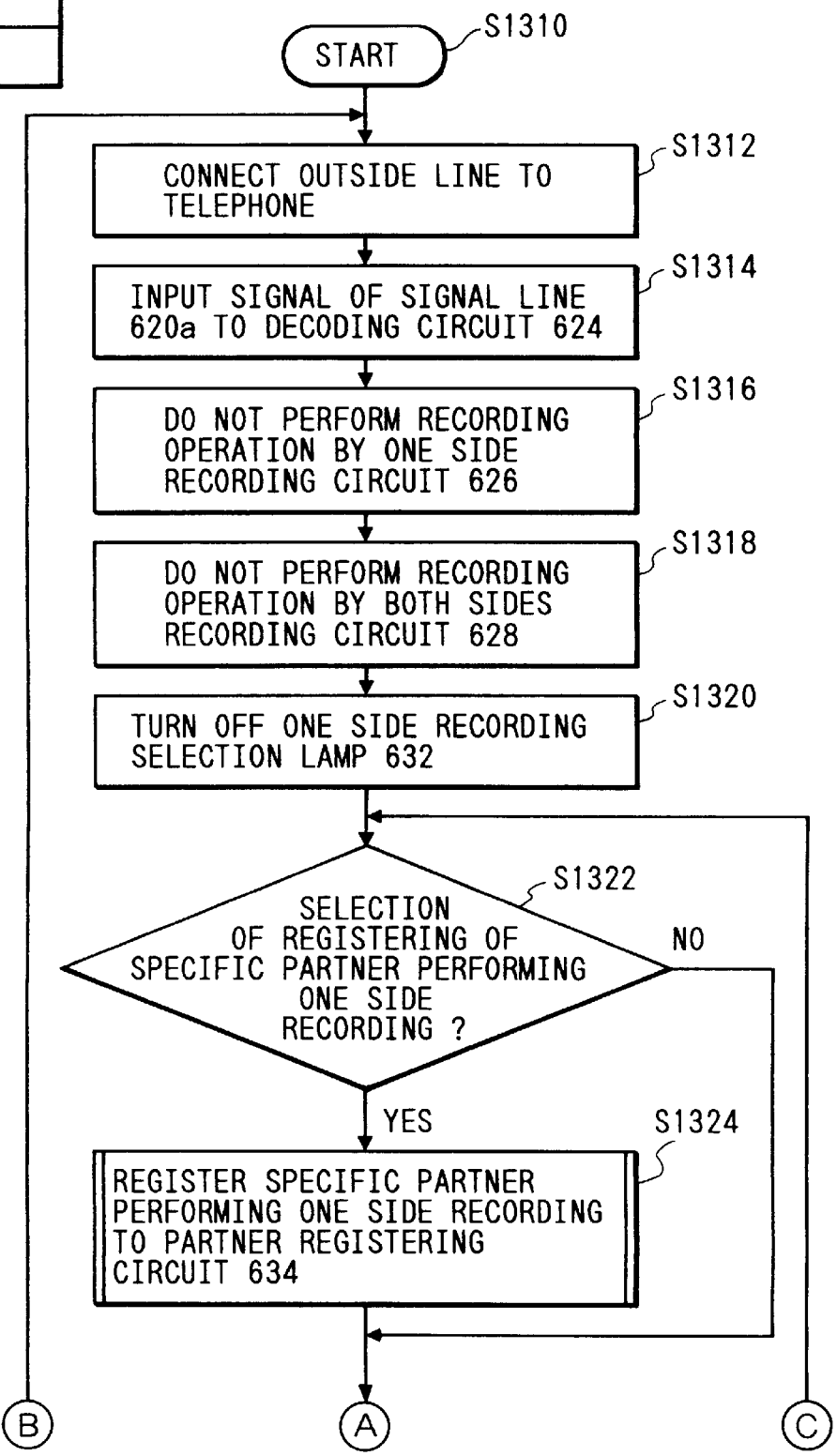

FACSIMILE APPARATUS

This application is a continuation of application Ser. No. 08/194,142, filed Feb. 8, 1994 now abandoned.

BACKGROUND OF THE INVENTION

1. Field of the Invention

This invention relates to a facsimile apparatus that records received information or read information and files papers with recorded output printed thereon.

The present invention also relates to a facsimile apparatus that is capable of reading an original with perfect printing and recording the content of the original on both sides of paper.

2. Related Background Art

In a conventional facsimile apparatus predetermined area of received information or read information is recorded as it is on a recording paper.

More recently, some facsimile apparatuses are directed to record information on a cut paper (recording paper of a standard size). Since the cut paper is a plain paper rather than a thermal recording paper, no copying of the received information with a copying machine is required and it is thus favorable by the reserving considerations. Accordingly, it is preferable that the information printed on the plain paper is filed as it is.

However, in the conventional facsimile apparatuses, a predetermined area of the received information or the read information is recorded as it is. This means that there is less or no space including no valid information on the left side of the paper. In other words, there is little space left without printing on it. To punch the left side of the recording paper for filing may results in loss of information.

In addition, the typical conventional facsimile apparatuses read one side of an original to transmit the information contained therein, and records the received information on one side of the recording paper.

Accordingly, it is necessary to read and transmit the information by one side, requiring twice operation to transmit whole information printed on the both sides of the original. Such twice operation may be acceptable but there is a disadvantage as well that the originals are not transmitted in the order of pages, i.e., the odd pages are transmitted first and the even pages follow or vice verse. Further, there is another disadvantage that the transmitted information is recorded on one side on the paper at the destined receiving device regardless that the original is perfect printing or one-side printing. Therefore, it is impossible to reproduce the information in the form as the same as the original at the transmitting side at the receiving side (that is, to record the perfect printing as the perfect output and record the one-side printing as the one-side output).

SUMMARY OF THE INVENTION

Accordingly, an object of the present invention is to provide a facsimile apparatus capable of overcoming the above mentioned problems.

Another object of the present invention is to provide a facsimile apparatus which allows filing of the received information or the read information printed on a plain paper without loosing information at the binding margin.

Yet another object of the present invention is to provide a facsimile apparatus which allows proper dealing at transmitting and receiving sides with a perfect original or an original with information printed on both sides thereof.

These and other objects and features of the present invention will become more fully apparent from the following description and appended claims taken in conjunction with the accompanying drawings.

BRIEF DESCRIPTION OF THE DRAWINGS

FIG. 16 is a flow chart illustrating operation of the second embodiment;

FIG. 20 is a flow chart illustrating a first modification of the second embodiment;

FIG. 26 is a flow chart illustrating operation of a first modification of the third embodiment;

FIG. 27 is a flow chart illustrating operation of a second modification of the third embodiment;

FIG. 39 is a view for use in describing a state of storage of transmitted data in a memory according to the fifth embodiment;

DETAILED DESCRIPTION OF THE PREFERRED EMBODIMENTS

Figure 1B:
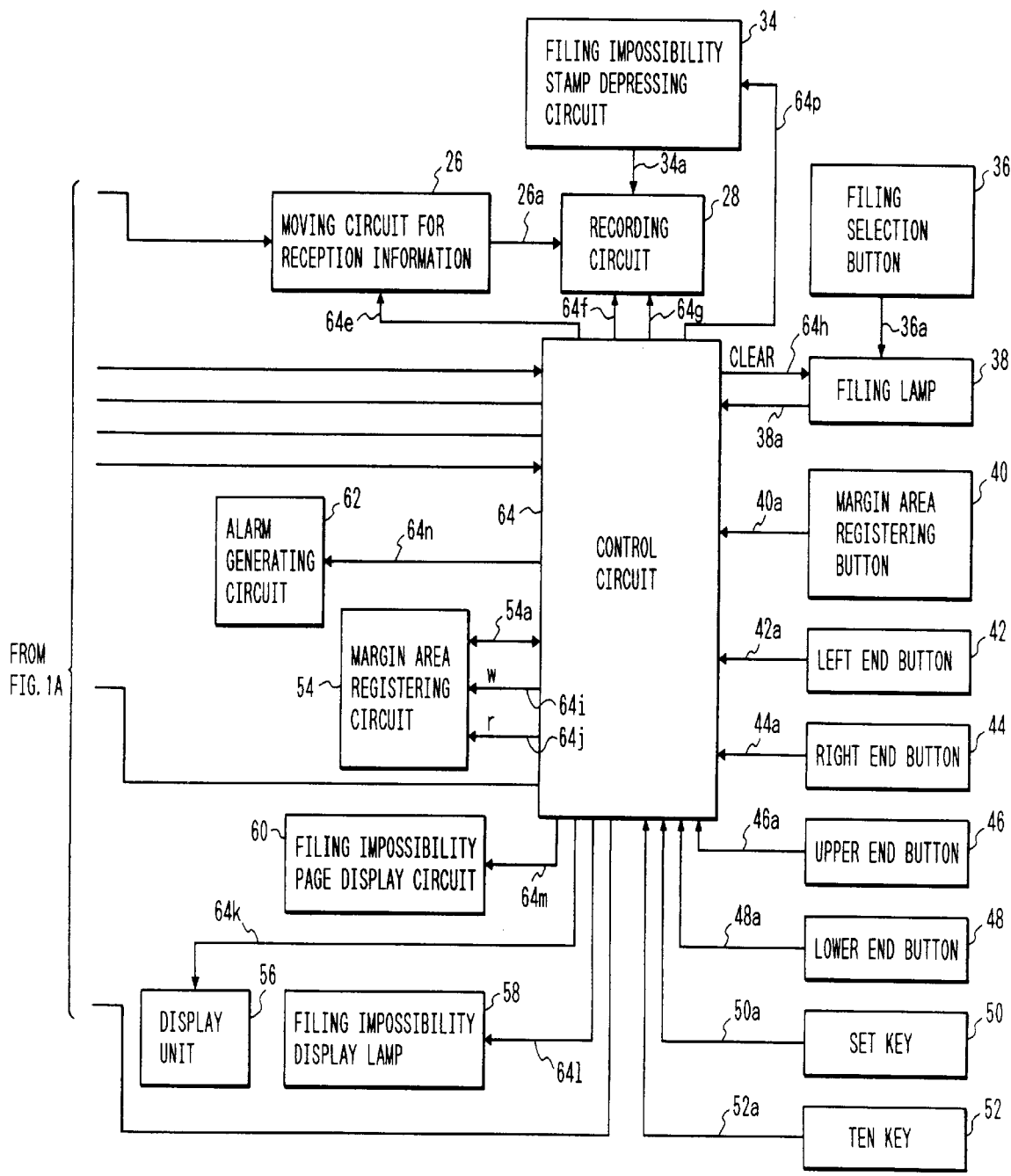
FIG. 1, comprised of FIGS. 1A and 1B, is a block diagram showing a first embodiment of the present invention.
Figure 2:
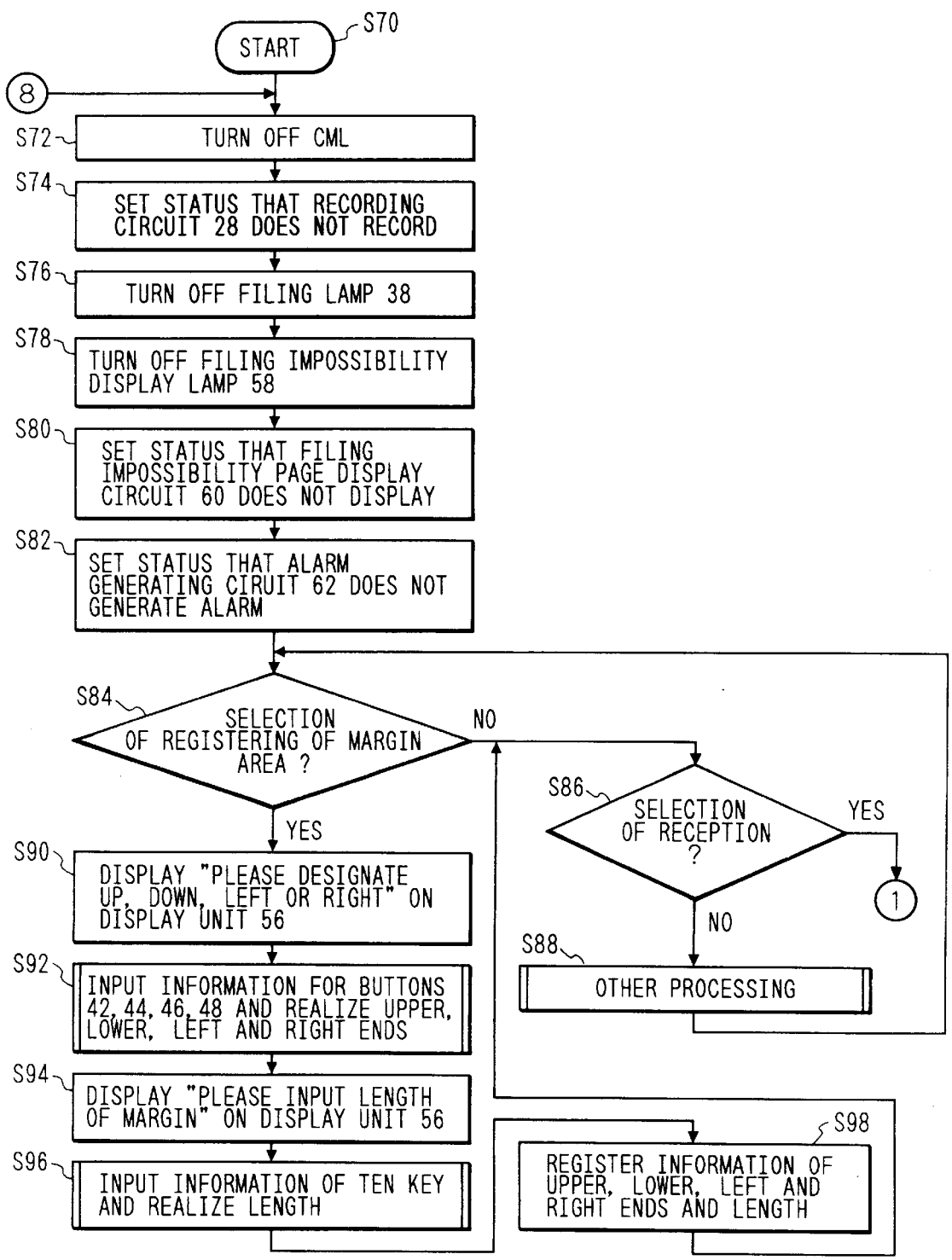
FIG. 2 is a flow chart illustrating operation of the first embodiment.
Figure 3:
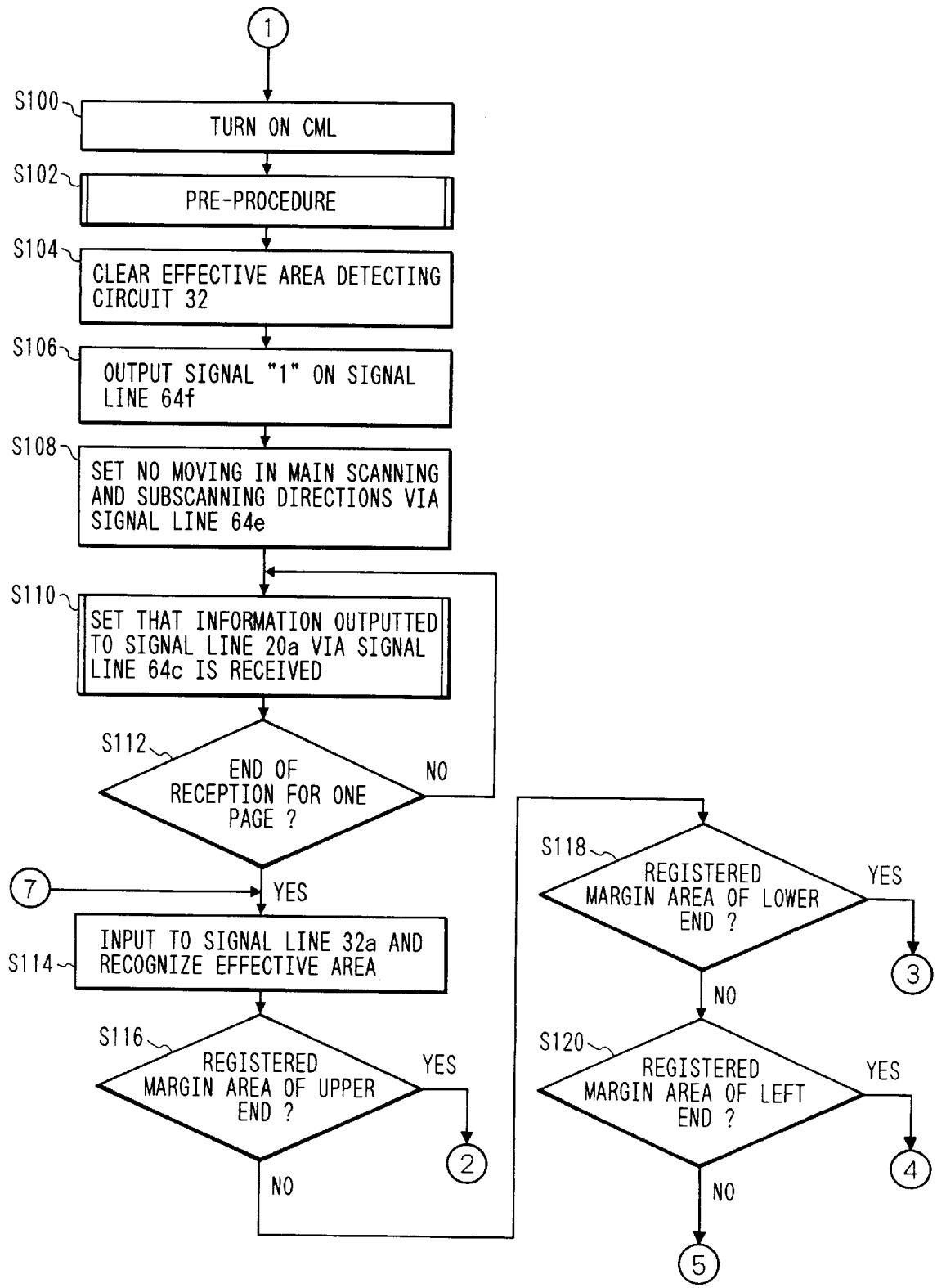
FIG. 3 is a flow chart illustrating operation of the first embodiment.
Figure 4:
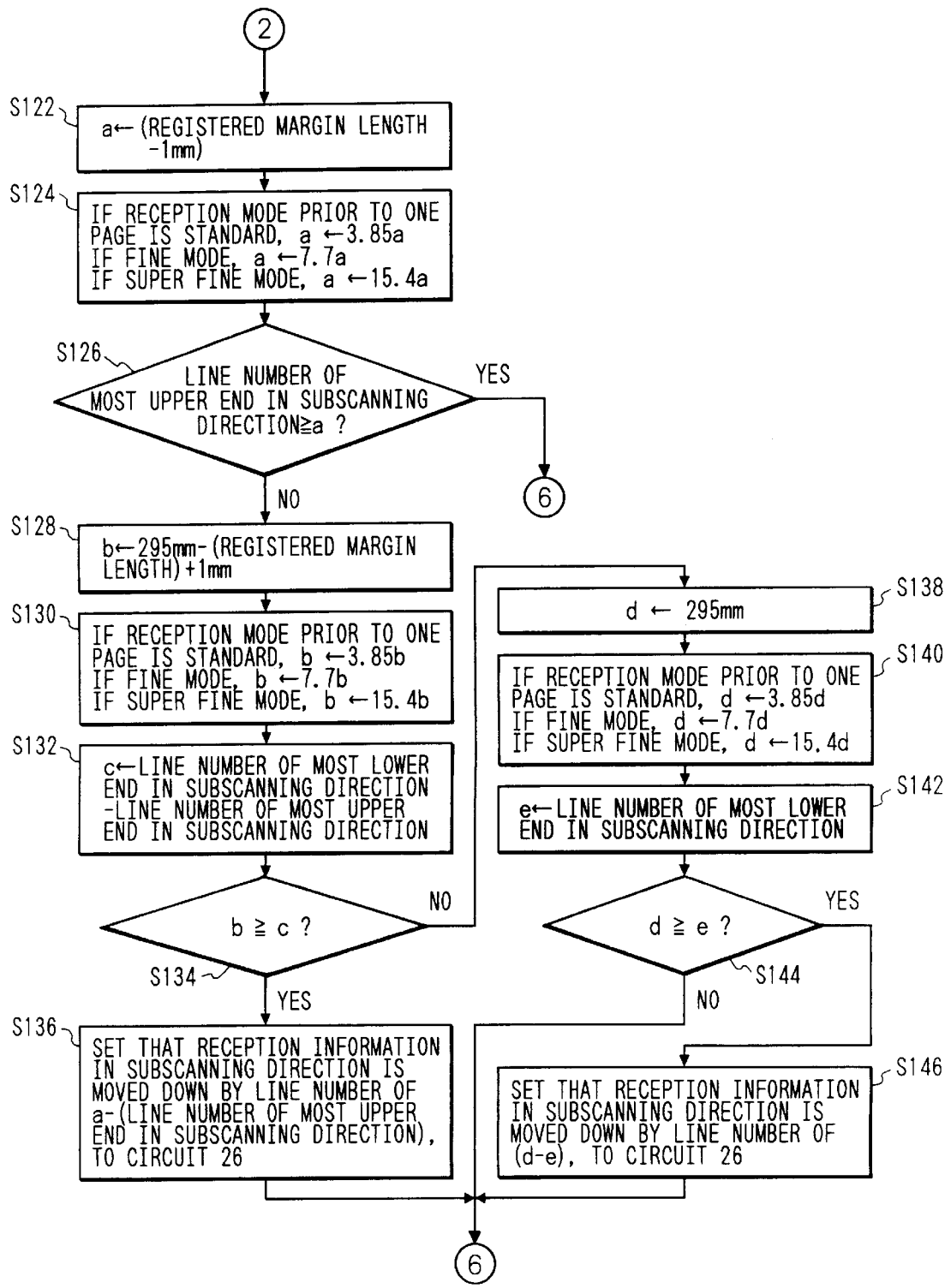
FIG. 4 is a flow chart illustrating operation of the first embodiment.
Figure 5:
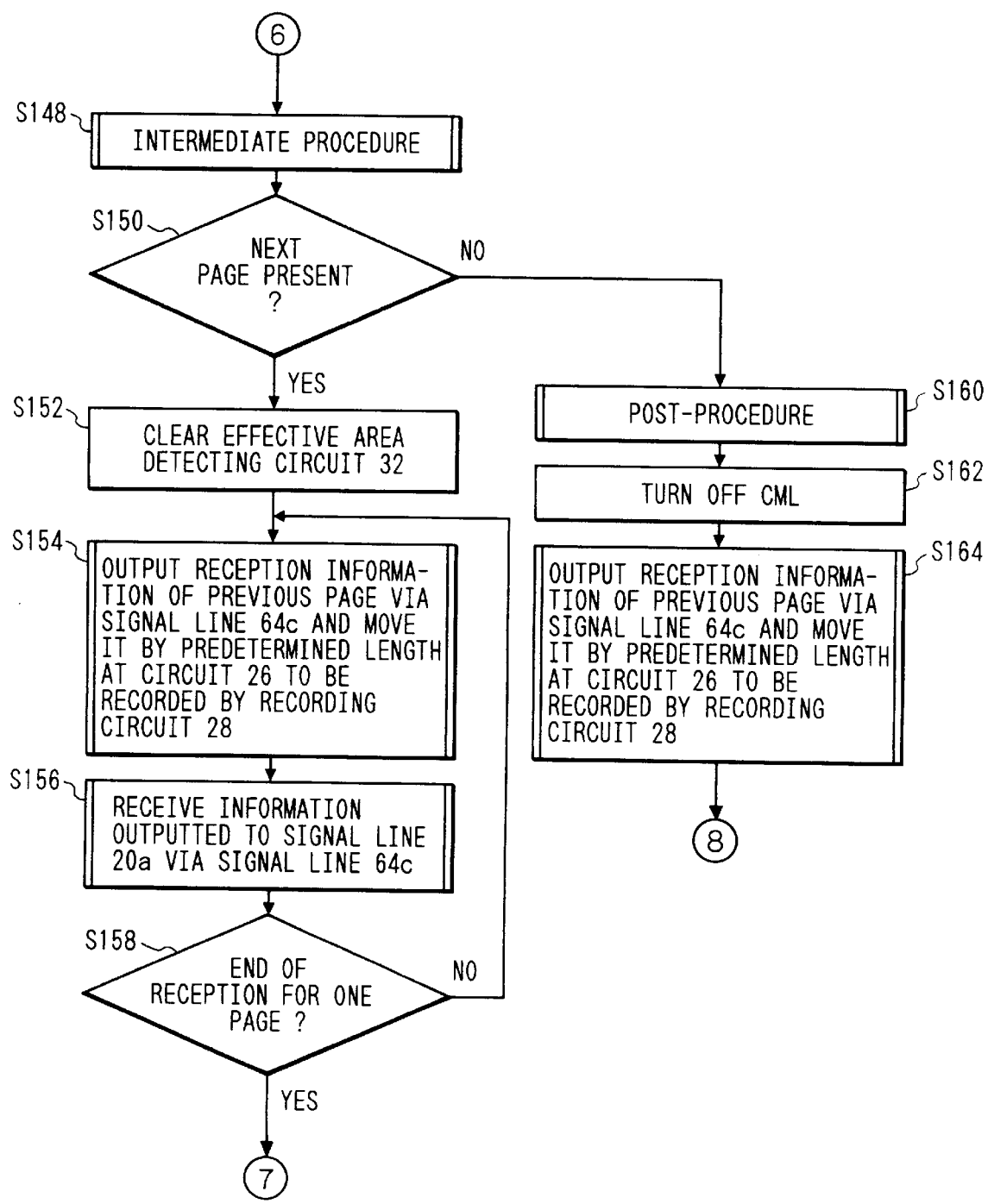
FIG. 5 is a flow chart illustrating operation of the first embodiment.
Figure 6:
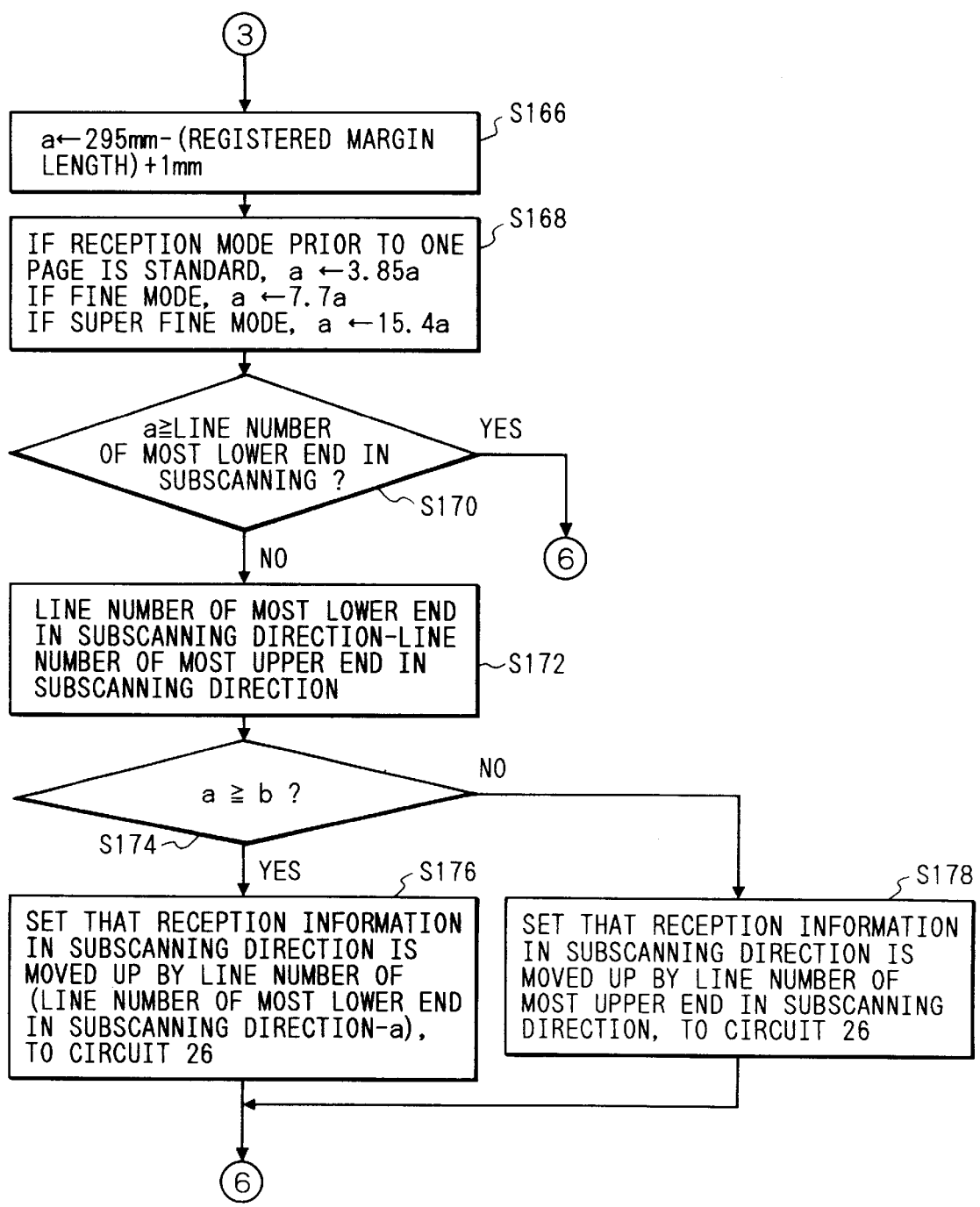
FIG. 6 is a flow chart illustrating operation of the first embodiment.
Figure 7:
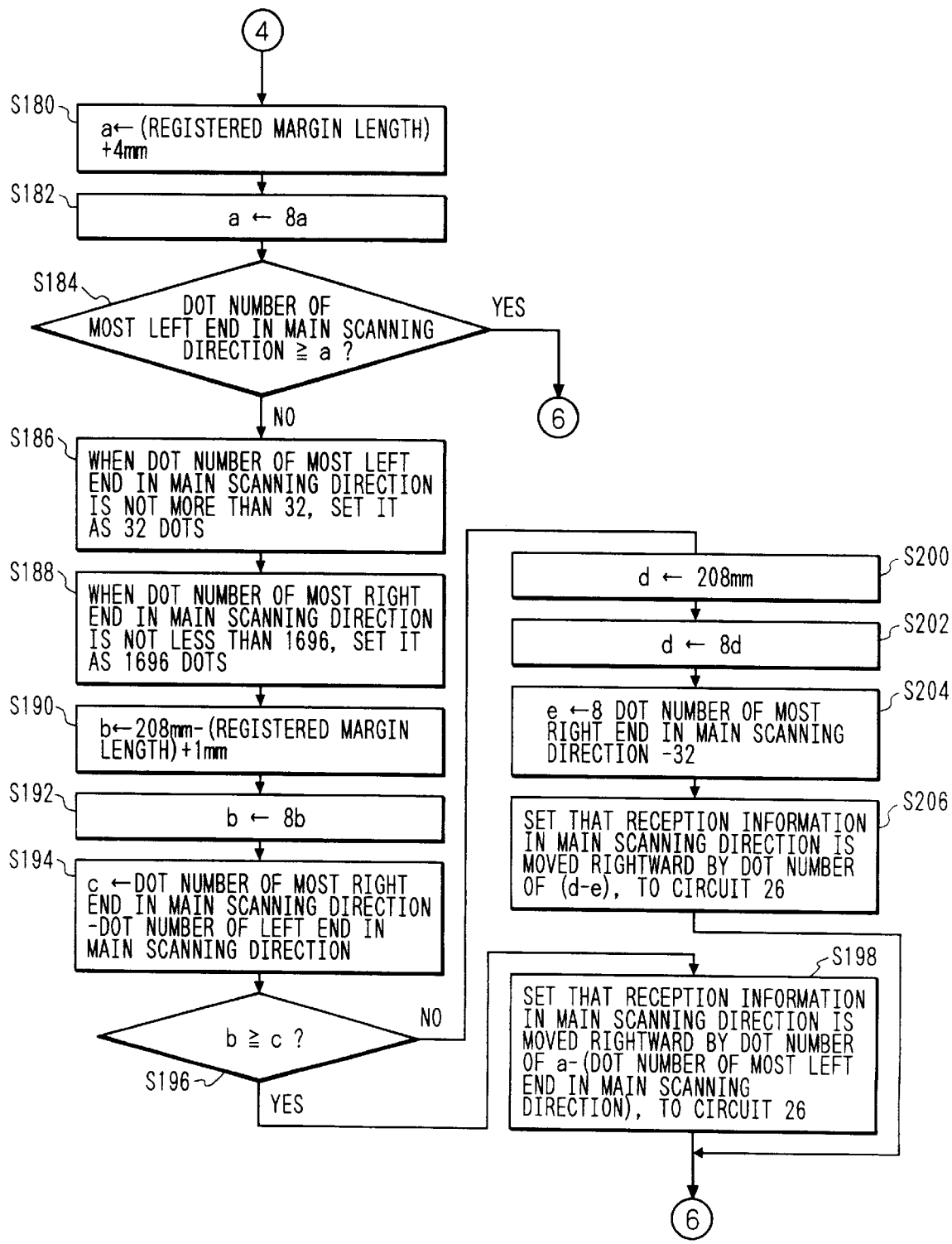
FIG. 7 is a flow chart illustrating operation of the first embodiment.
Figure 8:
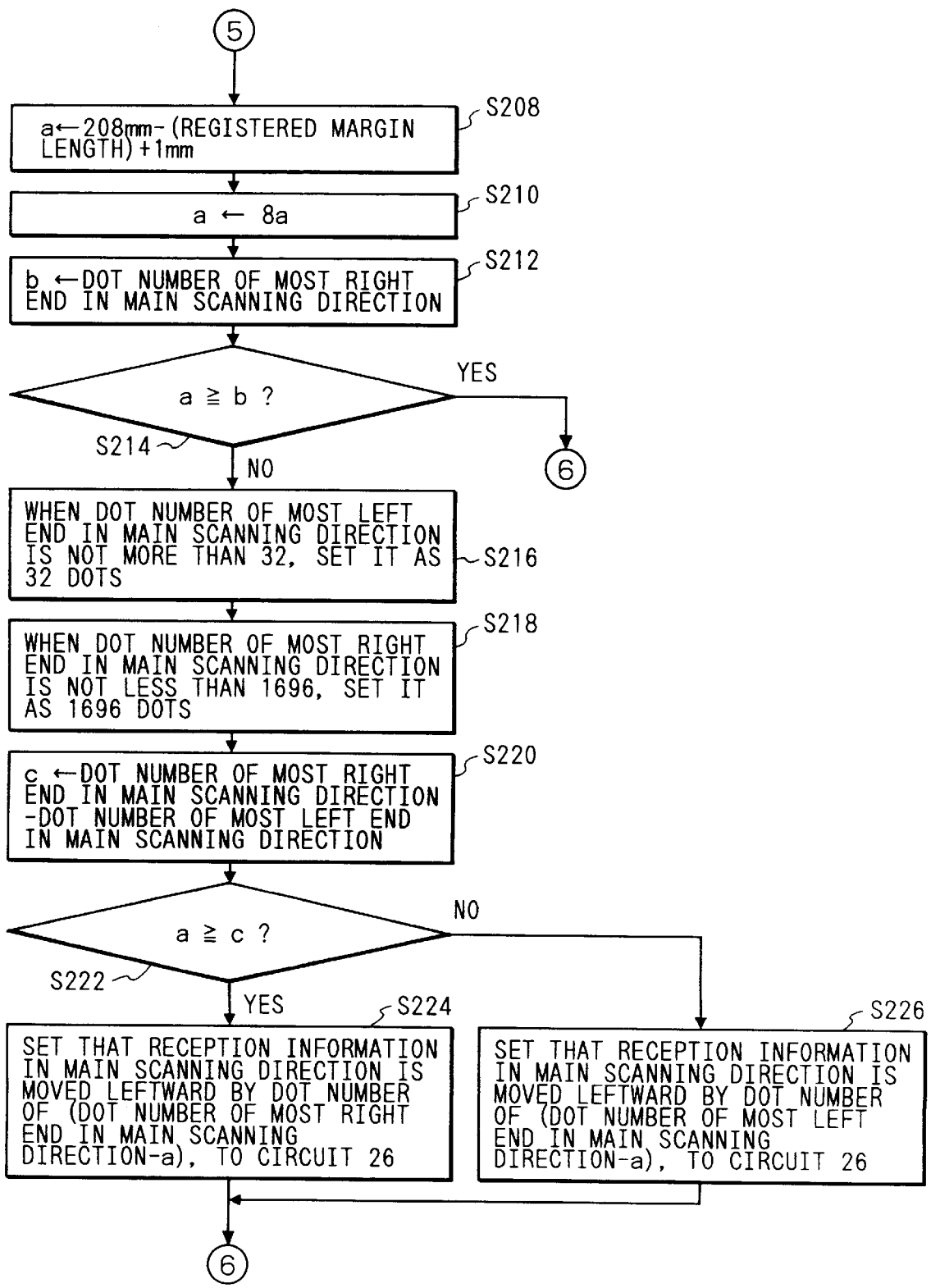
FIG. 8 is a flow chart illustrating operation of the first embodiment.

FIGS. 1A and 1B are block diagrams showing a first embodiment of the present invention.

A network control unit (NCU) 2 is provided for connecting a terminal of a telephone line, controlling connection of telephone switching network, switching data communication paths and holding a loop, thereby allowing use of a telephone network for data communication or the like. In addition, the NCU 2 is capable of connecting a telephone line 2a to a telephone 4 when a signal level (a signal line 64a) supplied from a control circuit 64 is in "0" while connecting the telephone line 2a to a facsimile device when the signal level is in "1". In a normal condition, the telephone line 2a is connected to the telephone 4.

A hybrid circuit 6 is provided for separating a transmitting signal from a receiving signal, transmitting a transmitted signal supplied from an adding circuit 16 to the telephone line 2a through the NCU 2, receiving through the NCU 2 a signal supplied from another device, and transmitting the received signal to a V.29 demodulator 20 and a V.21 demodulator 18 through a signal line 6a.

A V.21 modulator 8 is a modulator for carrying out a modulation operation according to V.21, a wellknown CCITT standard. The V.21 modulator 8 modulates a procedure signal (signal line 64b) supplied from the control circuit 64 to transmit the same through a signal line 8a to the adding circuit 16.

A reading circuit 10 is provided for reading successively image signals for one line in a main scanning direction of a transmitted original, creating a signal sequence of binary data indicative of white and black, and transmits the data through a signal line 10a to an encoding circuit 12. The reading circuit 10 comprises an image pick-up cell such as a charged-coupled device (CCD) and an optical system.

The encoding circuit 12 receives a read data transmitted on the signal line 10a and carries out an encoding operation (MH coding or MR coding) to transmit the coded data through a signal line 12a.

A V.27 ter or V.29 modulator 14 receives the coded data supplied from the encoding circuit 12 through the signal line 12a. The V.27 ter or V.29 modulator 14 carries out a modulation operation according to V.27 ter (differential phase modulation) or V.29 (orthogonal modulation), well-known CCITT standards to supply the modulated data to the adding circuit 16 through a signal line 14a.

The adding circuit 16 is a circuit for adding the outputs of the modulators 8 and 14. An output of the adding circuit 16 is supplied to the hybrid circuit 6.

A V.21 demodulator 18 is for carrying out a demodulation operation according to V.21, a well-known CCITT standard. The demodulator 18 receives a procedure signal supplied from the hybrid circuit 6 through a signal line 6a. The demodulator 18 carries out the V.21 demodulation operation to supply a demodulated data to the control circuit 64 through a signal line 18a.

The V.27 ter or V.29 demodulator 20 is for carrying out a demodulation operation according to V.27 ter or V.29, well-known CCITT standards. The demodulator 20 receives a modulated image signal supplied from the hybrid circuit 6. The demodulator 20 carries out a demodulation operation and supplies a demodulated data to a memory circuit 22 and a decoding circuit 30 through a signal line 20*a*.

The memory circuit 22 stores the demodulated data transmitted on the signal line 20*a* or the signal line 12*a* in accordance with the control made by the control circuit 64 through a signal line 64*c*. The memory circuit 22 transmits the stored data to a decoding circuit 24 through a signal line 22*a*.

The decoding circuit 24 decodes (MH decoding or MR decoding) the data supplied from the memory circuit 22 through the signal line 22*a*. The decoding circuit 24 supplies a decoded data to a moving circuit 26 for reception information through a signal line 24*a*.

The moving circuit 26 for reception information receives the decoded data supplied from the decoding circuit 24 through the signal line 24*a*. The moving circuit 26 for reception information moves the received data by amounts corresponding to shift amounts in main and sub scanning directions on a signal line 64*e* to supply a data after movement to a recording circuit 28 through a signal line 26*a*.

The recording circuit 28 receives the signal on the signal line 26*a* when the signal indicative of "1" is supplied to a signal line 64*f* to record the received information or the read information. On the contrary, the recording circuit 28 receives information regarding communication result reports or communication management reports supplied to a signal line 64*g* when a signal indicative of "2" is supplied to the signal line 64*f* to record the information. The recording circuit 28 is not operated when a signal indicative of "0" is supplied to the signal line 64*f*.

The decoding circuit 30 receives the signal supplied from the demodulator 20 through the signal line 20*a*. The decoding circuit 30 decodes (MH decoding or MR decoding) the received data to supply a decoded data to a signal line 30*a*.

An effective area detecting circuit 32 receives the signal supplied to the signal line 30*a* after clear pulses are supplied to a signal line 64*o*. The effective area detecting circuit 32 supplies to a signal line 32*a* information representing a dot number corresponding to a dot with the first black dot number on the left in the main scanning direction, a dot number corresponding to a dot with the first black dot number on the right in the main scanning direction, a line number corresponding to a line with the first black dot number on the top in the sub scanning direction and a line number corresponding to a line with the first black dot number on the bottom in the sub scanning direction.

A filing impossibility stamp depressing circuit 34 is a circuit for use in stamping on the back of a recording paper a stamp mark indicative of impossibility of filing through a signal line 34*a* in response to a filing impossibility stamping command on a signal line 64*p*.

A filing selection button 36 is a button depressed when a filing is selected. When the filing selection button 36 is depressed, depression pulses are supplied to a signal line 36*a*.

When a filing lamp 38 is turned on, recording control is made to move the received information or read information such that the effective area is out of a margin area. The filing lamp 38 is turned off when clear pulses are generated on a signal line 64*h*. In this way, the filing lamp 38 is alternatively turned on and off in response to filing selection button depression pulses on the signal line 36*a*. The filing lamp 38 supplies to a signal line 38*a* a signal in the signal level of "0" when it is turned on, and supplies to the signal line 38*a* a signal in the signal level of "1" when it is turned off.

A margin area registering button 40 is a button used for registering a margin area. When being depressed, the margin area registering button 40 supplies depression pulses to a signal line 40*a*.

A left end button 42 is a button for use in indicating that the margin area is located at the left side. When being depressed, the left end button 42 supplies depression pulses to a signal line 42*a*.

A right end button 44 is a button for use in indicating that the margin area is located at the right side. When being depressed, the right end button 44 supplies depression pulses to a signal line 44*a*.

An upper end button 46 is a button for use in indicating that the margin area is located at the upper side. When being depressed, the upper end button 46 supplies depression pulses to a signal line 46*a*.

A lower end button 48 is a button for use in indicating that the margin area is located at the lower side. When being depressed, the lower end button 48 supplies depression pulses to a signal line 48*a*.

A set key 50 is a key used for registering the margin area(s). When being depressed, the set key 50 supplies depression pulses to a signal line 50*a*.

A ten key 52 is a key used for setting a length of the margin area. When being depressed, the ten key 52 supplies ten key information to a signal line 52*a*.

A margin area registering circuit 54 is a circuit for registering the margin area(s) that a user requires. To register the margin area in the margin area registering circuit 54, information corresponding to a top, bottom, left or right end is supplied to a signal line 54*a* for a number 0, 1, 2 or 3 assigned thereto, respectively, (e.g., left end: 2). The margin area registering circuit 54 produces a space, produces the length thereof in a millimeter as a unit (e.g., 10 mm), and then supplies write pulses to a signal line 64*i*. On the other hand, to read the margin information registered in the margin area registering circuit 54, read pulses are supplied to a signal line 64*j*. The margin information such as "2 10" (i.e., 10 mm on the left end) registered is supplied to a signal line 54*a*.

A display unit 56 receives information supplied from the control circuit 64 through a signal line 64*k* to display the same.

A filing impossibility display lamp 58 is a lamp for use in indicating that a page of which filing is impossible is contained in the present receiving or reading. The filing impossibility display lamp 58 is turned on when a signal in the signal level of "1" is supplied to a signal line 64*l* while is turned off when a signal in the signal level of "0" is supplied to the signal line 64*l*.

A filing impossibility page display circuit 60 is a display circuit for displaying, when a page of which filing is impossible is contained in the present receiving or reading, the page number of that page. The filing impossibility page display circuit 60 receives and displays the page number supplied to a signal line 64*m*.

An alarm generating circuit 62 generates an alarm when a signal in the signal level of "1" is supplied to a signal line 64*n* and generates no alarm when a signal in the signal level of "0" is supplied to the signal line 64*n*.

The control circuit 64 in this embodiment detects the effective area (an area including a black dot is considered as an effective dot) in the received information or the read information upon reception or reading. The control circuit 64 registers the margin area for filing to shift and record the received information such that the effective area is out of the margin area.

FIGS. 2 through 8 are flow charts illustrating operation of the first embodiment.

At step S72, a signal in the signal level of "0" is supplied to the signal line 64a to turn off a connect modem to line (CML). At step S74, a signal in the signal level of "0" is supplied to the signal line 64f to set the recording circuit 38 not to record information. At step S76, the clear pulses are supplied to the signal line 64h to turn off the filing lamp 38. At step S78, a signal in the signal level of "0" is supplied to the signal line 64l to turn off the filing impossibility display lamp 58. At step S80, the filing impossibility page display circuit 60 is set through the signal line 64m not to display information. At step S82, a signal in the signal level of "0" is supplied to the signal line 64n to set the alarm generating circuit 62 not to generate the alarm.

Subsequently, at step S84, the signal on the signal line 40a is received to determine whether the registration of the margin area is selected. If the margin area registering button 40 is depressed to select registration of the margin area, the step S84 passes to step S90. If the margin area registering button 40 is not depressed, step S86 is carried out.

At the step S86, it is determined whether reception is selected. If the reception is selected, step S100 follows. When no reception is selected, step S88 is executed to carry out other processing.

At the step S90, information indicating "please designate up, down, left or right" is supplied to the signal line 64k to display it on the display unit 56. At step S92, information for the left end button 42, the right end button 44, the upper end button 46 and lower end button 48 is received to determine whether the margin is on the left, right, upper and lower end.

Subsequently, at step S94, information indicating "ENTER MARGIN LENGTH" is supplied to the signal line 64k to display the same on the display unit 56. At step S96, information of the ten key 52 is received to recognize the length of the margin.

At step S98, information of the upper, lower, left and right ends and the length thereof are registered in the margin area registering circuit 54. The control then returns to the step S86.

If the step S86 is positive indicating that the reception is selected, a signal in the signal level of "1" is supplied to the signal line 64a to turn on the CML at step S100. Step S102 carries out pre-procedures. Subsequently, step S104 supplies the clear pulses to the signal line 64o to clear the effective area detecting circuit 32. Step S106 supplies a signal of "1" to the signal line 64f. The recording circuit 28 receives and records the information on the signal line 26a and makes the stamping of the stamp mark supplied through the signal line be effective.

At step S108, the moving circuit 26 for reception information is set to record the information on the signal line 64e without moving in the main and sub scanning directions. At step S110, the received information supplied to the signal line 20a through the signal line 64c is stored in the memory circuit 22.

At step S112 it is determined whether the information for one page has been received. When reception of the information for one page is completed, step S114 is executed. If the step S112 determines that the reception for one page has not completed yet, the step S110 is again executed.

At step S114, the information on the signal line 32a is received to determine or recognize the effective area containing the black dot(s). At steps S116 through S120, which end is registered as the margin area is determined. When the upper end is registered, step S122 is carried out. When the lower end is registered, step S166 is carried out. When the left end is registered, step S180 is carried out. When the right end is registered, step S208 is carried out.

Figure 9A:
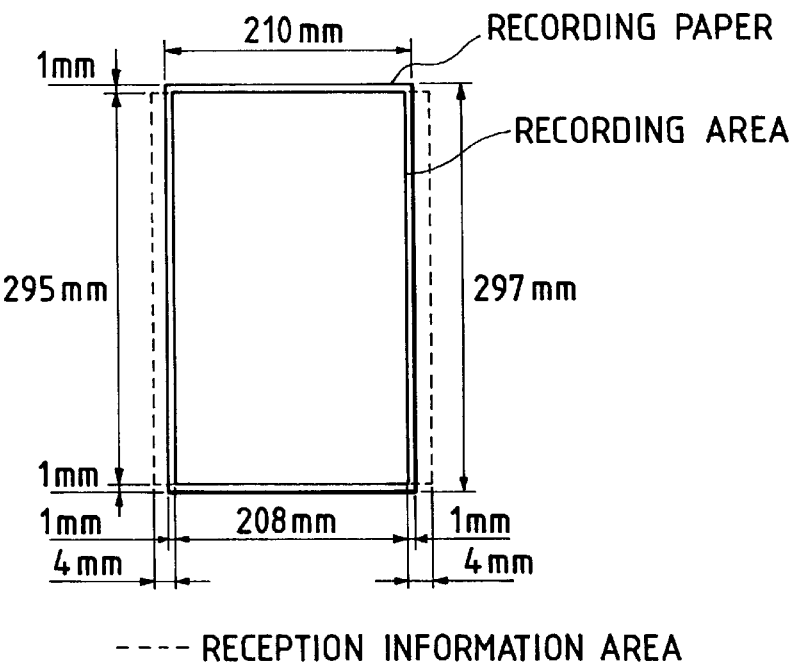
FIGS. 9A and 9B are views for use in describing recording operation of the first embodiment.
Figure 9B:
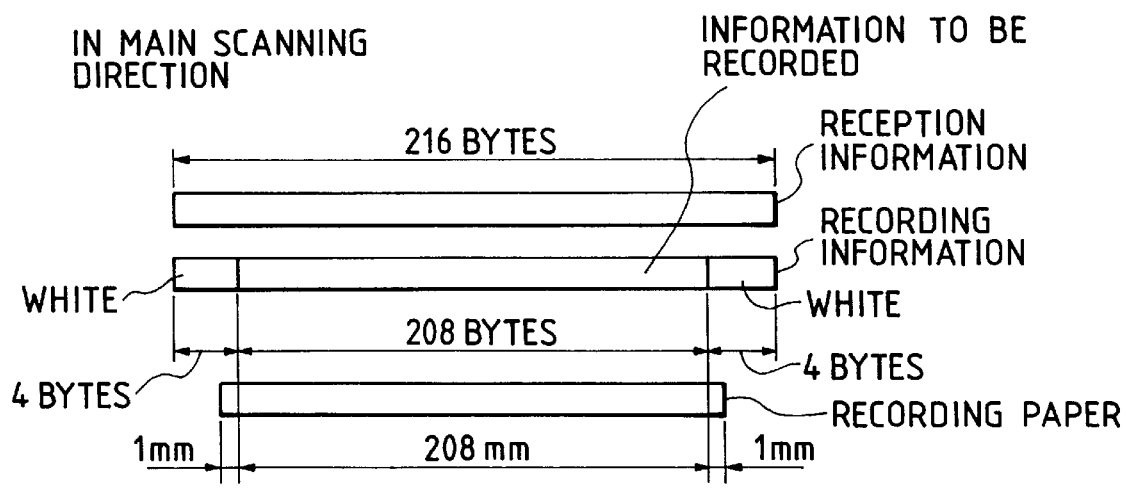

In this embodiment, description is made in conjunction with a case where recording is made on a regular paper of A4 size. FIGS. 9A and 9B are representation illustrating a position relation between the received information and the recording paper. In FIG. 9A, a rectangle of 210 mm in the main scanning direction and 297 mm in the sub scanning direction corresponds to a recording paper of A4 size. A rectangle of 208 mm in the main scanning direction and 295 mm in the sub scanning direction corresponds to a recording area, 1 mm inside the all ends of the recording paper.

The received information is in a area of 216 mm in the main scanning direction. The length of the received information in the sub scanning direction is not determined upon transmission. FIG. 9B illustrates a relation between the received information and the recording position when the received information is not moved or shifted by the moving circuit 26 for reception information.

In FIG. 9B, data is received that has 216 byte for one line (1 byte/1 mm) in the main scanning direction. In this event, the data of the received information at the first and the last 4 bytes are discarded. The remaining data for 208 bytes is recorded at the central position of 208 mm in the recording paper. The width of the recording paper is 210 mm, so that the left and right ends of 1 mm, respectively, is white information. In the sub scanning direction, the received information for the first line is recorded at 1 mm from the leading end of the recording paper. A non-printing area, i.e., a white information area of 1 mm is also provided at the tailing end of the recording paper.

Turning back to FIG. 4, step S122 subtracts 1 mm from the registered margin length because the margin of 1 mm is present at the leading end. The subtraction result is stored as a constant a. Step S124 calculates the number of lines corresponding to the constant a in each mode. More specifically, if a reception mode for the preceding one page is standard mode, a value obtained by multiplying the constant a by 3.85 is stored as the constant a. If the reception mode is fine mode, a value obtained by multiplying the constant a by 7.7 is stored as the constant a. If the reception mode is super-fine mode, a value obtained by multiplying the constant a by 15.4 is stored as the constant a.

At step S126, it is determined whether a line number of the uppermost end in the sub scanning direction is equal to or larger than the constant a. In other words, it is determined whether the margin registered for the upper end can be obtained without moving the received information. If the line number of the uppermost end is equal to or larger than the constant a, indicating that the margin registered for the upper end can be obtained without moving the received information, step S148 is executed. On the other hand, if the line number of the uppermost end is smaller than the constant a, indicating that the margin registered for the upper end cannot be obtained, step S128 is carried out.

At steps S128 through S134, it is determined whether the margin can be obtained at the upper end by means of moving the received information. If the margin can be obtained, step S136 follows. If not, step S138 follows.

At the step S128, a constant b is stored that is obtained by means of adding 1 mm corresponding to the upper margin to the recording length in the sub scanning direction, from which the length registered for the margin is subtracted. At step S130, the number of lines corresponding to that length is calculated for each mode.

Step S132 subtracts the line number with the black dot(s) at the upper most end of the sub scanning line from the line number with the black dot(s) at the lowermost end of the sub scanning direction. The number of effective area lines is obtained, which is stored as a constant c.

At step S134, it is determined whether the line number b is equal to or larger than the line number c. If b is equal to or larger than c, step S136 is carried out because it is possible to obtain the margin at the upper end by means of moving the received information. If b is smaller than c, step S138 is carried out because it is impossible to obtain the margin at the upper end.

At the step S136, the moving circuit 26 for reception information is set to move the received information by an amount corresponding to the number of lines obtained by means of subtracting the line number of the line with the black dot(s) at the uppermost end from the line number a. The step S136 is followed by step S148.

At the step S138, the effective recording length of 295 mm in the sub scanning direction is stored as a constant d. At step S140, the number of lines corresponding to each mode is stored as the constant d. At step S142, the line number of the line with the black dot(s) at the lowermost end in the sub scanning direction is stored as a constant e.

Subsequently, when the number of lines d is equal to or larger than the number of lines e at step S144, the moving circuit 26 for reception information is set at step S146 to move the received information downward in the sub scanning direction by the amount of the number of lines corresponding to (d–e). Though the margin obtained is not sufficient for the length registered for the upper end, the longer margin can be obtained than that obtained at a normal recording. In addition, if the number of lines d is smaller than the number of lines e, it is impossible to move the received information downward. Accordingly, step S148 follows to record the received information without movement.

At the step S148, an intermediate procedure is carried out. At step S150, it is determined whether there is a subsequent page. If a subsequent page is present, step S152 follows, and otherwise, step S160 is executed.

The step S152 supplies the clear pulses to the signal line 64d to clear the effective area detecting circuit 32. Step S154 produces the received information for the previous page through the signal line 64c and moves it by a predetermined length at the moving circuit 26 for reception information to record the same by the recording circuit 28.

Step S156 stores the received information on the signal line 20a in the memory circuit 22 in response to a control signal supplied to the signal line 64c.

At step S158, it is determined whether the information for one page has been received. If the information for one page has completely received, step S114 is executed. On the other hand, the step S154 is again executed if the reception for one page is not completed.

At the step S160, a post procedure is carried out. Step S162 supplies a signal in the signal level of "1" to the signal line 64a to turn off the CML. Step S164 produces the received information for the previous page through the signal line 64c and moves it by a predetermined length at the moving circuit 26 for reception information to record the same by the recording circuit 28.

Subsequently, steps S166 through S170 determine whether the margin is obtained at the lower end without moving the received information. If it is possible to obtain the margin, step S148 is carried out. If not, step S172 is executed.

At the step S166, a value is set into the constant a that is obtained by means of subtracting the registered length of the lower end from the value obtained by adding the margin at the tailing end, 1 mm, to the effective recording length in the sub scanning direction.

Step S168 calculates the number of lines corresponding to the length of the constant a in each mode and stores it into the constant a.

Subsequently, at step S170, it is determined whether the constant a is equal to or larger than the line number of the line with the black dot(s) at the lowermost end in the sub scanning direction. A positive result of the step S170 is followed by the step S148 while a negative result is followed by step S172.

At the step S172, the number of the effective area lines is obtained by means of subtracting the line number of the line with the black dot(s) at the uppermost end in the sub scanning direction from the line number of the line with the black dot(s) at the lowermost end in the sub scanning direction. The subtraction result is stored in the constant b.

At step S174, it is determined whether the number of lines a is equal to or larger than the number of lines b. If the number of lines a is equal to or larger than the number of lines b, step S176 follows because the margin registered for the lower end can be obtained by means of moving the received information. If the number of lines a is smaller than the number of lines b, step S178 follows because it is impossible to obtain the margin registered for the lower end even by means of moving the received information.

At the step S176, the moving circuit 26 for reception information is set to move the received information upward in the sub scanning direction by the amount corresponding to the number of lines obtained by subtracting the number of lines a from the line number at the lowermost end in the sub scanning direction.

In addition, at the step S178, the moving circuit 26 for reception information is set to move the received information upward in the sub scanning direction by the amount corresponding to the number of lines of the line number of the line with the black dot(s) at the uppermost end in the sub scanning direction. In this event, the received information is not moved when the line number of the line with the black dot(s) at the uppermost end in the sub scanning direction is equal to zero.

At steps S180 through S184, it is determined whether the margin registered for the left end can be obtained without moving the received information. If the margin can be obtained, the step S148 is carried out. If it is impossible to obtain the margin, step S186 follows.

At the step S180, a length obtained by adding 4 mm to the length of the margin registered for the left end in the constant a is stored because of the margin of 4 bytes is generated for the received information. At step S182, the number of dots corresponding to this length is stored in the constant a. In this embodiment, 8 dots/mm is stored.

At step S184, it is determined whether a black dot number of the leftmost end in the main scanning direction is equal to or larger than the constant a. If the step S184 is positive, the step S148 follows. If not, step S186 is carried out.

At steps S186 through S196, it is determined whether the margin registered for the left end can be obtained by means of moving the received information. If the margin can be obtained, step S198 follows. On the other hand, step S200 is executed if the margin cannot be obtained.

First, the step S186 sets the dot number of the black dot at the leftmost end in the main scanning direction into 32 dots when it is not larger than 32 dots. Subsequently, step S188 sets the dot number of the black dot at the rightmost end in the main scanning direction into 1696 dots when it is not smaller than 1696 dots.

Step S190 adds 1 mm of the white information at the left end to the effective recording length in the main scanning direction, from which the length of the margin registered for the left end is subtracted and stored in the constant b. In addition, step S192 obtains the number of dots corresponding to b by means of multiplying eight.

Step S194 stores in the constant c the value obtained by means of subtracting the dot number of the black dot at the lower end in the main scanning direction from the dot number of the black dot at the rightmost end in the main scanning direction.

At step S196, it is determined whether the number of dots b is equal to or larger than the number of dots c. If the number of dots b is equal to or larger than the number of dots c, step S198 follows because the margin at the left end can be obtained completely by means of moving the received information. If the number of the dots b is smaller than the number of the dots c, step S200 is executed because it is impossible to obtain the margin at the left end completely even by means of moving the received information.

At step S198, the moving circuit 26 for reception information is set to move the received information rightward in the main scanning direction by the amount corresponding to the number of dots obtained by subtracting the dot number at the leftmost end in the main scanning direction from the number of dots a.

The step S200 stores in the constant d the effective length of 208 mm in the main scanning direction. Step S202 calculates the number of dots corresponding to this length. Step S204 stores in the constant e the value obtained by means of subtracting 32 from the dot number of the black dot at the rightmost end in the main scanning direction.

At step S206, the moving circuit 26 for reception information is set to move the received information in the main scanning direction rightward by the amount corresponding to the number of dots of (d–e). The received information is not moved when d is equal to e.

At steps S208 through S214, it is determined whether the margin registered for the right end can be obtained without moving the received information. If it is possible to obtain the margin, the step S148 follows. If not, step S216 is carried out.

The step S208 stores in the constant a the value obtained by means of subtracting the length registered as the margin length for the right end from the value obtained by adding 1 mm of the right margin to the effective length of 208 mm in the main scanning direction. Step S210 calculates the number of dots for the length and stores it in the constant a. Step S212 stores in the constant b the value obtained by subtracting 32 dots from the dot number of the dot at the rightmost end in the main scanning direction.

Subsequently, at step S214, it is determined whether the number of dots a is not smaller than the number of dots b. If the number of dots a is equal to or larger than the number of dots b, the step S148 is executed. If the number of dots a is smaller than the number of dots b, step S216 is carried out.

At steps S216 through S222, it is determined whether the margin registered for the right end can be obtained by means of moving the received information. If it is possible to obtain the margin, step S224 follows. If it is impossible to obtain the margin, step S226 is carried out.

The step S216 sets the dot number of the black dot at the leftmost end in the main scanning direction into 32 dots when it is not larger than 32 dots. Subsequently, step S218 sets the dot number of the black dot at the rightmost end in the main scanning direction into 1696 dots when it is not smaller than 1696 dots.

Step S220 stores in the constant c the value obtained by means of subtracting the dot number of the black dot at the lower end in the main scanning direction from the dot number of the black dot at the rightmost end in the main scanning direction.

At step S222, it is determined whether the number of dots a is equal to or larger than the number of dots c. If the number of dots a is equal to or larger than the number of dots c, the step S224 follows. If the number of the dots a is smaller than the number of the dots c, the step S226 is executed.

At the step S224, the moving circuit 26 for reception information is set to move the received information leftward in the main scanning direction by the amount corresponding to the number of dots obtained by subtracting the number of dots a from the dot number at the rightmost end in the main scanning direction.

At the step S226, the moving circuit 26 for reception information is set to move the received information leftward in the main scanning direction by the amount corresponding to the value obtained by subtracting 32 dots from the dot number at the leftmost end in the main scanning direction.

The present invention is not limited to the above mentioned first embodiment and a modification as described below may be achieved.

While the received information is moved to prevent the margin area from containing the effective information regardless of filing selection made by a user in the first embodiment, the above mentioned control may be carried out only when the filing lamp 38 in FIG. 1B is turned on.

Figure 10:
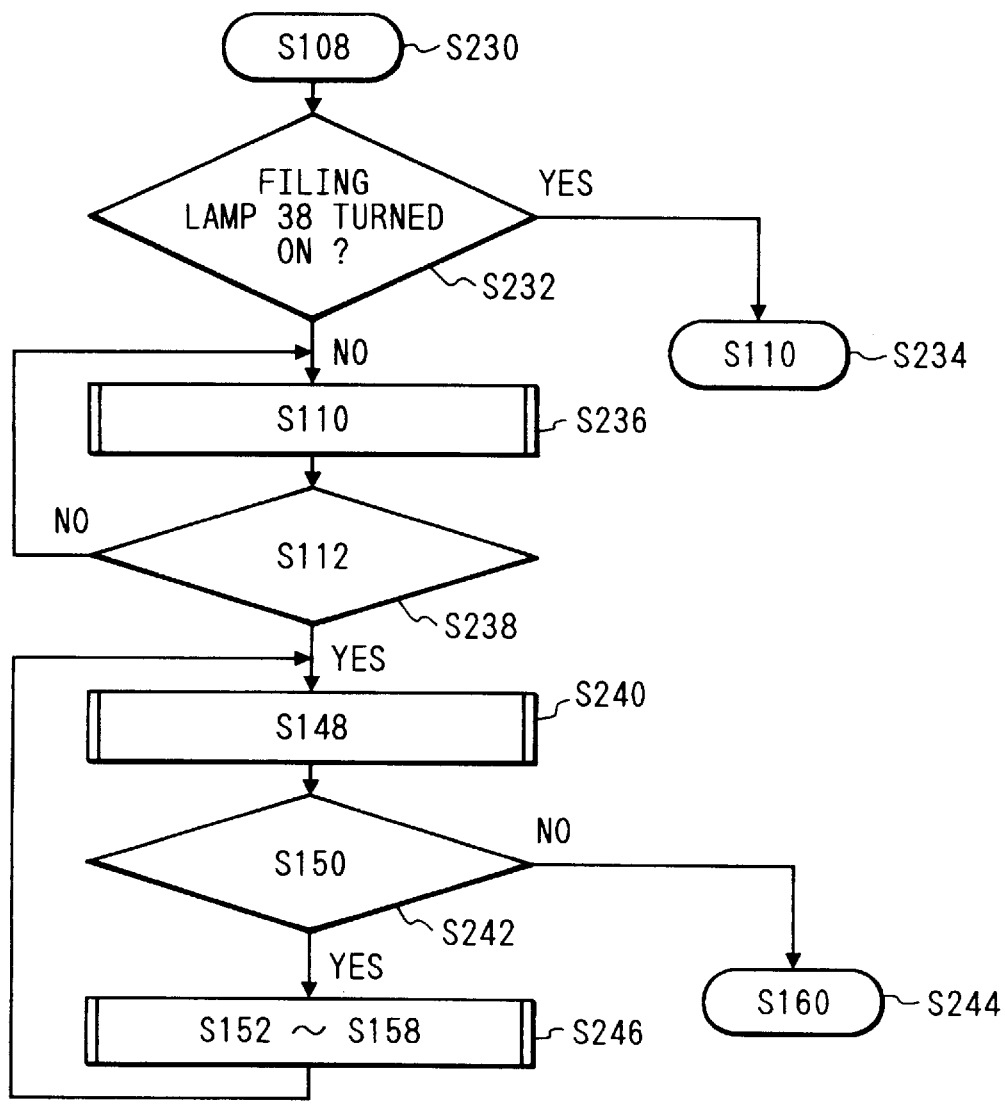
FIG. 10 is a flow chart illustrating operation of a first modification of the first embodiment.

FIG. 10 is a flow chart showing a difference of the operation in such a case from those described in conjunction with FIGS. 2 through 8.

In FIG. 10, step S230 represents the above mentioned step S108. Subsequently, step S232 enters the signal on the signal line 38a to determine whether the filing lamp 38 is turned on. If it is turned on, step S234 (S110) is carried out to control to prevent the effective information from being contained in the margin area. If the filing lamp 38 is turned off, step S236 receives into the memory. Step S238 confirms completion of reception of one page and step S240 carries out the intermediate procedure.

Subsequently, at step S242, it is determined whether there is a subsequent page. If the subsequent page is present, step S246 (steps S152 through S158) records the previous page and receives into the memory. If there is no subsequent page, step S244 (S160) is carried out to record the last page.

In the above mentioned first embodiment, the effective area in the main scanning direction is the leftmost dot with the black dot and the rightmost dot with the black dot are used while in the sub scanning direction the uppermost line with the black dot(s) and the lowermost line with the black dot(s) are used.

However, as the effective area, an area with two or more black dots may be used. A punched hole for filing or shadow, if being read, may be considered as the non-effective information.

While the above mentioned first embodiment has thus been described in conjunction with a case where the plain paper of A4 size is used, the present invention can equally be applied to a case with plain papers of letter, regal or B4 size or so. In addition, the present invention is applicable to a case where two or more sizes of recording papers are used.

While the above mentioned first embodiment has thus been described in conjunction with a case of 8 dots/mm in the main scanning direction and 3.85l/mm, 7.71/mm and 15.41/mm in the sub scanning direction, other linear density may be used.

If the effective information is contained in the margin area even by means of moving the received information, this may be indicated through the filing impossibility lamp 58 or an alarm may be generated by the alarm generating circuit 62. In addition, the page number of the page with the effective information in the margin area may be displayed by the filing impossibility page displaying circuit 60.

Figure 11:
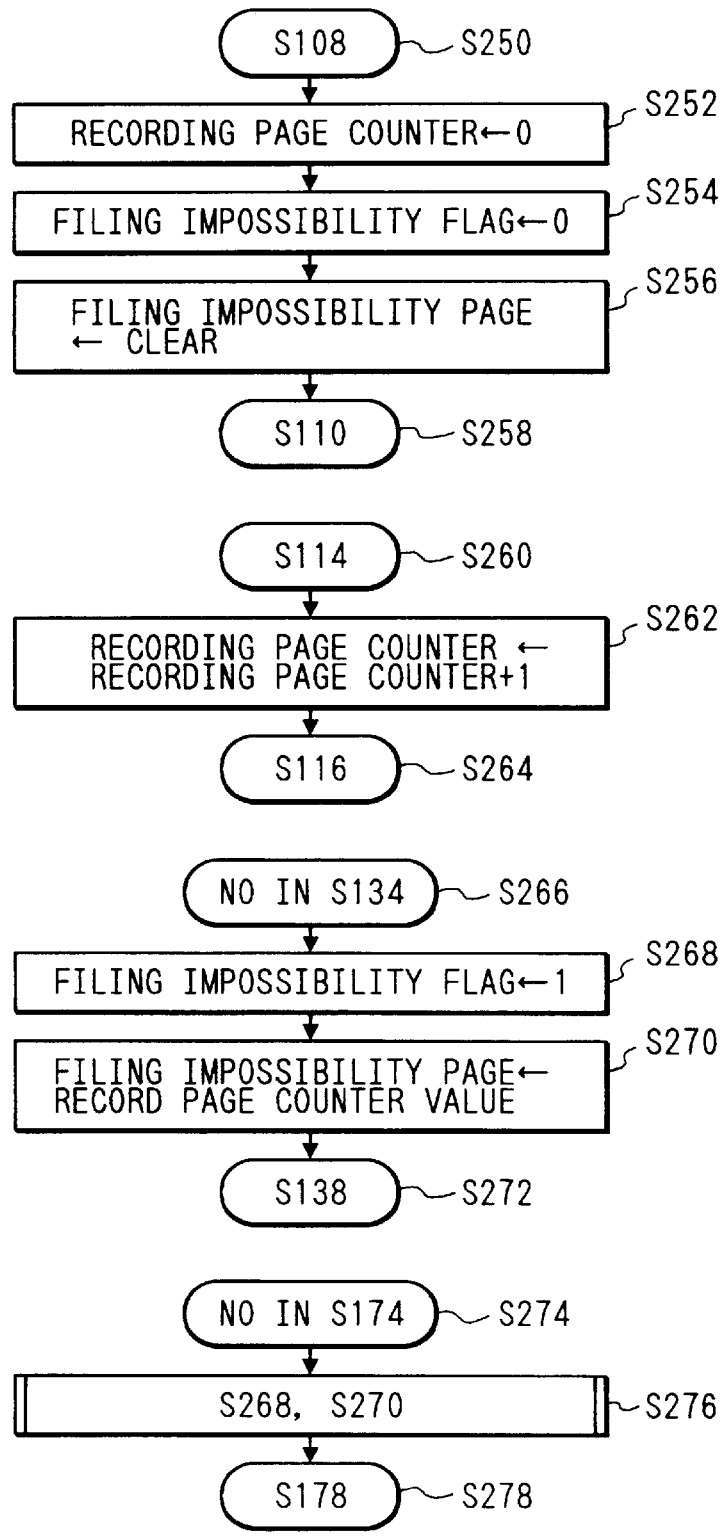
FIG. 11 is a flow chart illustrating operation of a second modification of the first embodiment.
Figure 12:
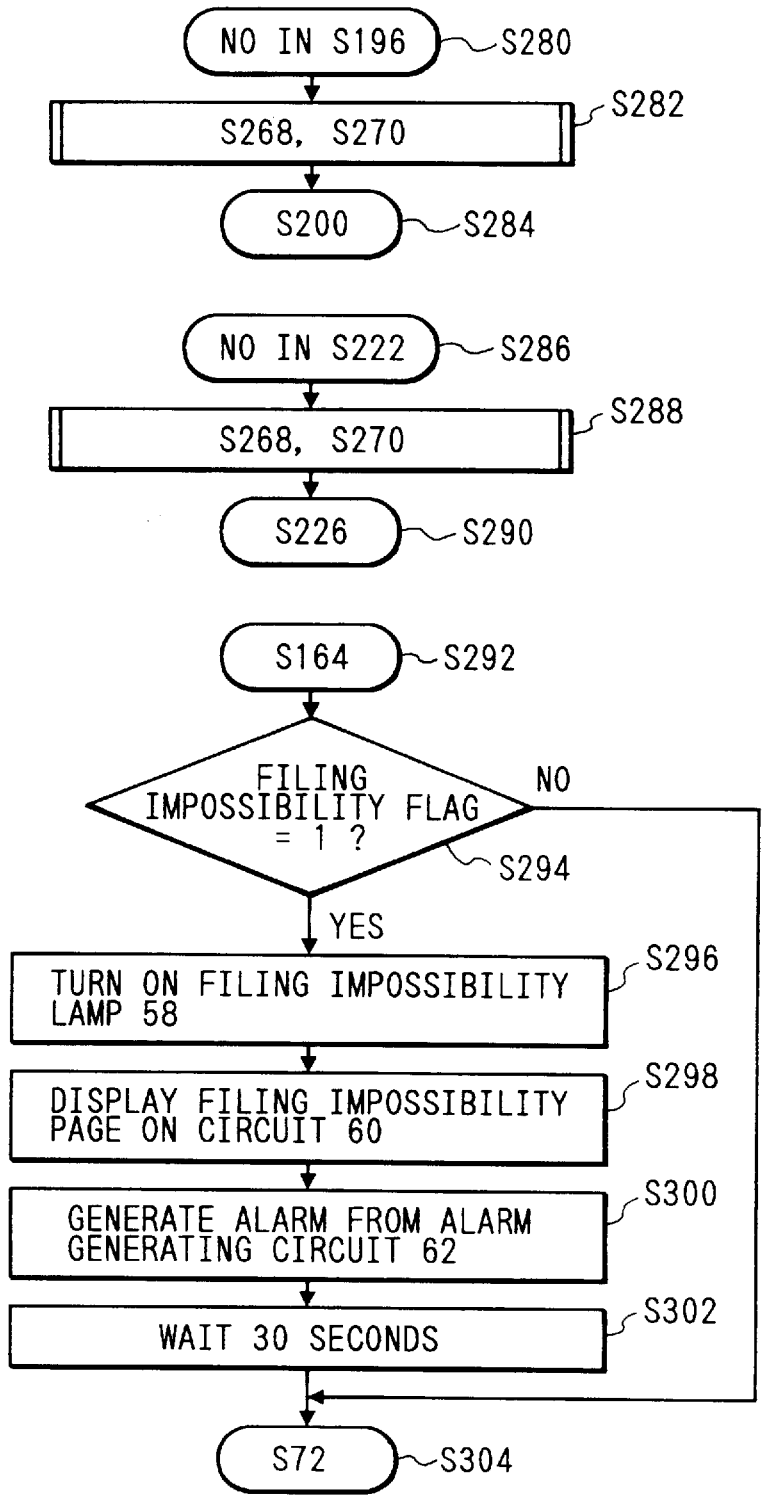
FIG. 12 is a flow chart illustrating operation of the second modification.

FIGS. 11 and 12 are flow charts illustrating a difference from FIGS. 2 through 8.

Step S250 represents the above mentioned step S108. Step S252 initializes a recording page counter that is used for counting the number of pages being recorded. Step S254 clears a filing impossibility flag. This filing impossibility flag is for indicating whether the present reception contains a page not to be filed, i.e., with the effective information in the margin area.

At step S256, the content of a filing impossibility page is cleared that stores the page not to be filed, i.e., the page with the effective information is not in the margin area. Subsequently, the above mentioned step S110 is carried out at step S258.

Step S260 represents the above mentioned step S114. At step S262, a value of the recording page counter is incremented by one and the above mentioned step S116 is carried out at step S264.

Step S266 represents the negative result (NO) of the above mentioned step S134. Step S268 sets the filing impossibility flag into 1 because the present reception contains the page of which filing is impossible. Step S270 memorizes the value of the recording page counter in the filing impossibility page. Step S272 shifts to the above mentioned step S138.

Step S274 represents the negative result (NO) of the above mentioned step S174. Step S276 carries out the control of the above mentioned steps S268 and S270. Step S278 shifts to the above mentioned step S178.

Step S280 represents the negative result (NO) of the above mentioned step S196. Step S282 carries out the control of the above mentioned steps S268 and S270. Step S284 shifts to the above mentioned step S200.

Step S286 corresponds to the negative result (NO) of the above mentioned step S222. Step S288 carries out the control of the steps S268 and S270. Step S290 shifts to the above mentioned step S226.

Step S292 corresponds to the above mentioned step S164. At step S294, it is determined whether the filing impossibility flag is set to 1. In other words, it is determined whether there is a page at the present reception with the effective information contained in the margin area even by means of moving the received information. If the filing impossibility flag is set to 1, step S296 follows. If the filing impossibility flag is set to 0, step S304 shifts to the step S72.

At the step S296, a signal in the signal level of "1" is supplied to the signal line 641 to turn on the filing impossibility lamp 58. At step S298, information of the filing impossibility page is successively supplied to the signal line 64m to display the filing impossibility page on the filing impossibility page displaying circuit 60.

At step S300, a signal in the signal level of "1" is supplied to the signal line 64n to generates an alarm. Step S302 waits for 30 seconds. After this waiting, step S304 shifts to the step S72.

While the operation illustrated in FIGS. 11 and 12 has thus been described in conjunction that notification of the filing impossibility and the filing impossibility page is made by means of displaying on the display unit 56, they may be recorded as the communication result report or the communication management report by the recording circuit 28 through the signal line 64g.

Figure 13:
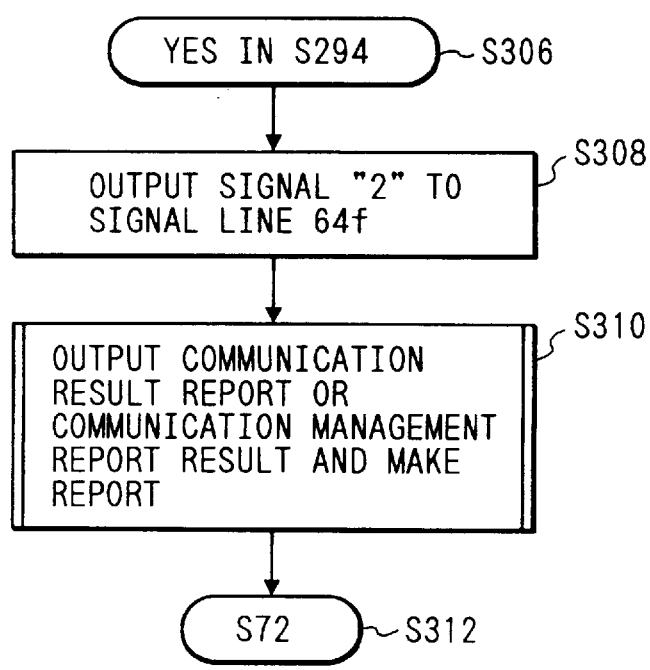
FIG. 13 is a flow chart illustrating operation of a third modification of the first embodiment.

FIG. 13 is a flow chart illustrating a difference from FIGS. 11 and 12 in the operation in such a case.

Step S306 corresponds to the positive result (YES) of the above mentioned step S294. At step S308, a signal "2" is supplied to the signal line 64f to set the recording circuit 28 to enter the report information on the signal line 64g.

At step S310, information such as the communication result report or the communication management report is supplied to the signal line 64g to create the report. Step S312 shifts to the above mentioned step S72.

If there is the page with the effective information contained in the margin area even after movement of the received information, information indicating this is displayed as shown in FIGS. 11 and 12. In addition, as shown in FIG. 13, it may be recorded through the communication result report of the communication management report or the like.

In addition, as the filing impossibility page information, a stamp mark indicating this may be stamped on the back side of the recording paper. With this, a user may copy the output result, if necessary, for filing or file the page without copying when he or she determines the margin contains no necessary information.

Figure 14:
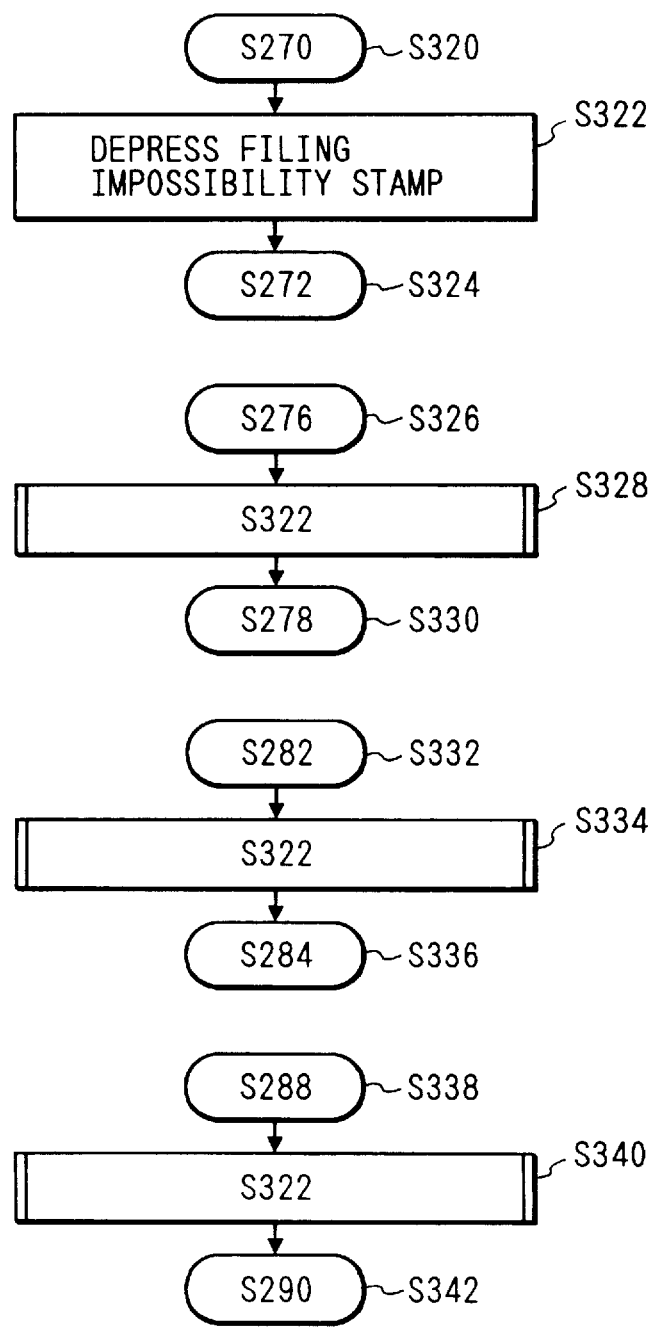
FIG. 14 is a flow chart illustrating operation of a fourth modification of the first embodiment.

FIG. 14 is a flow chart illustrating operation in such a case only at the portion different from FIGS. 11 and 12.

Step S320 corresponds to the above mentioned step S270. At step S322, filing impossibility stamping command pulses are supplied to the signal line 64p to stamp the stamp mark on the back side of the recording paper, indicating that the filing is impossible. Subsequently, steps S324 through S342 correspond to the above mentioned steps S272, S276, S278, S282, S322, S284, S288 and S332, respectively.

While the example illustrated in FIG. 14 has thus been described in conjunction that the stamp mark is stamped on the back of the page containing the effective information located in the margin area after the received information is moved, the stamp mark may be stamped on the front of the page in question rather than on the back of the page.

In addition, the above mentioned embodiment has been described in conjunction with the case where the received information is recorded. However, the read information may be recorded after being moved to prevent the effective information from being contained in the margin area of the recording paper.

If the upper end margin or the lower end margin is selected, a relatively long received information may be divided into two pages to provide the upper or lower end margin.

If the effective information is contained in the margin area even by means of moving the received information, the received information may be reduced in size and recorded on the paper with a sufficient amount of margin.

The above mentioned processing in the above mentioned individual modifications may be combined, if necessary, depending on applications.

Next, a second embodiment of the present invention is described.

When an original of a binding paper being filed is transmitted through a conventional facsimile apparatus based on the one-side reading and recording, there is no problem when the transmitted information is bound at the receiving side since the punched holes for binding are located at the left end of the original and the recording paper.

However, in a facsimile device capable of transmitting a perfect printing or of recording information on both sides of the recording paper, there are four possible conditions of operation: (1) reading information on one side of the original and recording the information on one side of the recording paper; (2) reading information on one side of the original and recording the information on both sides of the recording paper; (3) reading information on both sides of the original and recording the information on one side of the recording paper; and (4) reading information on both sides of the original and recording the information on both sides of the recording paper.

In the operation of (4) to read information on both sides of the original and record the information on both sides of the recording paper, the position of the punched holes for binding are located at the left end for the front and at the right end for the back of the original and the recording paper. This causes no problem of hole position.

However, in the operation of (2) to read information on one side of the original and record the information on both sides of the recording paper, the punched holes of the odd page are located at the left end of the original but are located at the right end on the back of the recording paper. Accordingly, the information at the right end of the original is concealed when being bound at the receiving side.

In addition, in the operation of (3) to read information on both sides of the original and record the information on one side of the recording paper, the punched holes of the back of the perfect original are located at the right hand but are located at the left hand on the recording paper. Accordingly, the information at the left end of the original is concealed when being bound at the receiving side.

With this respect, the second embodiment is directed to provide a facsimile apparatus that is capable of transmitting an original for binding at an optimum state in accordance with a combination of an original reading mode at the transmitting side and an image recording mode at the receiving side.

Figure 15B:
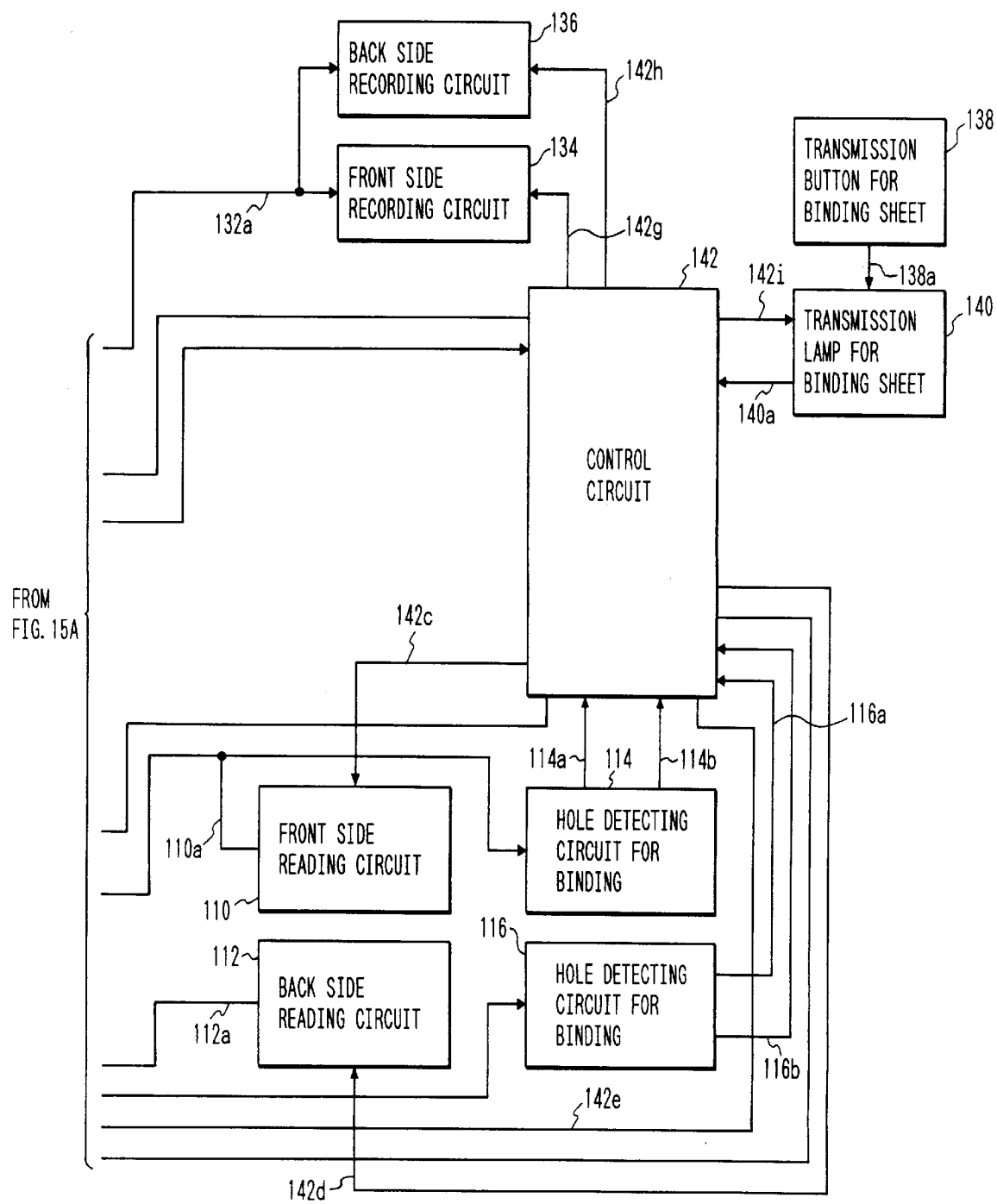
FIG. 15, comprised of FIGS. 15A and 15B, is a block diagram showing a second embodiment of the present invention.
Figure 17:
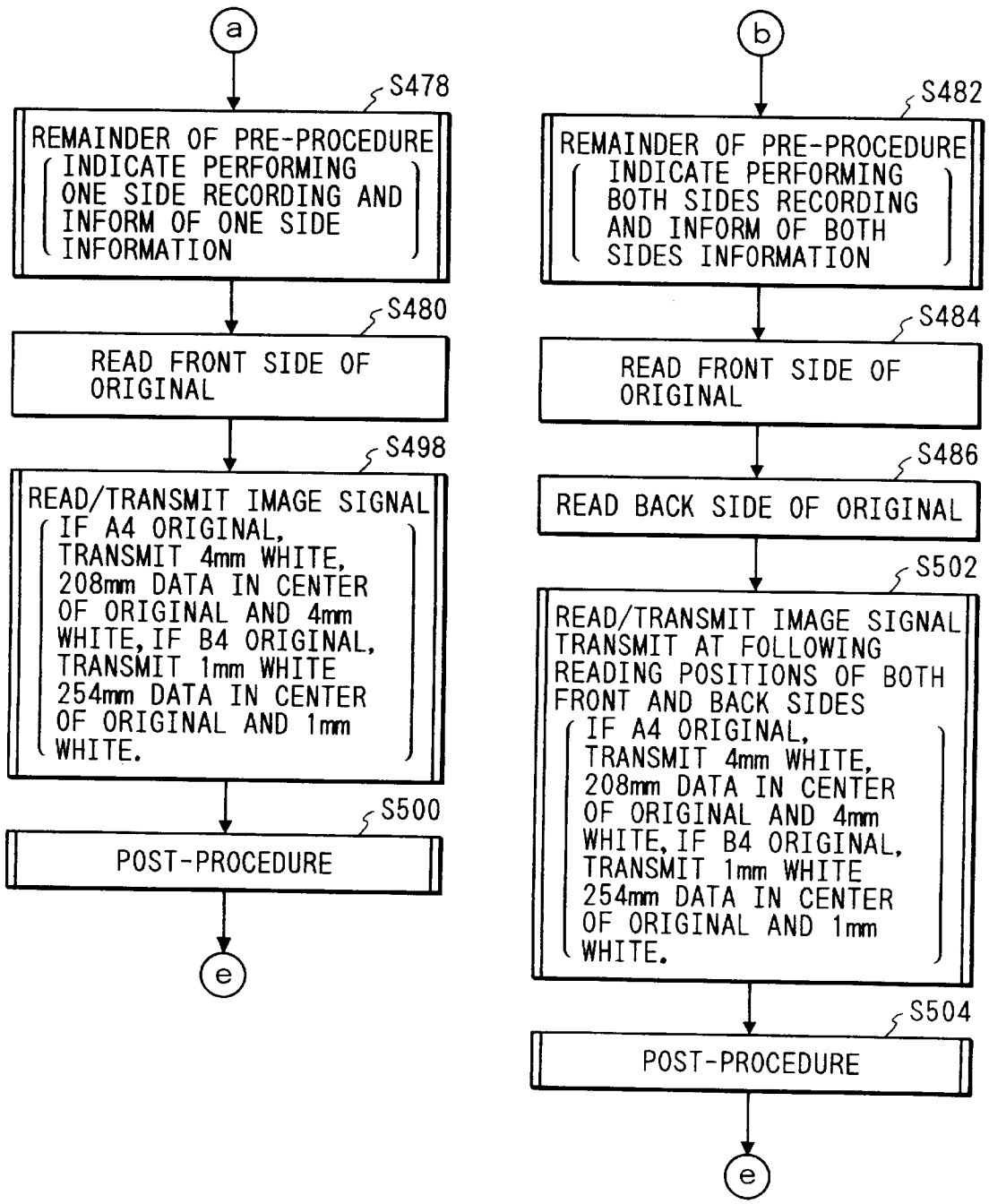
FIG. 17 is a flow chart illustrating operation of the second embodiment.
Figure 18:
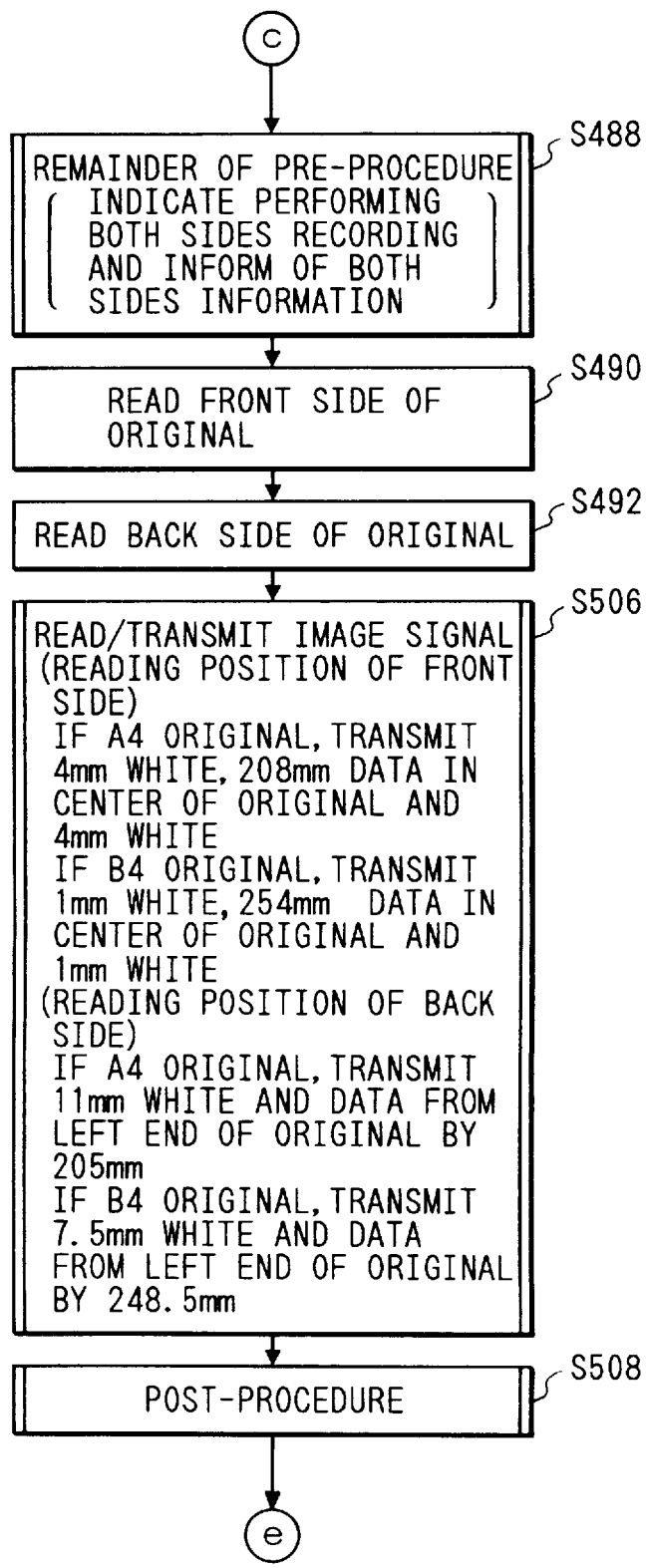
FIG. 18 is a flow chart illustrating operation of the second embodiment.
Figure 19:
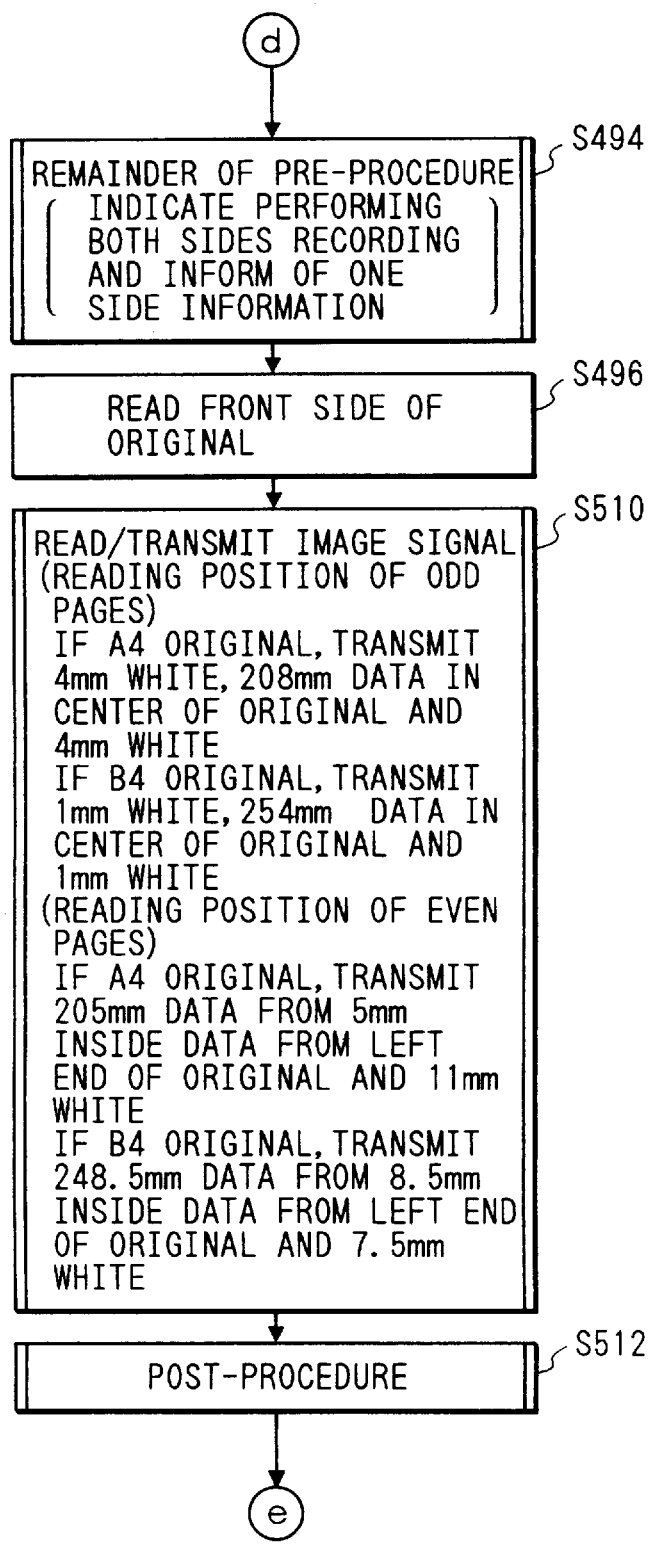
FIG. 19 is a flow chart illustrating operation of the second embodiment.

FIGS. 15A and 15B are block diagrams showing the second embodiment of the present invention.

A network control unit (NCU) 102 is provided for connecting a terminal of a telephone line, controlling connection of telephone switching network, switching data communication paths and holding a loop, thereby allowing use of a telephone network for data communication or the like. In addition, the NCU 102 is capable of connecting a telephone line 102a to a telephone 104 when a signal level (a signal line 142a) supplied from a control circuit 142 is in "0" while connecting the telephone line 102a to a facsimile apparatus when the signal level is in "1". In a normal condition, the telephone line 102a is connected to the telephone 104.

A hybrid circuit 106 is provided for separating a transmitting signal from a receiving signal, transmitting a transmitted signal supplied from an adding circuit 124 to the telephone line 102a through the NCU 102, receiving through the NCU 102 a signal supplied from another apparatus, and transmitting the received signal to a V.29 demodulator 128 and a V.21 demodulator 126 through a signal line 106a.

A V.21 modulator 108 is a modulator for carrying out a modulation operation according to V.21, a well-known CCITT standard. The V.21 modulator 108 modulates a procedure signal (signal line 142b) supplied from the control circuit 142 to transmit the same through a signal line 108a to the adding circuit 124.

A front side reading circuit 110 is a circuit for reading the front side of the original. This front side reading circuit 110 is provided for reading successively image signals for one line in a main scanning direction of a front side of a transmitted original, creating a signal sequence of binary data indicative of white and black, and transmits the data through a signal line 110a to a detecting circuit 114 described below and an encoding circuit 120. The front side reading circuit 110 comprises an image pick-up cell such as a charged-coupled device (CCD) and an optical system. The front side reading circuit 110 carries out a reading operation when a signal in the signal level of "1" is supplied from the control circuit 142 to a signal line 142c. On the other hand, the front side reading circuit 110 carries out no operation when a signal in the signal level of "0" is supplied from the control circuit 142 to the signal line 142c.

A back side reading circuit 112 is a circuit for reading the back side of the original. This back side reading circuit 112 is provided for reading successively image signals for one line in a main scanning direction of a back side of a transmitted original, creating a signal sequence of binary data indicative of white and black, and transmits the data through a signal line 112a to a detecting circuit 116 described below and a memory circuit 118. The back side reading circuit 112 comprises an image pick-up cell such as a charged-coupled device (CCD) and an optical system. The back side reading circuit 112 carries out a reading operation when a signal in the signal level of "1" is supplied from the control circuit 142 to a signal line 142d. On the other hand, the back side reading circuit 112 carries out no operation when a signal in the signal level of "0" is supplied from the control circuit 142 to the signal line 142d.

The detecting circuit 114 receives the signal supplied from the signal line 110a. The detecting circuit 114 supplies a signal in the signal level of "1" to a signal line 114a when a hole for binding is detected by means of, for example, pattern recognition. The detecting circuit 114 supplies to a signal line 114b area information, such as 8 mm at the left end, where the hole for binding is detected. In addition, the detecting circuit 114 supplies to the signal line 114a a signal in the signal level of "0" when no hole for binding is detected.

The detecting circuit 116 receives the signal supplied from the signal line 112a. The detecting circuit 116 supplies a signal in the signal level of "1" to a signal line 116a when a hole for binding is detected by means of, for example, pattern recognition. The detecting circuit 116 supplies to a signal line 116b area information, such as 8 mm at the left end, where the hole for binding is detected. In addition, the detecting circuit 116 supplies to the signal line 116a a signal in the signal level of "0" when no hole for binding is detected.

The memory circuit 118 stores the read data for the back side of the original supplied to the signal line 112a according to a control signal supplied from the control circuit 142 to a signal line 142e.

The encoding circuit 120 receives read data transmitted on the signal lines 110a and 118a and carries out an encoding operation (MH coding or MR coding) to transmit the coded data through a signal line 120a.

A V.27 ter or V.29 modulator 122 receives the coded data supplied from the signal line 120a. The V.27 ter or V.29 modulator 122 carries out a modulation operation according to V.27 ter (differential phase modulation) or V.29 (orthogonal modulation), well-known CCITT standards to supply the modulated data to the adding circuit 124 through a signal line 122a.

The adding circuit 124 is a circuit for adding the outputs of the modulators 108 and 122. An output of the adding circuit 124 is supplied to the hybrid circuit 106.

A V.21 demodulator 126 is for carrying out a demodulation operation according to V.21, a well-known CCITT standard. The demodulator 126 receives a procedure signal supplied from the hybrid circuit 106 through a signal line 106a. The demodulator 126 carries out the V.21 demodulation operation to supply a demodulated data to the control circuit 142 through a signal line 126a.

The V.27 ter or V.29 demodulator 128 is for carrying out a demodulation operation according to V.27 ter or V.29, well-known CCITT standards. The demodulator 128 receives a modulated image signal supplied from the hybrid circuit 106. The demodulator 128 carries out a demodulation operation and supplies a demodulated data to a memory circuit 130 through a signal line 128a.

The memory circuit 130 stores the demodulated data transmitted on the signal line 128a in accordance with the control made by the control circuit 142 through a signal line 142f. The memory circuit 130 transmits the stored data to a decoding circuit 132 through a signal line 130a.

The decoding circuit 132 decodes (MH decoding or MR decoding) the data supplied from the memory circuit 130 through the signal line 130a. The decoding circuit 132 supplies a decoded data to a front side recording circuit 134 and a back side recording circuit 136 through a signal line 132a.

The front side recording circuit 134 receives the demodulated data supplied to the signal line 132a when a signal in the signal level of "1" is supplied to a signal line 142g to record successively by one line on the front side of the recording paper. The front side recording circuit 134 is not operated when a signal in the signal level of "0" is supplied to the signal line 142g.

The back side recording circuit 136 receives the demodulated data supplied to the signal line 132a when a signal in the signal level of "1" is supplied to a signal line 142h to record successively by one line on the back side of the recording paper. The back side recording circuit 136 is not operated when a signal in the signal level of "0" is supplied to the signal line 142h.

A transmission button 138 for binding sheet is a transmission button depressed when a sheet of paper with a hole punched for binding is to be transmitted. When being depressed, the button 138 supplies depression pulses to a signal line 138a.

A transmission lamp 140 for binding sheet is a lamp that is turned on when a sheet of paper with a hole punched for binding is to be transmitted. The transmission lamp for binding sheet 140 is turned off when clear pulses are generated on a signal line 142i. In this way, the transmission lamp 140 for binding sheet is alternatively turned on and off in response to filing selection button depression pulses on the signal line 138a. The transmission lamp 140 for binding sheet supplies to a signal line 140a a signal in the signal level of "0" when it is turned on, and supplies to the signal line 140a a signal in the signal level of "1" when it is turned off.

The control circuit 142 mainly carries out the following control in the facsimile device according to this embodiment. In this embodiment, the control circuit 142 notifies a transmitter that a receiver is capable of recording on both sides of the recording paper. The transmitter indicates to the receiver whether the perfect printing is to be made. The transmitter is capable of transmitting with the reading position of the original shifted by an arbitrary length. The transmitter transmits with the reading position of the original shifted according to information on one side/both sides of the original and recording on one side/recording on both sides. More specifically, the transmitter does not shift the reading position on the original when reading of information on both sides and recording of information on both sides are selected. In addition, the reading position is not shifted to read information on one side and record information on one side. Further, the reading position of an odd page is not shifted while the reading position of an even page is shifted rightward by, for example, 8 mm, i.e., the image is shifted leftward by 8 mm to read information on one side and record information on both sides. In addition, the reading position for the front side of the original is not shifted while the reading position for the back side of the original is shifted leftward by, for example, 8 mm, i.e., the image is shifted rightward by 8 mm to read information on both sides and record information on one side.

FIGS. 16 through 19 are flow charts illustrating operation of the second embodiment.

At step S452, a signal in the signal level of "0" is supplied to the signal line 142a to turn off a connect modem to line (CML). At step S454, a signal in the signal level of "0" is supplied to the signal line 142c to set the status not to read information on the front side of the original. At step S456, a signal in the signal level of "0" is supplied to the signal line 142d to set the status not to read information on the back side of the original.

At step S458, a signal in the signal level of "0" is supplied to the signal line 142g to set the status not to record information on the front side of the recording paper. At step S460, a signal in the signal level of "0" is supplied to the signal line 142h to set the status not to record information on the back side of the original. At step S462, the clear pulses are supplied to the signal line 142i to turn off the transmission lamp 140 for binding sheet.

At the step S464, it is determined whether facsimile transmission is selected. If the facsimile transmission is selected, step S468 follows. When the facsimile transmission is not selected, step S466 is executed. This step S466 carries out other processing.

Step S468 supplies a signal in the signal level of "1" is supplied to the signal line 142a to turn on the CML. Step S470 carries out pre-procedures.

Subsequently, at step S472, it is determined whether the receiver is capable of recording information on both sides of the recording paper in accordance with the information notified by the mating device during the pre-procedures. If the perfect recording is possible, step S474 follows. If the perfect recording is impossible, step S476 is executed.

At the step S474, it is determined whether the original is the perfect information. If the original is the perfect information, step S482 follows. If the original is the one-side information, step S494 is carried out. On the other hand, at the step S476, it is determined whether the original is the perfect information. If the original is the perfect information, step S488 follows. If the original is the one-side information, step S478 is executed.

The step S478 indicates, during the remaining pre-procedures, to perform recording on one side of the recording paper and notifies that it is the one-side information. Subsequently, step S480 supplies a signal in the signal level of "1" to the signal line 142c to read the front side of the original. Then, step S498 is carried out.

The step S482 indicates, during the remaining pre-procedures, to perform recording on both sides of the recording paper and notifies that it is the perfect information. Subsequently, step S484 supplies a signal in the signal level of "1" to the signal line 142c to read the front side of the original. Further, step S486 supplies a signal in the signal level of "1" to the signal line 142d to read the back side of the original. Then step S502 follows.

The step S488 indicates, during the remaining pre-procedures, to perform recording on one side of the recording paper and notifies that it is the perfect information. Subsequently, step S490 supplies a signal in the signal level of "1" to the signal line 142c to read the front side of the original. Further, step S492 supplies a signal in the signal level of "1" to the signal line 142d to read the back side of the original. Then, step S506 follows.

The step S494 indicates, during the remaining pre-procedures, to perform recording on both sides of the original and notifies that it is the one-side information. Subsequently, step S496 supplies a signal in the signal level of "1" to the signal line 142c to read the front side of the original. Then step S510 is carried out.

The step S498 reads only the front side of the original upon reading and transmitting the image signal. In this event, the step S498 transmits at the following reading position. For example, if the original has a size of A4, the step S498 transmits successively data indicative of 4 mm white, data indicative of the 208 mm center of the original and data indicative of 4 mm white. If the original has a size of B4, the step S498 transmits successively data indicative of 1 mm white, data indicative of the 254 mm center of the original and data indicative of 1 mm white. Then post-procedures are carried out at step S500 to return to the step S452.

At the step S502, the front and the back sides of the original is read at the same position as those described at the step S498 for reading and transmitting the image signal. Step S504 performs post-procedures to return to the step S452.

At the step S506, the front side of the original is read at the same position as those described at the step S498 for reading and transmitting the image signal. The back side of the original is read as follows. For example, if the original has a size of A4, the step S506 transmits successively data indicative of 11 mm white from the left end and data indicative of the remaining 205 mm, i.e., a portion between 12 mm and 216 mm from the left end of the original. If the original has a size of B4, the step S506 transmits successively data indicative of 7.5 mm white and data indicative of 1 mm the remaining 248.5 mm, i.e., a portion between 7.6 mm to 256 mm from the left end of the original. Then post-procedures are carried out at step S508 to return to the step S452.

At the step S510, the odd pages of the original are read at the same position as those described at the step S498 for reading and transmitting the image signal. The even pages of the original are read as follows. For example, if the original has a size of A4, the step S510 transmits successively data corresponding to a portion between 5 mm to 205 mm from the left end of the original and data indicative of 11 mm white. If the original has a size of B4, the step S510 transmits successively data corresponding to a portion between 8.5 mm and 248.5 mm from the left end of the original and data indicative of 7.5 mm white. Then post-procedures are carried out at step S512 to return to the step S452.

The above mentioned second embodiment has thus been described in conjunction that the reading position is controlled regardless of presence or absence of the punched hole for binding in the original to be transmitted. However, as a modification of the second embodiment, the reading position may be controlled only when an original with the punched hole(s) for binding is to be transmitted while the original having no punched hole may be read with the center thereof being used as a reference point. More specifically, the reading position may be controlled only when the transmission lamp 140 for binding sheet is turned on. When the transmission lamp 140 for binding sheet is turned off, the original may be read with the center thereof being used as a reference. FIG. 20 illustrates the portion of operation that is different from those described in the above mentioned second embodiment (FIGS. 16 through 19).

First, step S520 corresponds to the above mentioned step S492. At step S522, a signal on the signal line 140a is entered to determine whether the transmission lamp 140 for binding sheet is turned on. If the lamp 140 is turned on, step S524 (S506) follows to control the reading position. If the lamp 140 is turned off, step S526 (S502) is carried out to read the original with the center thereof as the center.

Step S528 corresponds to the above mentioned step S496. At step S530, a signal on the signal line 140a is entered to determine whether the transmission lamp 140 for binding sheet is turned on. If the lamp 140 is turned on, step S532 (S510) follows to control the reading position. If the lamp 140 is turned off, step S534 (S498) is carried out to read the original with the center thereof as the center.

In this modification, indication that the binding sheet is transmitted is made by an operator. However, the device itself may automatically determine whether the original is the binding sheet. To achieve this, information on the above mentioned signal lines 114a, 114b, 116a and 116b are entered to determine whether the original is the binding sheet. More specifically, only change is that the control at the steps S522 and S530 in FIG. 20 enters information on the signal lines 114a, 114b, 116a and 116b are entered to determine whether the original is the binding sheet.

In addition, the detecting circuits 114 and 116 may be used for determining whether the original is the binding sheet. In such a case, the reading position may be controlled in accordance with the size of the area where the punched hole for binding occupies. Further, the reading position may be adjusted on the basis of the size of the hole that the transmitting side requires. In such a case, the size of the hole may be notified from the receiver to the transmitter during the pre-procedures.

Alternatively, an image read by the reading circuits 110 and 112 without being shifted may be written in a memory (not shown) with the position of the image being shifted. By means of reading this image out of the memory, it becomes possible to achieve similar processing and effects to the case where the reading position read by the reading circuits 110 and 112 is shifted upon reading. Further, the read image may be written in a memory (not shown) without being shifted and read out of the memory with the position of the image being shifted.

Next, a third embodiment of the present invention is described.

To transmit perfect originals through a conventional facsimile apparatus capable of reading information only on one side of the original, information on the front side is first transmitted and then information on the back side is transmitted. Along with this transmission, transmission of the perfect originals is notified to a person at the receiving side, which may be made by means of transmitting a paper written that on it or by means of a telephone.

In particular, recent improvement on a perfect recording function of a copying machine causes increase of perfect original. Even an official document may contain information printed on both sides of the original. However, a conventional method to transmit the front side independently of the back side makes a receiving person rearrange the order of the pages of the received information. This is relatively troublesome work. In addition, a sender information (calling number, date, time, from where to where, etc.) may contain information regarding a page number. However, the page number printed on either side of the recording paper becomes useless when the receiving person rearrange the order of the pages. Such "incorrect" page number may sometimes cause confusion.

With this respect, the third embodiment is directed to provide a facsimile apparatus that is capable of transmitting a perfect original effectively with such a structure that allows reading of information on one side.

Figure 21B:
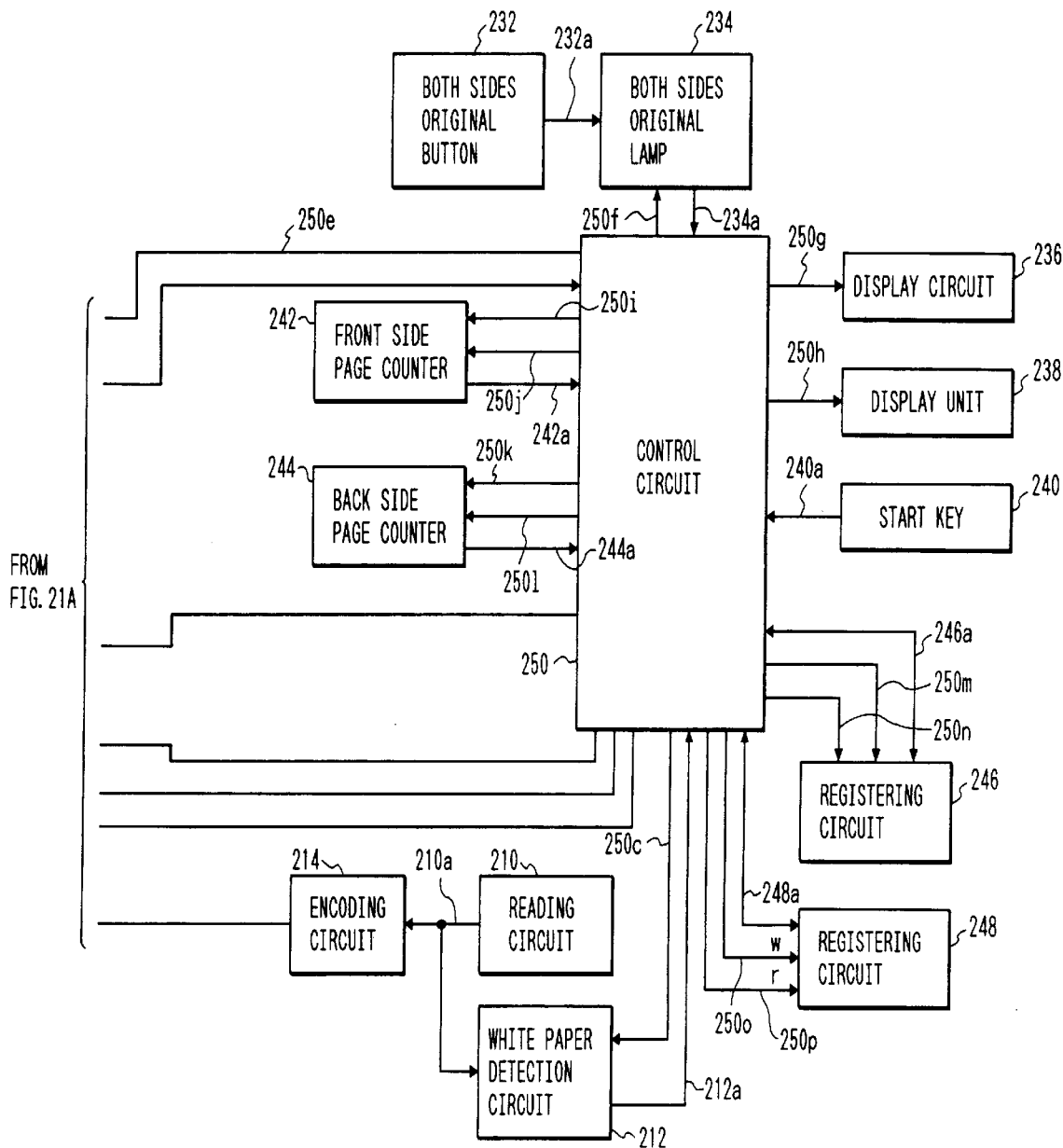
FIG. 21, comprised of FIGS. 21A and 21B, is a block diagram showing a third embodiment of the present invention.
Figure 22B:
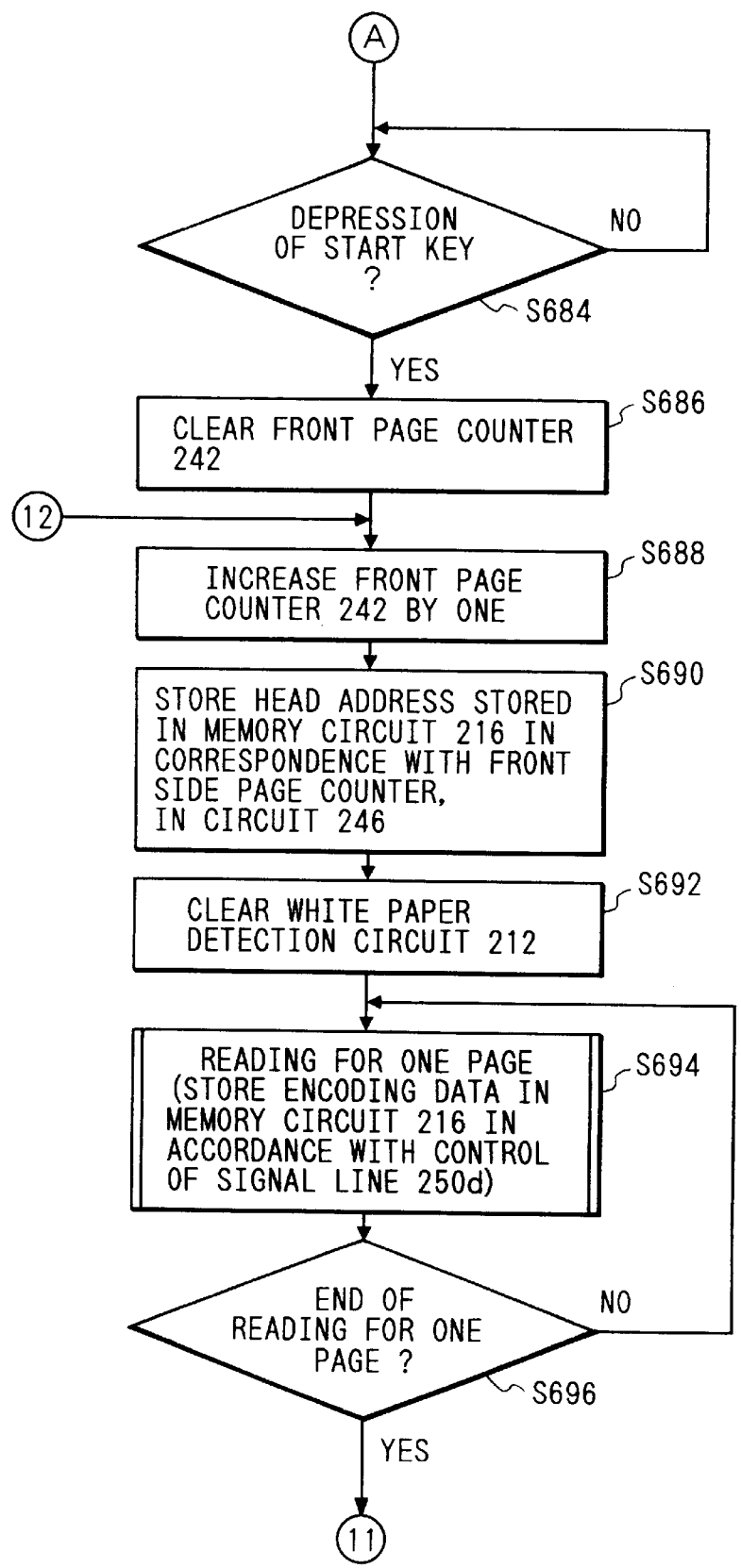
FIG. 22, comprised of FIGS. 22A and 22B, is a flow chart illustrating operation of the third embodiment.
Figure 23:
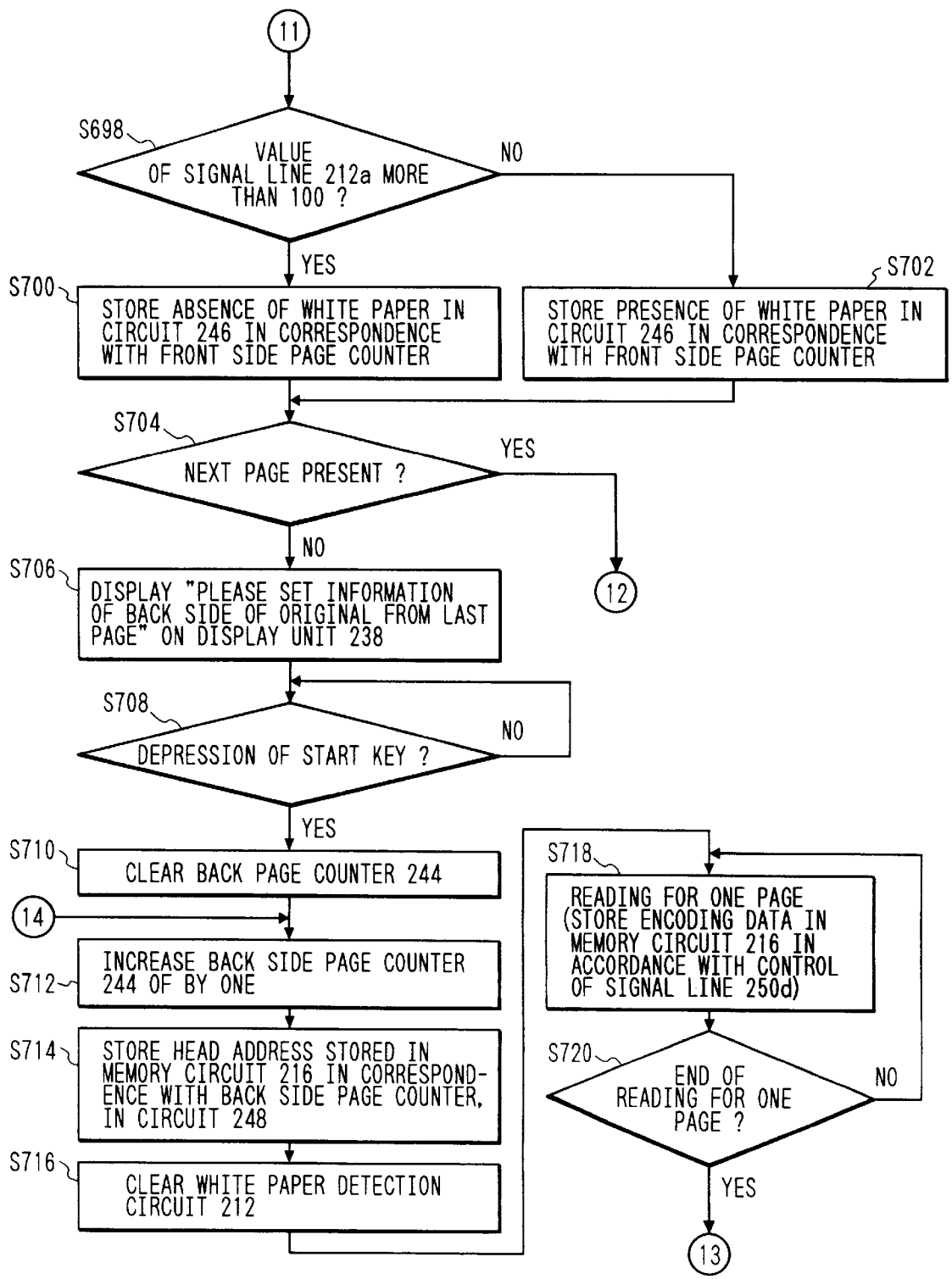
FIG. 23 is a flow chart illustrating operation of the third embodiment.
Figure 24:
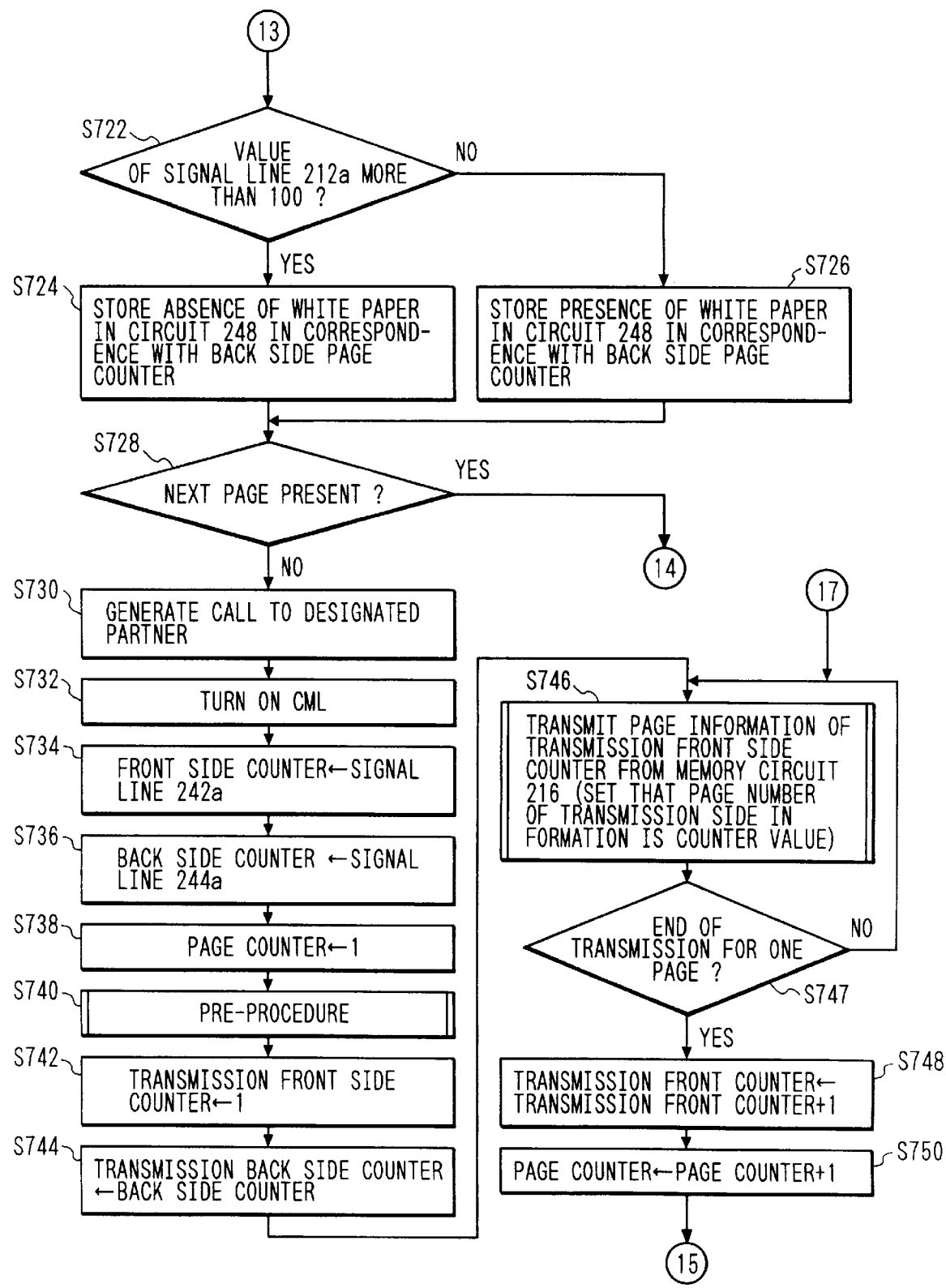
FIG. 24 is a flow chart illustrating operation of the third embodiment.
Figure 25:
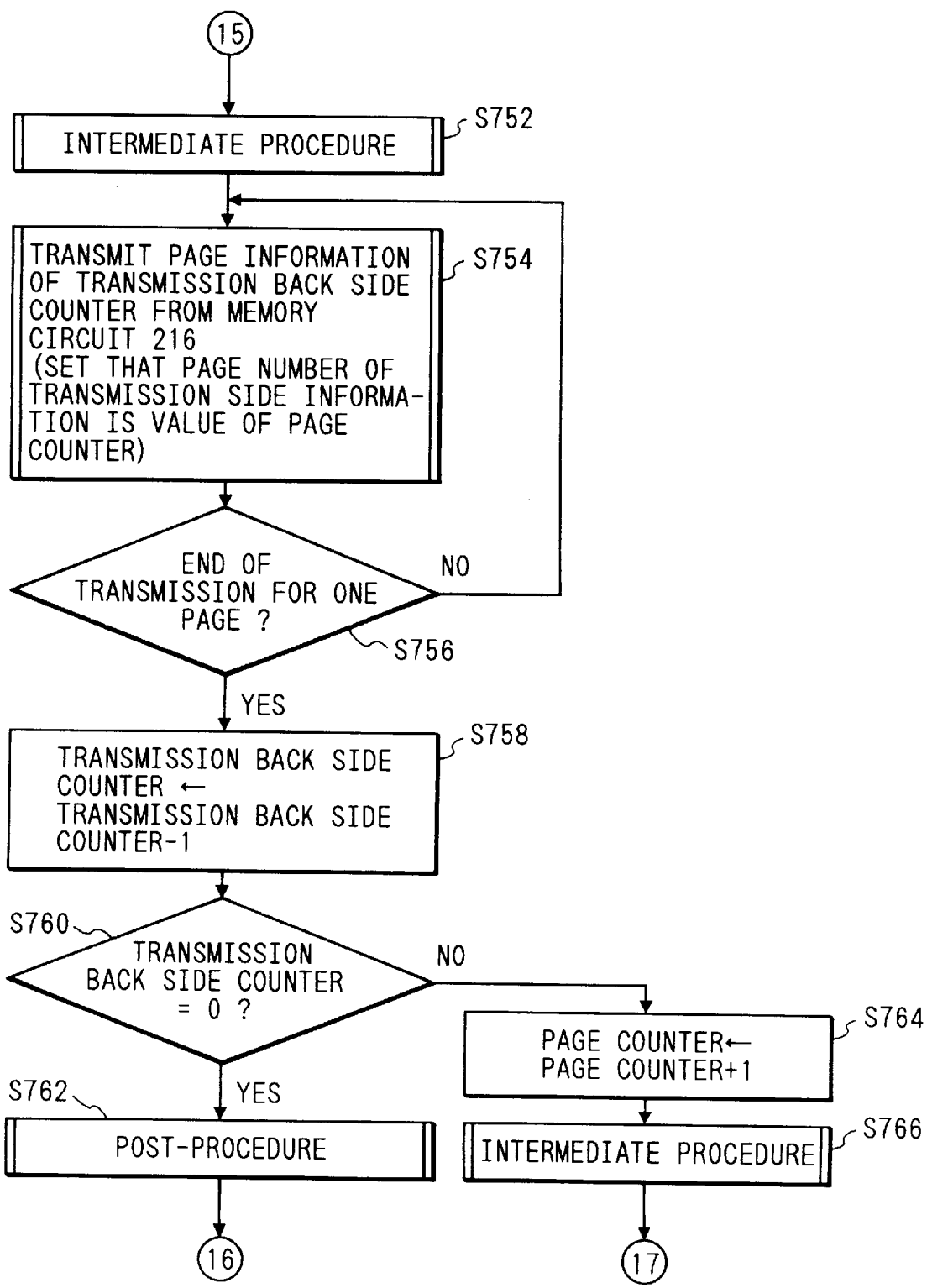
FIG. 25 is a flow chart illustrating operation of the third embodiment.

FIGS. 21A and 21B are block diagrams showing this third embodiment.

A network control unit (NCU) 202 is provided for connecting a terminal of a telephone line, controlling connection of telephone switching network, switching data communication paths and holding a loop, thereby allowing use of a telephone network for data communication or the like. In addition, the NCU 202 is capable of connecting a telephone line 202*a* to a telephone 204 when a signal level (a signal line 250*a*) supplied from a control circuit 250 is in "0" while connecting the telephone line 202*a* to a facsimile apparatus when the signal level is in "1". In a normal condition, the telephone line 202*a* is connected to the telephone 204.

A hybrid circuit 206 is provided for separating a transmitting signal from a receiving signal, transmitting a transmitted signal supplied from an adding circuit 16 to the telephone line 202*a* through the NCU 202, receiving through the NCU 202 a signal supplied from another apparatus, and transmitting the received signal to a V.29 demodulator 226 and a V.21 demodulator 224 through a signal line 206*a*.

A V.21 modulator 208 is a modulator for carrying out a modulation operation according to V.21, a well-known CCITT standard. The V.21 modulator 208 modulates a procedure signal (signal line 250*b*) supplied from the control circuit 250 to transmit the same through a signal line 208*a* to the adding circuit 222.

A reading circuit 210 is provided for reading successively image signals for one line in a main scanning direction of a transmitted original, creating a signal sequence of binary data indicative of white and black, and transmits the data through a signal line 210*a* to a white paper detection circuit 212 and an encoding circuit 214. The reading circuit 210 comprises an image pick-up cell such as a charged-coupled device (CCD) and an optical system.

The white paper detection circuit 212 receives a read data supplied to the signal line 210*a* after appearance of clear pulses on a signal line 250*c*. If the white paper detection circuit 212 detects only black dots of smaller in number than predetermined dots (e.g., 100 dots) in one page, this information is determined as a white paper. The white paper detection circuit 212 produces a signal in the signal level of "1" through a signal line 212*a* when it detects presence of a white paper. On the other hand, the white paper detection circuit 212 produces a signal in the signal level of "0" when it determines that the original is not a white paper.

The encoding circuit 214 receives a read data transmitted on the signal line 210*a* and carries out an encoding operation (MH coding or MR coding) to transmit the coded data through a signal line 214*a*.

A memory circuit 216 stores the coded data transmitted on the signal line 214*a* in accordance with the control made by the control circuit 250 through a signal line 250*d*. The memory circuit 216 transmits the stored data to a decoding/encoding circuit 218 and a decoding circuit 228 through a signal line 216*a*.

The decoding/encoding circuit 218 receives and decodes the data transmitted on the signal line 216*a* in accordance with the control made by the control circuit 250 through a signal line 250*q*. The decoding/encoding circuit 218 carries out linear density conversion and size conversion to produce a coded data through a signal line 218*a*.

A V.27 ter or V.29 modulator 220 receives the coded data supplied through the signal line 118*a*. The V.27 ter or V.29 modulator 220 carries out a modulation operation according to V.27 ter (differential phase modulation) or V.29 (orthogonal modulation), well-known CCITT standards to supply the modulated data to the adding circuit 222 through a signal line 220*a*.

The adding circuit 222 is a circuit for adding the outputs of the modulators 208 and 220. An output of the adding circuit 222 is supplied to the hybrid circuit 206.

A V.21 demodulator 224 is for carrying out a demodulation operation according to V.21, a well-known CCITT standard. The demodulator 224 receives a procedure signal supplied from the hybrid circuit 206 through a signal line 206*a*. The demodulator 224 carries out the V.21 demodulation operation to supply a demodulated data to the control circuit 250 through a signal line 224*a*.

The V.27 ter or V.29 demodulator 226 is for carrying out a demodulation operation according to V.27 ter or V.29, well-known CCITT standards. The demodulator 226 receives a modulated image signal supplied from the hybrid circuit 206. The demodulator 226 carries out a demodulation operation and supplies a demodulated data to a decoding circuit 228 through a signal line 226*a*.

The decoding circuit 228 receives a signal transmitted on the signal line 226*a* when a signal in the signal level of "0" is supplied from the control circuit 250 to a signal line 250*e*. On the other hand, the decoding circuit 228 receives a signal transmitted on the signal line 216*a* when a signal in the signal level of "1" is supplied from the control circuit 250 to the signal line 250*e*. The decoding circuit 228 then decodes (MH decoding or MR decoding) data and supplies a decoded data to a recording circuit 230 through a signal line 228a.

The recording circuit 230 is a circuit that receives the data transmitted on the signal line 228a to record information successively by one line.

A both sides original button 232 is a button used when perfect information is to be transmitted. When being depressed, the both sides original button 232 supplies depression pulses to a signal line 232a.

A both sides original lamp 234 is a lamp that is turned on when perfect information is to be transmitted. The both sides original lamp is turned off when clear pulses are generated on a signal line 250f. In this way, the both sides original lamp 234 is alternatively turned on and off in response to filing selection button depression pulses on the signal line 232a. The both sides original lamp 234 supplies to a signal line 234a a signal in the signal level of "0" when it is turned on, and supplies to the signal line 234a a signal in the signal level of "1" when it is turned off.

A display circuit 236 is provided for displaying that the number of the front pages is different from the number of the back pages, if any, upon reading information on both sides of the perfect original. The display circuit 236 displays none when a signal in the signal level of "0" is supplied from the control circuit 250 to the signal line 250g while it displays the above identification when a signal in the signal level of "1" is present on the signal line 250f.

A display unit 238 receives a signal supplied from the control circuit through a signal line 250h and displays. In this event, the display unit 238 displays upon transmitting a perfect original. For example, the display unit 238 displays that "SET FRONT PAGE OF THE ORIGINAL FROM THE FIRST ONE" or "SET BACK PAGE OF THE ORIGINAL FROM THE LAST ONE".

A start key 240 is used for indicating to start transmission operation or the like. When being depressed, the key 240 supplies depression pulses to a signal line 240a.

A front side page counter 242 is for counting the number of the front pages. The counter 242 is initialized to zero in response to clear pulses on a signal line 250i. After initialization, a counter value of the counter 242 is incremented by one in response to an inclement pulse on a signal line 250j. The counter value is supplied to a signal line 242a.

A back side page counter 244 is for counting the number of the front pages. The counter 244 is initialized to zero in response to clear pulses on a signal line 250k. After initialization, a counter value of the counter 244 is incremented by one in response to an inclement pulse on a signal line 250l. The counter value is supplied to a signal line 244a.

A registering circuit 246 is a circuit for registering information whether the original is a white paper as well as a head address stored in the memory circuit 216 in correspondence with the front side page counter. To register in this registering circuit 246, a signal line 246a is supplied with the counter value (such as 01) on the front pages, a space, the head address (100000H) stored in the memory circuit 216, a space, information whether the original is a white paper (0 if not the white paper, and 1 if the white paper), following which write pulses are supplied to a signal line 250m. On the contrary, to read data registered in the registering circuit 246, the signal line 246a is supplied with the counter value (such as 01) on the front pages, following which reading pulses are supplied to a signal line 250n. In response to this, the registering circuit 246 supplies to the signal line 246a the head address (such as 100000H) stored in the memory circuit 216 that is registered in correspondence with the counter value on the front pages, a space and information (such as 0) whether the original is a white paper.

A registering circuit 248 is a circuit for registering information whether the original is a white paper as well as a head address stored in the memory circuit 216 in correspondence with the back side page counter. To register in this registering circuit 248, a signal line 248a is supplied with the counter value (such as 10) on the back pages, a space, the head address (234000H) stored in the memory circuit 216, a space, information whether the original is a white paper (0 if not the white paper, and 1 if the white paper), following which write pulses are supplied to a signal line 250o. On the contrary, to read data registered in the registering circuit 248, the signal line 248a is supplied with the counter value (such as 10) on the back pages, following which reading pulses are supplied to a signal line 250p. In response to this, the registering circuit 248 supplies to the signal line 248a the head address (such as 234000H) stored in the memory circuit 216 that is registered in correspondence with the counter value on the back pages, a space and information (such as 1) whether the original is a white paper.

The control circuit 250 mainly carries out the following control in the facsimile apparatus capable of reading information only on one side of the original according to this embodiment.

First, an operator indicates to read perfect originals by means of turning on the both sides original lamp 234, and selects a called destination by means of, for example, depressing an automated dialing key. In response to this, the display unit 238 displays that "SET FRONT PAGE OF THE ORIGINAL FROM THE FIRST ONE". The operator puts the originals on an original holder with the front pages being directed to be read by reading system. Then, the operator depresses the start key 240. In response to this depression of this start key 240, the facsimile apparatus begins reading of the front page of the original. The counter 242 is used for counting the number of pages. In addition, the registering circuit 246 memorizes the head address stored in the memory circuit 216 in correspondence with the counter value of the front side page counter and a check result of the white paper detecting circuit 212.

On completion of reading of all front pages of the original, the display unit 238 displays that "SET BACK PAGE OF THE ORIGINAL FROM THE LAST ONE". The operator puts the originals on the original holder with the back pages being directed to be read by reading system. Then, the operator depresses the start key 240. In response to this depression of this start key 240, the facsimile apparatus begins reading of the back page of the original. The counter 244 is used for counting the number of pages. In addition, the registering circuit 248 memorizes the head address stored in the memory circuit 216 in correspondence with the counter value of the back side page counter and a check result of the white paper detecting circuit 212.

After completion of reading of both front and back sides of the original, the facsimile apparatus transmits to the destination in the order of the pages of the perfect original. In other words, the facsimile apparatus alternatively transmits the front page and the back page. The page number is added the recording paper as the sender information according to the order of transmission rather than the order of reading.

FIGS. 22A through 25 are flow charts illustrating operation of the third embodiment.

Step S662 supplies a signal in the signal level of "0" to the signal line 250a to turn off the CML. Step S664 supplies a signal in the signal level of "0" to the signal line 250e to set the decoding circuit 228 to receive the signal on the signal line 226B. Step S666 supplies clear pulses to the signal line 250f to turn off the both sides original lamp 234.

Subsequently, at step S668, it is determined whether facsimile transmission is selected. If the facsimile transmission is selected, step S672 follows, and otherwise, step S670 is executed to carry out other processing.

Step S672 receives a signal on the signal line 234a to determine whether the both sides original lamp 234 is turned on. If the lamp 234 is turned on, step S682 follows. If not, step S674 is executed, following which only one side of the original is directly transmitted.

At the step S674, the CML is turned on by means of supplying a signal in the signal level of "1" to the signal line 250a. Step S676 carries out pre-procedures. At step S678, one side of the original is read and transmitted directly. Step S680 carries out post-procedures.

At step S682, a data indicating that "SET FRONT PAGE OF THE ORIGINAL FROM THE FIRST ONE" is supplied to the signal line 250h to display it on the display unit 238. The step S684 receives the signal on the signal line 240a to determine whether the start key 240 is depressed. If the start key 240 is depressed, step S686 is executed.

At the step S686, the clear pulses are transmitted through the signal line 250i to clear the counter value of the front side page counter 242. At step S688, the increment pulse is transmitted through the signal line 250j to increment the counter value of the front side page counter by one.

At step S690, the registering circuit 246 memorizes the head address of the page information in question stored in the memory circuit 216 in correspondence with the front side page counter 242. At step S692, the clear pulses are transmitted through the signal line 250c to clear the white paper detection circuit 212.

At step S694, reading of one page is carried out. In this event, the coded data is stored in the memory circuit 216 in accordance with the control on the signal line 250d.

At step S696, it is determined whether reading of one page is completed. If completed, step S698 is carried out, and otherwise, step S694 is executed again.

At the step S698, it is determined whether the value on the signal line 212a exceeds one hundred, i.e., whether it is not the white paper. If the value exceeds 100 dots, step S700 follows. If not, step S702 is executed.

At the step S700, what it is not the white paper is registered in the registering circuit 246 in correspondence with the front side page counter. On the other hand, at the step S702, what it is the white paper is registered in the registering circuit 246 in correspondence with the front side page counter.

Subsequently, at step S704, it is determined whether there is a subsequent page. If the subsequent page is present, step S688 is again executed. If there is no subsequent page left, step S706 is carried out.

At the step S706, a data indicating that "SET BACK PAGE OF THE ORIGINAL FROM THE LAST ONE" is supplied to the signal line 250h to display it on the display unit 238.

The step S708 receives the signal on the signal line 240a to determine whether the start key 240 is depressed. If the start key 240 is depressed, step S710 is executed.

At the step S710, the clear pulses are transmitted through the signal line 250k to clear the counter value of the back side page counter 244. At step S712, the increment pulse is transmitted through the signal line 250l to increment the counter value of the back side page counter by one.

At step S714, the registering circuit 246 memorizes the head address of the page information in question stored in the memory circuit 216 in correspondence with the front side page counter 244. At step S716, the clear pulses are transmitted through the signal line 250c to clear the white paper detection circuit 212.

At step S718, reading of one page is carried out. In this event, the coded data is stored in the memory circuit 216 in accordance with the control on the signal line 250d.

At step S720, it is determined whether reading of one page is completed. If completed, step S722 is carried out, and otherwise, step S718 is executed.

At the step S722, it is determined whether the value on the signal line 212a exceeds one hundred, i.e., whether it is not the white paper. If the value exceeds 100 dots, step S724 follows. If not, step S726 is executed.

At the step S724, what it is not the white paper is registered in the registering circuit 248 in correspondence with the back side page counter. On the other hand, at the step S726, what it is the white paper is registered in the registering circuit 248 in correspondence with the back side page counter.

Subsequently, at step S728, it is determined whether there is a subsequent page. If the subsequent page is present, step S712 is again executed. If there is no subsequent page left, step S730 is carried out.

The step S730 calls the designated destination. At step S732, a signal in the signal level of "1" is supplied to the signal line 250a to turn on the CML. At step S734, a value on the signal line 242a is entered and set into the front side page counter 242. At step S736, a value on the signal line 244a is entered and set into the back side page counter 244. At step S738, 1 is set into a page counter used for counting the number of pages of the sender information or the number of transmitted pages.

Subsequently, step S740 carries out pre-procedures. At steps S742 and S744, 1 is set into a transmission front side counter and the value of the back side page counter is set into a transmission back side counter to transmit alternatively from the first value of the page counter for the front pages and from the last value of the page counter for the back pages because the front pages are read from the first page and the back pages are read from the last page.

At step S746, page information of the transmission front side counter is transmitted from the memory circuit 216 by the control on the signal line 250d. In this event, the number of pages of the sender information is the value of the page counter. In addition, it is matched with a mode of the receiver by the control on the signal line 250q.

At step S747, it is determined whether the information for one page has been transmitted. When transmission of the information for one page is completed, step S748 is executed. If the step S747 determines that the transmission for one page has not completed yet, the step S746 is again executed.

At step S748, the value of the transmission front side counter is incremented by one. At step S750, the value of the page counter is incremented by one. Then, step S752 carries out intermediate procedures. At step S754, the page information of the transmission back side counter is transmitted from the memory circuit 216 in accordance with the control on the signal line 250d. In this event, the number of pages of the sender information is the value of the page counter. In addition, it is matched with a mode of the receiver by the control on the signal line 250q.

At step S756, it is determined whether the information for one page has been transmitted. When transmission of the information for one page is completed, step S758 is executed. If the step S756 determines that the transmission for one page has not completed yet, the step S754 is executed.

At the step S758, the value of the transmission back side counter is decremented by one. At step S760, it is determined whether the transmission back side counter is equal in value to zero. When the counter value of the transmission back side counter is equal to zero, step S762 is carried out. If not, step S764 is carried out.

At the step S762, post-procedures are performed and then the control returns to the step S662. At the step S764, the value of the page counter is incremented by one. Intermediate procedures are performed at step S766, following which the step S764 is executed again to repeat the processing.

In the above mentioned third embodiment, the page number of the sender information matches to the number of transmitted pages. However, as a modification, information indicating that a page is whether for the front side or for the back side may be transmitted along with the page number.

FIG. 26 is a flow chart illustrating a difference from FIGS. 22A through 25 in the operation in such a case.

In this modification, processing at step S770 in FIG. 26 is carried out in place of the above mentioned step S746. In addition, processing at step S772 in FIG. 26 is carried out in place of the above mentioned step S754.

First, at the step S770, the page information of the transmission front side counter is transmitted from the memory circuit 216. In this event, information indicative of the front side is added to the page number of the sender information along with the value of the transmission front side counter.

At the step S772, the page information of the transmission back side counter is transmitted from the memory circuit 216. In this event, information indicative of the back side is added to the page number of the sender information along with the value of the transmission back side counter.

In addition, a difference between the number of the front pages and the number of the back pages leads determination that double transmission is caused in either side. This may be indicated and transmission operation may be interrupted.

FIG. 27 is a flow chart illustrating a difference from FIGS. 22A through 25 in the operation in such a case.

In FIG. 27, step S773 corresponds to the negative result (NO) of the above mentioned step S728. Subsequently, at step S774, it is determined whether the value on the signal line 242a (the number of the front pages) coincides with the value on the signal line 244a (the number of the back pages). If they are equal to each other, step S775 (the above mentioned step S730) is carried out to continue transmission. If they are not equal to each other, step S776 is executed.

At the step S776, a signal in the signal level of "1" is transmitted on the signal line 250g to indicate that the numbers of pages of the front and back sides are different from each other. In addition, an alarm is generated. Next, at step S777, a waiting time of 20 seconds is provided. The control returns to the above mentioned step S662 when the stop key 240 is depressed during the waiting time.

After elapsing the 20-second waiting time, a signal in the signal level of "0" is supplied to the signal line 250g at step S778 to delete the display indicating that the numbers of the front and back pages are different from each other. In addition, the alarm is stopped. Next, the control returns to the above mentioned step S662 at step S779.

A white page may be excluded, if any, from the pages to be transmitted.

Figure 28B:
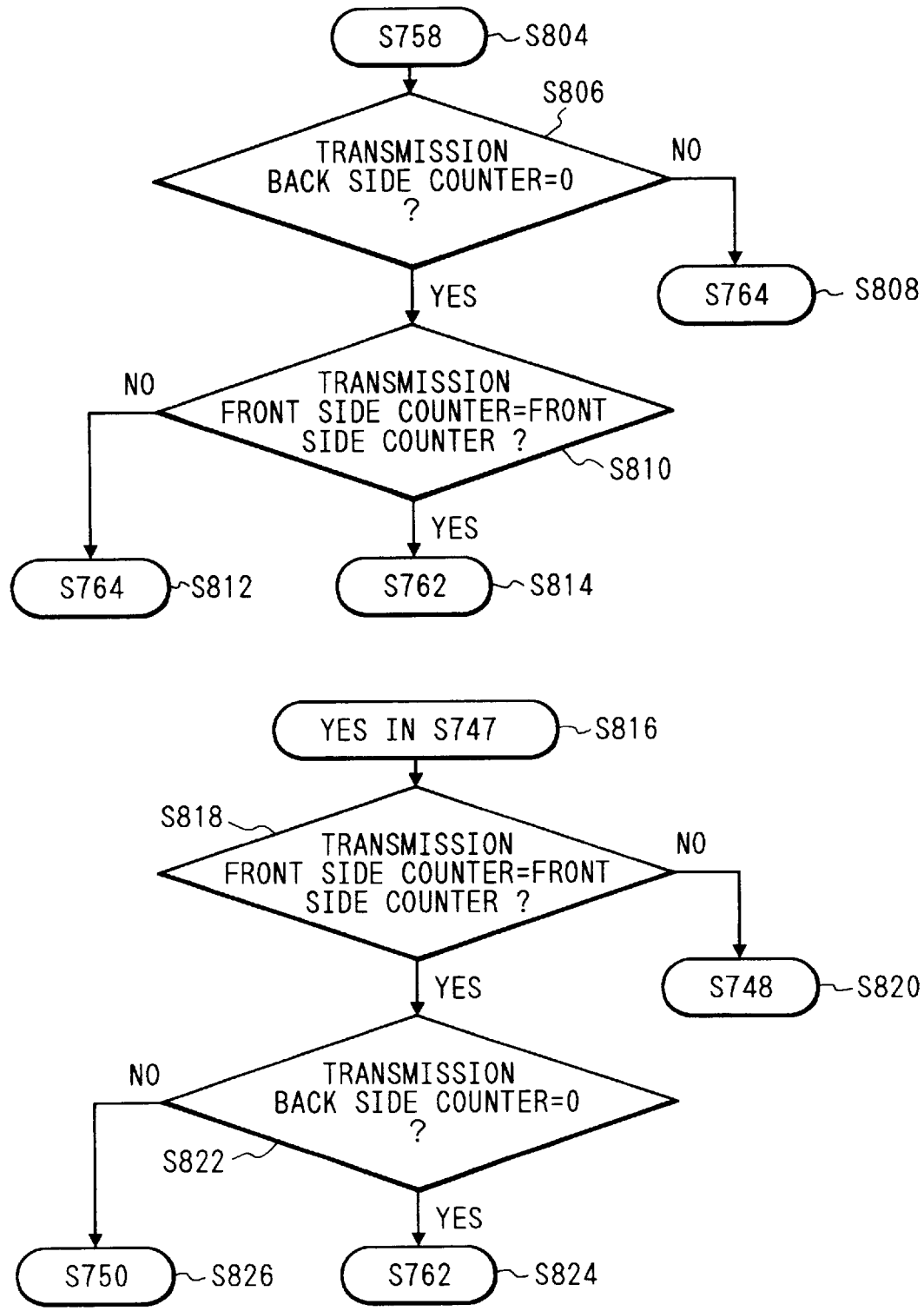
FIG. 28, comprised of FIGS. 28A and 28B, is a flow chart illustrating operation of a third modification of the third embodiment.

FIGS. 28A and 28B are flow charts illustrating a difference from FIGS. 22A through 25 in the operation in such a case.

Step S780 corresponds to the above mentioned step S744. After execution of the processing at the step S744, step S782 is carried out. In addition, the processing at the step S766 proceeds to this step S782.

At the step S782, it is determined whether the counter value of the transmission back side counter is equal to the value of the front side counter. In other words, it is determined whether the information on the front pages is completely transmitted. Coincidence between the values of the transmission front side counter and the front side counter leads to step S792. If they are not equal to each other, step S784 is carried out.

At the step S784, information of the registering circuit 246 is entered to determine whether the page information of the transmission front side counter indicates the white paper. If it indicates the white paper, step S788 is carried out. If not, step S786 (the above mentioned step S746) is carried out.

At the step S788, the transmission front side counter is incremented by one and the control passes to the step S792. After execution of the processing of the above mentioned step S752 at the step S790, the step S792 is carried out.

At the step S792, it is determined whether the counter value of the transmission back side counter is equal to zero. In other words, it is determined whether the information on the back pages is completely transmitted. If the counter value of the transmission back side counter is equal to zero, step S794 is carried out, and otherwise, step S798 is executed.

At the step S794, it is determined whether the counter value of the transmission back side counter is equal to the value of the front side counter. If they are equal to each other, step S796 (the above mentioned step S762) is carried out. If they are not equal to each other, the step S782 is again executed.

At the step S798, information of the registering circuit 248 is entered to determine whether the page information of the transmission back side counter indicates the white paper. If it indicates the presence of the white paper, step S802 is executed to decrement the value of the transmission back side counter by one. The control then returns to the step S782. On the other hand, if it indicates the absence of the white paper, step S800 (the above mentioned step S754) is carried out.

Step S804 corresponds to the above mentioned step S758. Subsequently, at step S806, it is determined whether the counter value of the transmission back side counter is equal to zero. If it is equal to zero, step S810 is executed, and otherwise, step S808 (the above mentioned step S764) is carried out.

At the step S810, it is determined whether the counter value of the transmission front side counter is equal to the value of the front side counter. If they are equal to each other, step S814 (the above mentioned step S762) is carried out. If they are not equal to each other, step S812 (the above mentioned step S764) is carried out.

Step S816 corresponds to the positive result (YES) of the above mentioned step S747. Subsequently, at step S818, it is determined whether the counter value of the transmission front side counter coincides with the value of the front side counter. If they coincides with each other, step S822 is carried out. On the other hand, if they are different from each other, step S820 (the above mentioned step S748) is carried out.

At the step S822, it is determined whether the value of the transmission back side counter is equal to zero. If it is equal to zero, step S824 (the above mentioned step S762) is carried out. On the other hand, if it is not equal to zero, step S826 (the step S750) is executed.

In the above mentioned example, it is considered that the information sorted in the memory is transmitted. However, similar operation and processing makes it possible to apply to copying processing where the information sorted in the memory is recorded on, for example, a plain paper in the order of pages of the perfect original by means of alternatively recording the front and the back pages.

Figure 29:
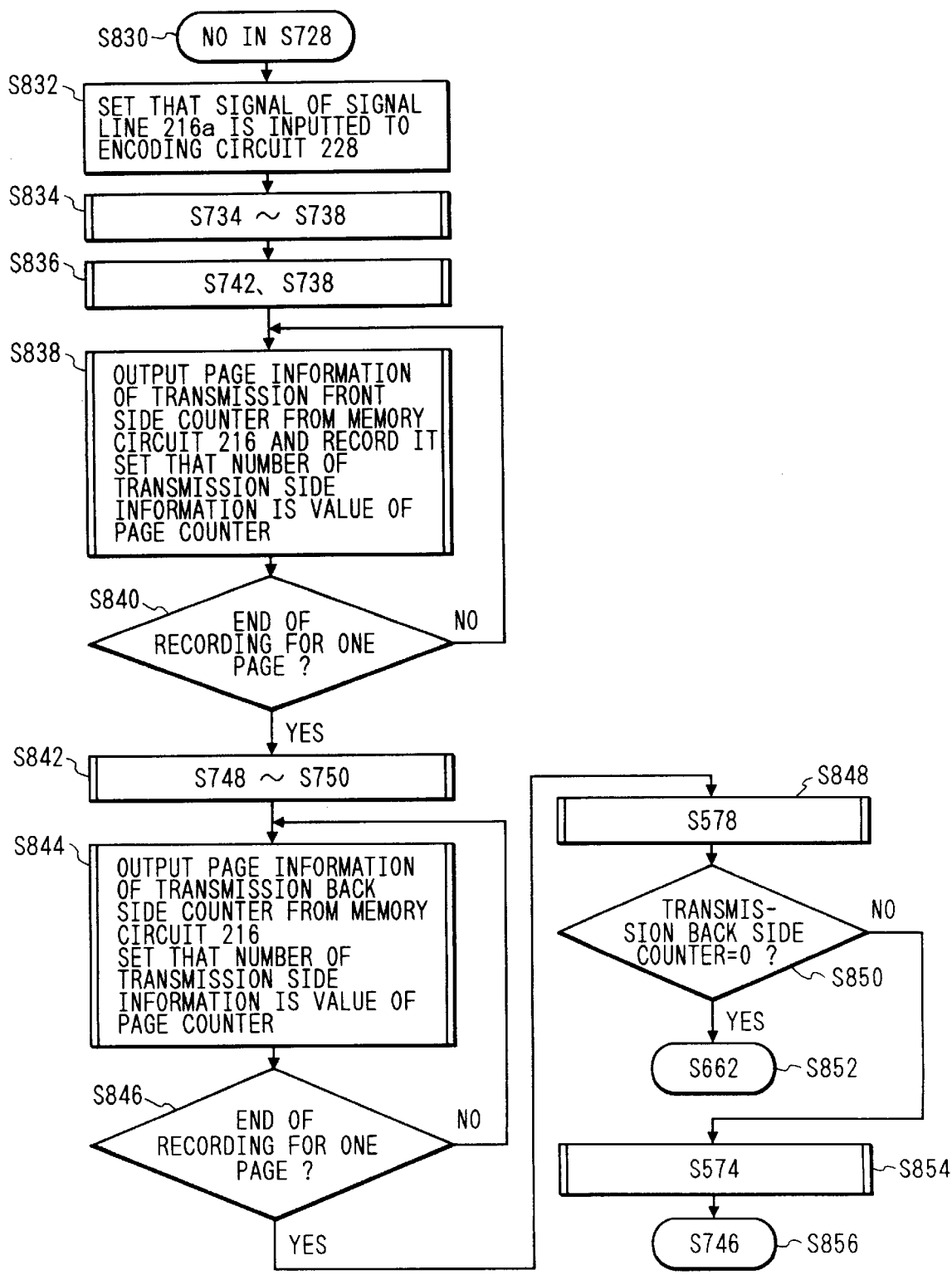
FIG. 29 is a flow chart illustrating operation of a fourth modification of the third embodiment.

FIG. 29 is a flow chart illustrating a difference from FIGS. 22A through 25 in the operation in such a case.

Step S830 corresponds to the negative result (NO) of the above mentioned step S728. Subsequently, at step S832, a signal in the signal level of "1" is supplied to the signal line 250e to set the decoding circuit 228 to receive the signal on the signal line 216a. Then, at step S834, the front page counter 242, the back page counter 244 and the page counter are set through the operation at the above mentioned steps S734 to S738. Next, at step S836, 1 is set to the transmission front side counter and the value of the back side counter 244 is set to the transmission back side counter through the operation at the above mentioned steps S742 and S744.

At step S838, the page information of the transmission front side counter is supplied from the memory circuit 216 and recorded. In this event, the number of the pages of the sender information is the counter value of the page counter. Subsequently, at step S840, it is determined whether recording of one page is completed. If recording of one page is completed, step S842 is executed, and otherwise, the step S838 is again executed.

Step S842 corresponds to the above mentioned steps S748 and S750. Then, at step S844, the page information of the transmission back side counter is supplied from the memory circuit 216 and recorded. The number of pages of the sender information is the counter value of the page counter.

At step S846, it is determined whether recording of one page is completed. If completed, step S848 is carried out, and otherwise, the step S844 is again executed.

At the step S848, the value of the transmission back side counter is decremented by one through the operation at the above mentioned step S758. At step S850, it is determined whether the value of the transmission back side counter is equal to zero. If the value of the transmission back side counter is equal to zero, step S852 (the above mentioned step S662) is carried out. If not, step S854 is executed.

The step S854 corresponds to the above mentioned step S764 where the value of the page counter is incremented by one. The step S856 corresponds to the above mentioned step S746 to proceeds to the processing on the subsequent page.

The above mentioned modifications may be achieved as a combination of the individual modifications as well as the modification corresponding to the above FIGS. 22A through 25. In addition, in the above mentioned embodiment, the white information is also stored in the memory circuit 216 to prevent this information from being transmitted. However, the white information may be eliminated or discarded without being stored in the memory circuit 216.

Next, a fourth embodiment of the present invention is described.

It has been proposed, in a conventional facsimile device that records data on a recording paper of a standard size, to record the data larger in size than the recording paper on both the front and the back sides thereof with the data being reduced at different scales independently in the main and sub scanning directions such that the output result is within the recording paper.

However, in the above mentioned conventional device, the received information may be recorded on the entire width of the recording paper if the recording is made with the received information larger than in size than the recording paper for both the front and back sides being reduced at different scales independently in the main and sub scanning directions. Accordingly, few or no space left for the margin on the recording paper. This makes it impossible to file the recorded output without concealing the information at either side of the paper.

In particular, a plain paper of a standard size is used for PPC recording such as the laser recording. Such paper is superior in storage to the thermal recording papers because no copying operation is required before filing. However, it is not favorable to file as it is the recorded output on the plain paper of the standard size if the information is recorded on the entire length and width of the paper, which makes the significant feature of the plain paper useless.

On the contrary, this problem can be withdrawn in the one-side recording by means of providing a margin for filing. However, the position of the margin is not at the same side if the margin is provided at the left side of the face in the perfect recording. Accordingly, the margin cannot be used for filing.

With this respect, the fourth embodiment is directed to provide a facsimile apparatus that is capable of forming the margin for filing properly in the perfect recording.

Figures 30, 30A:
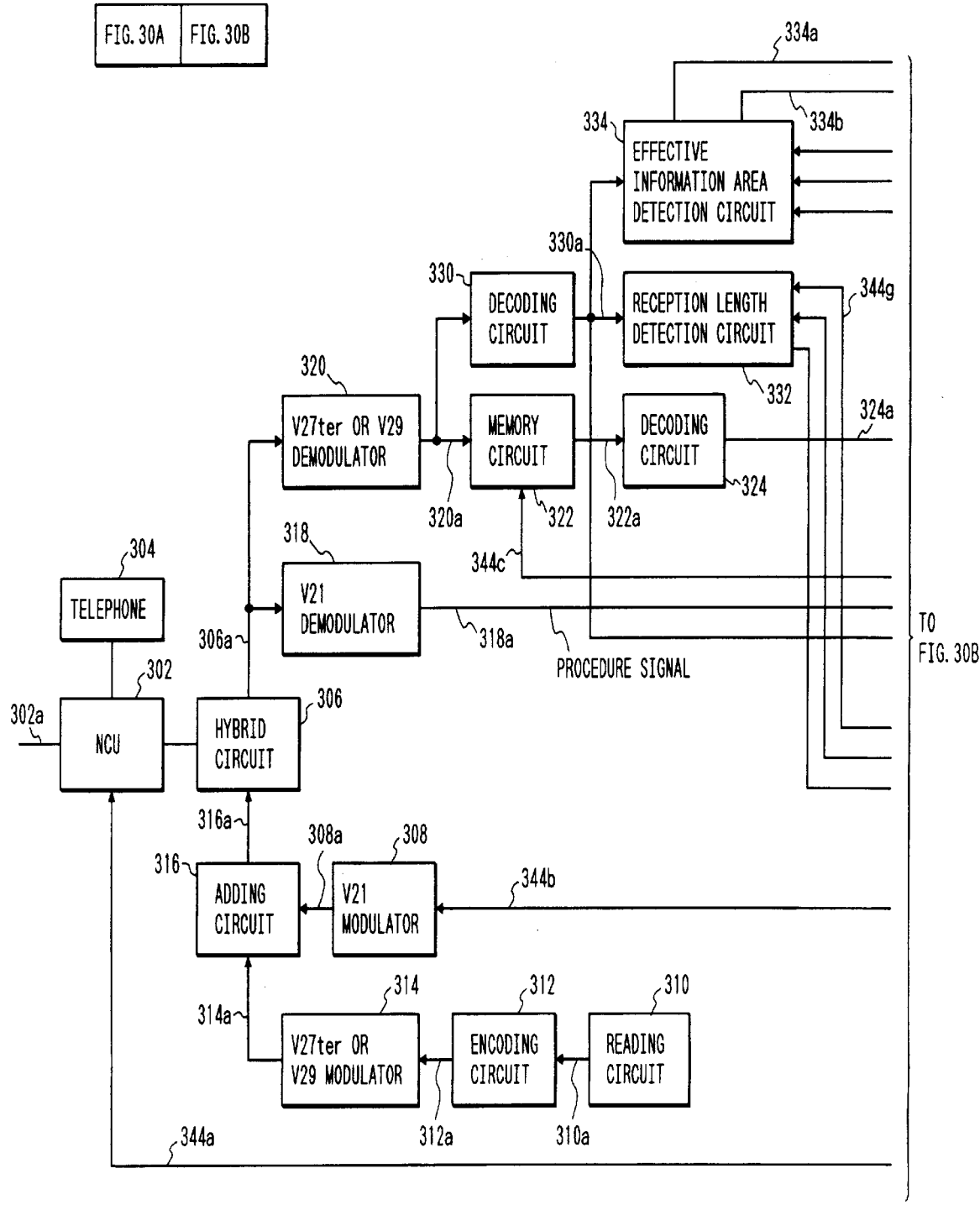
FIG. 30, comprised of FIGS. 30A and 30B, is a block diagram showing a fourth embodiment of the present invention.
Figure 30B:
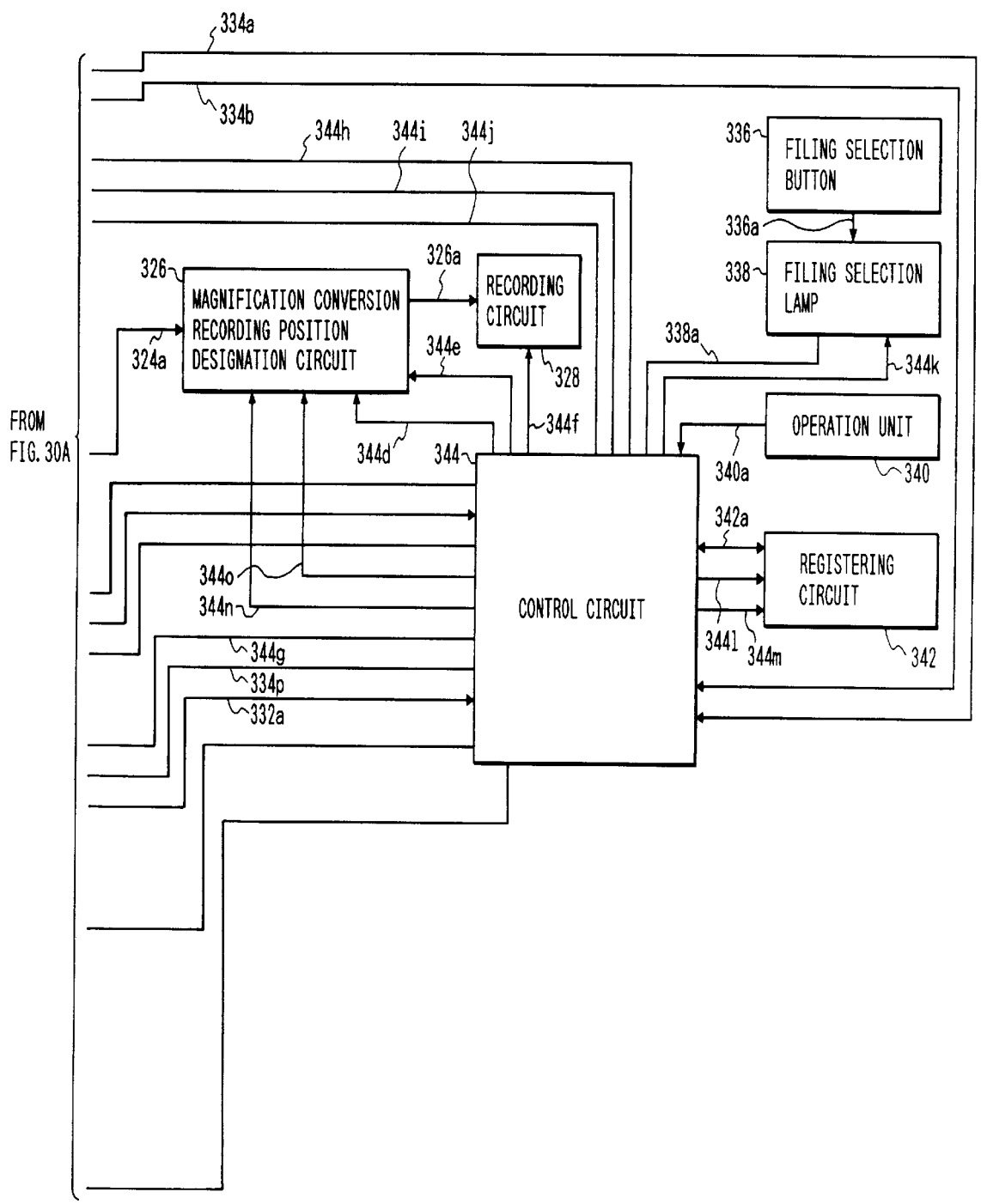
Figure 31:
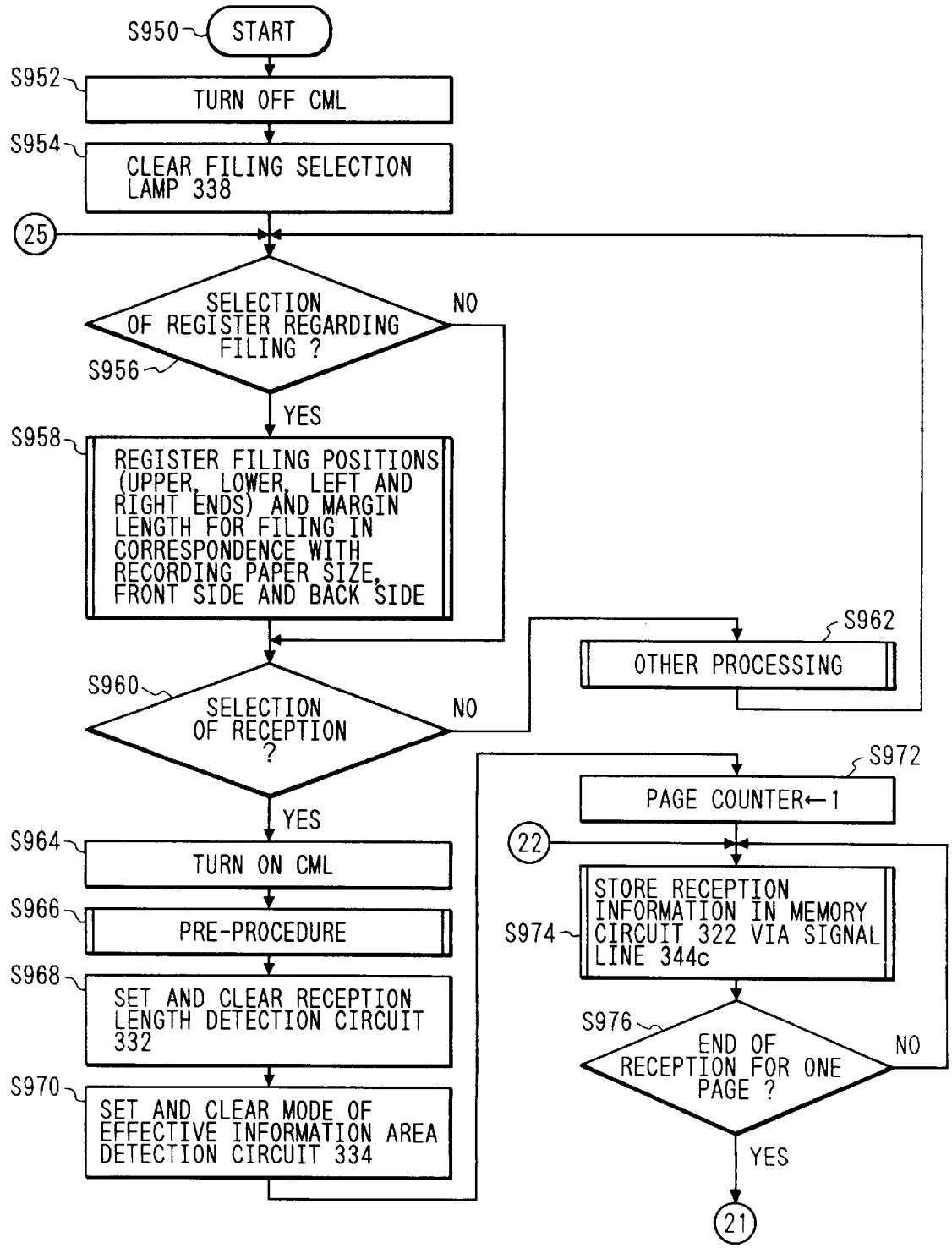
FIG. 31 is a flow chart illustrating operation of the fourth embodiment.
Figure 32:
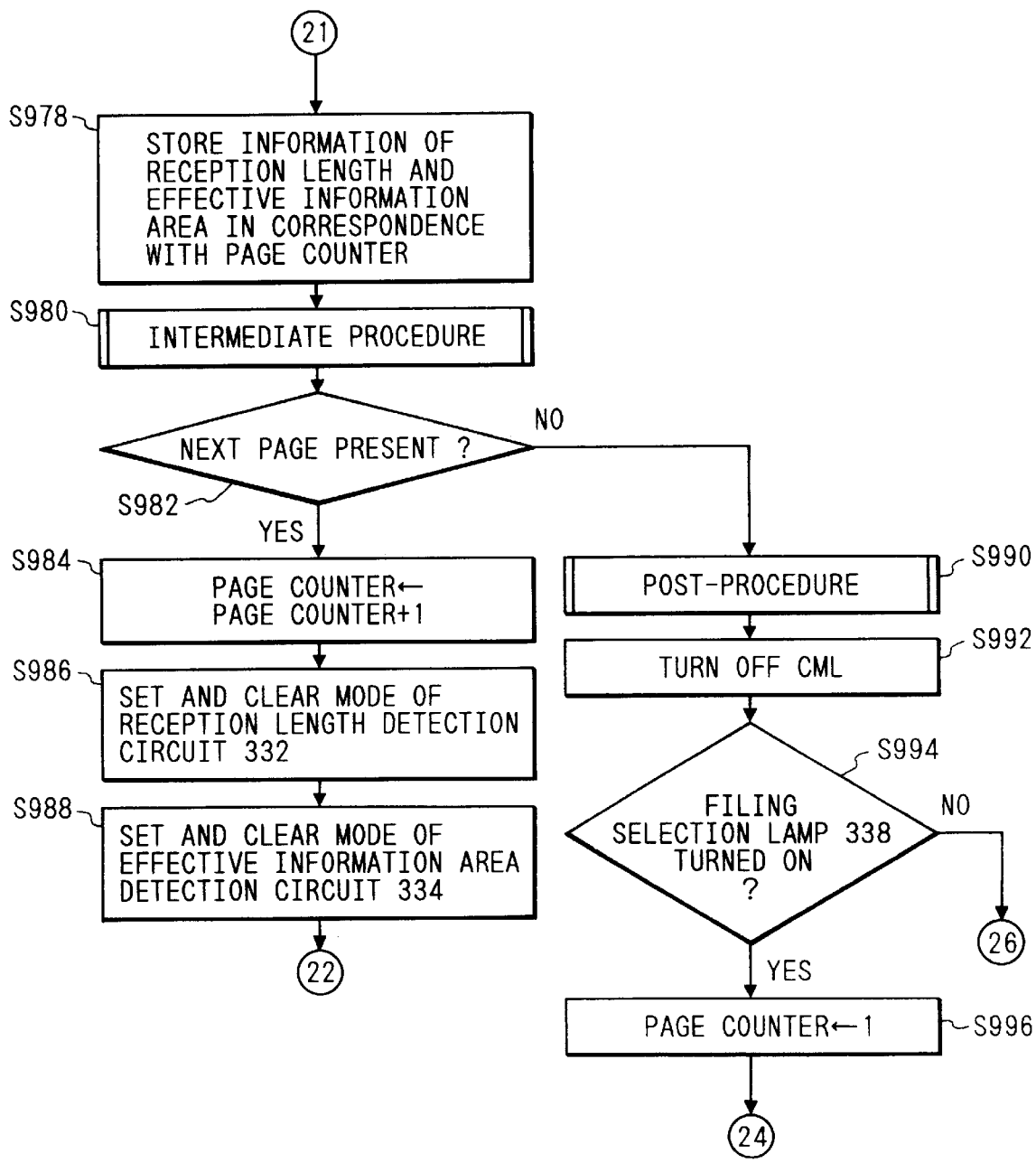
FIG. 32 is a flow chart illustrating operation of the fourth embodiment.
Figure 33:
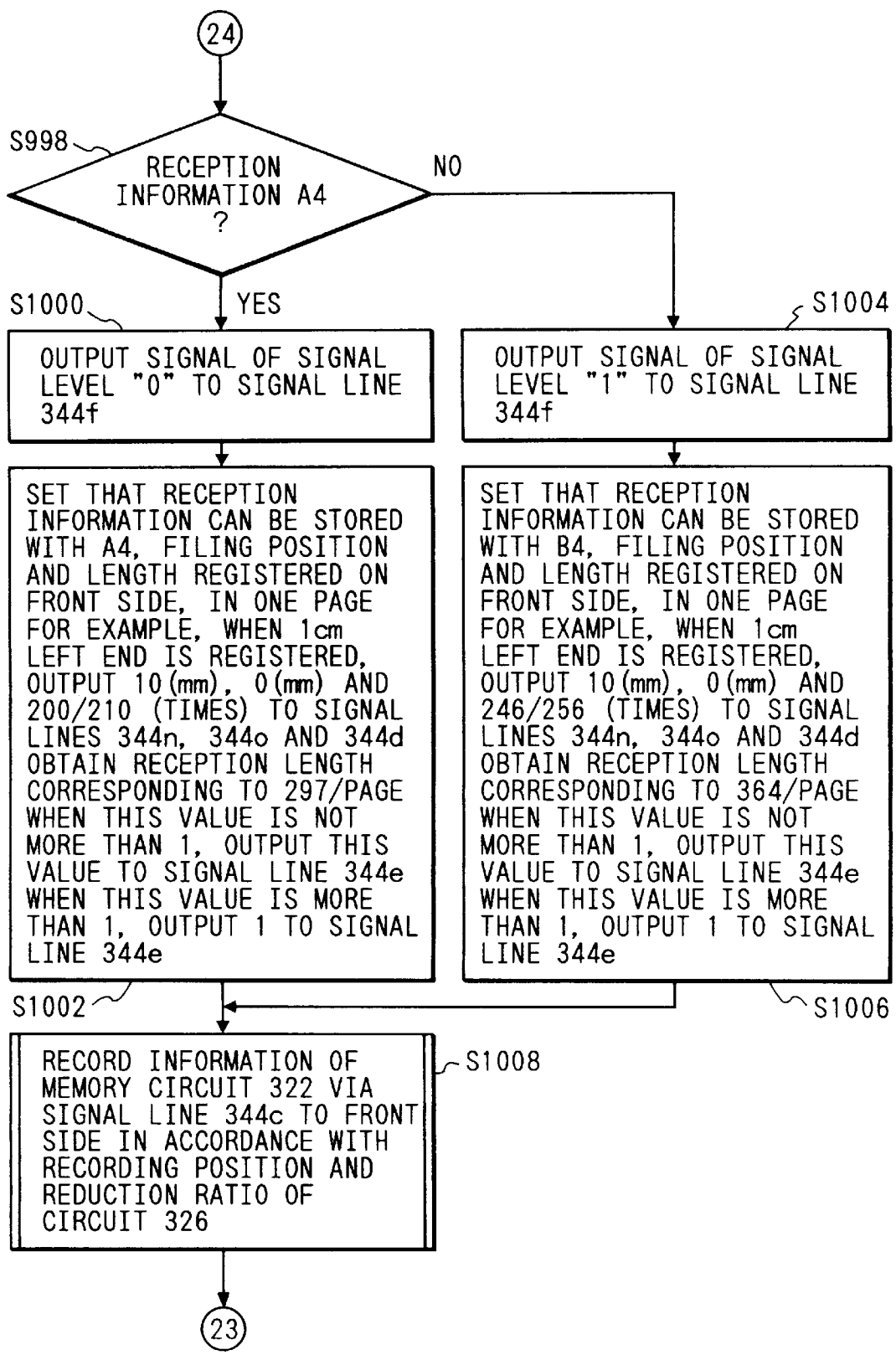
FIG. 33 is a flow chart illustrating operation of the fourth embodiment.
Figure 34:
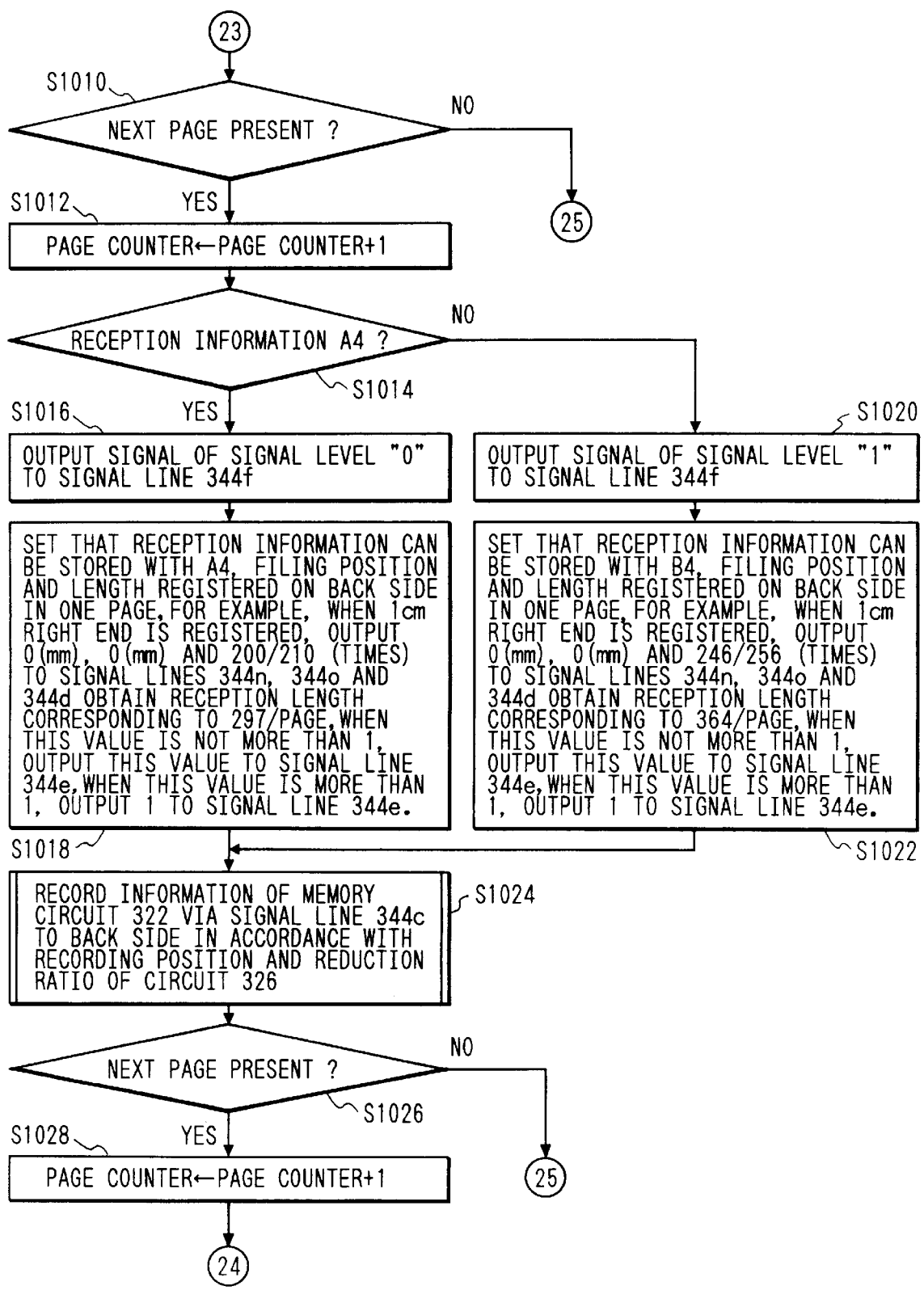
FIG. 34 is a flow chart illustrating operation of the fourth embodiment.
Figure 35:
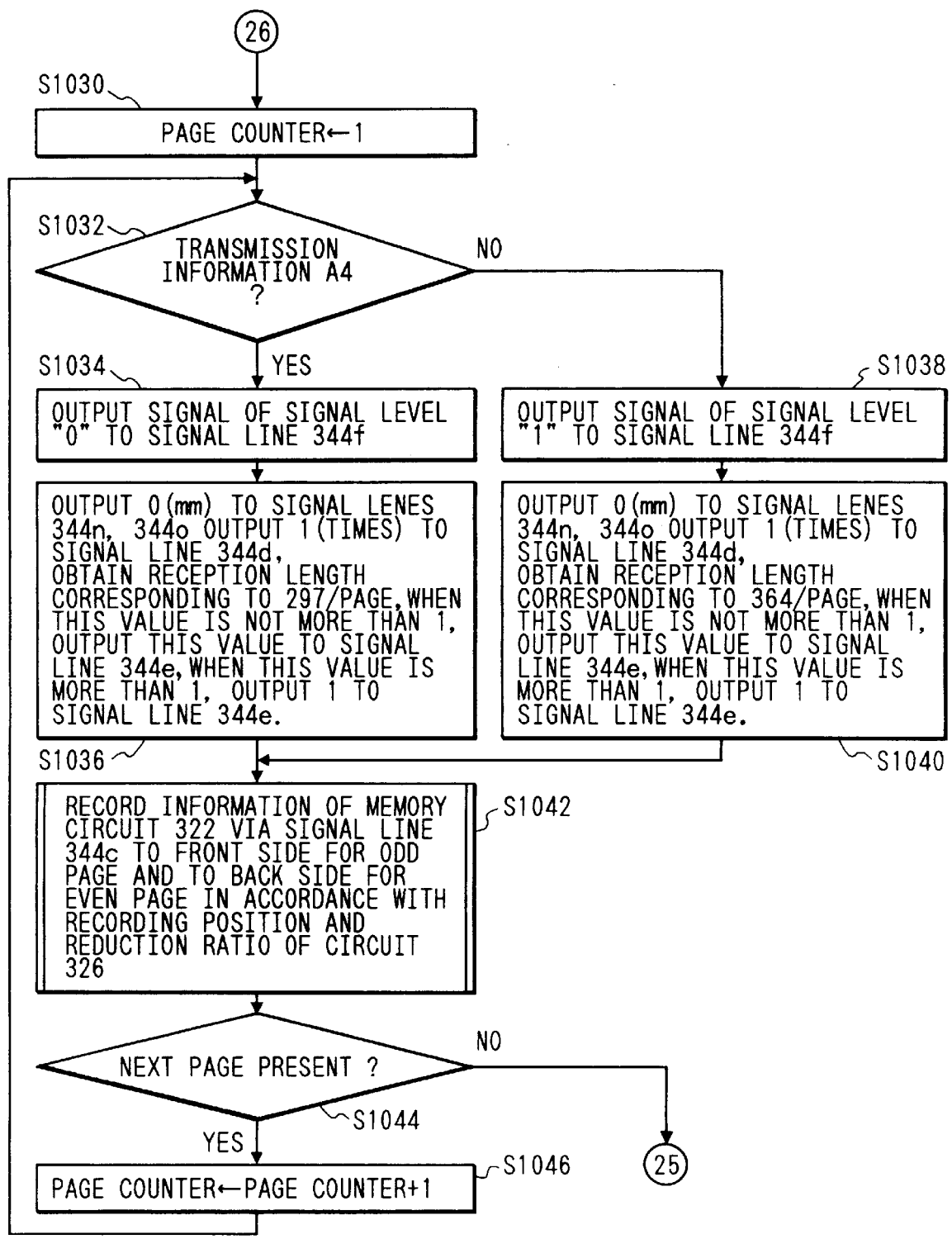
FIG. 35 is a flow chart illustrating operation of the fourth embodiment.

FIGS. 30A and 30B are block diagrams showing the fourth embodiment.

A network control unit (NCU) 302 is provided for connecting a terminal of a telephone line, controlling connection of telephone switching network, switching data communication paths and holding a loop, thereby allowing use of a telephone network for data communication or the like. In addition, the NCU 302 is capable of connecting a telephone line 302a to a telephone 304 when a signal level (a signal line 344a) supplied from a control circuit 344 is in "0" while connecting the telephone line 302a to a facsimile apparatus when the signal level is in "1". In a normal condition, the telephone line 302a is connected to the telephone 304.

A hybrid circuit 306 is provided for separating a transmitting signal from a receiving signal, transmitting a transmitted signal supplied from an adding circuit 16 to the telephone line 302a through the NCU 302, receiving through the NCU 302 a signal supplied from another device, and transmitting the received signal to a V.29 demodulator 320 and a V.21 demodulator 318 through a signal line 306a.

A V.21 modulator 308 is a modulator for carrying out a modulation operation according to V.21, a well-known CCITT standard. The V.21 modulator 308 modulates a procedure signal (signal line 344b) supplied from the control circuit 344 to transmit the same through a signal line 308a to the adding circuit 316.

A reading circuit 310 is provided for reading successively image signals for one line in a main scanning direction of a transmitted original, creating a signal sequence of binary data indicative of white and black, and transmits the data through a signal line 310a to an encoding circuit 312. The reading circuit 310 comprises an image pick-up cell such as a charged-coupled device (CCD) and an optical system.

The encoding circuit 312 receives a read data transmitted on the signal line 310a and carries out an encoding operation (MH coding or MR coding) to transmit the coded data through a signal line 312a.

A V.27 ter or V.29 modulator 314 receives the coded data supplied from the encoding circuit 312 through the signal line 312a. The V.27 ter or V.29 modulator 314 carries out a modulation operation according to V.27 ter (differential phase modulation) or V.29 (orthogonal modulation), well-known CCITT standards to supply the modulated data to the adding circuit 316 through a signal line 314a.

The adding circuit 316 is a circuit for adding the outputs of the modulators 208 and 314. An output of the adding circuit 316 is supplied to the hybrid circuit 306.

A V.21 demodulator 318 is for carrying out a demodulation operation according to V.21, a well-known CCITT standard. The demodulator 318 receives a procedure signal supplied from the hybrid circuit 306 through a signal line 306a. The demodulator 318 carries out the V.21 demodulation operation to supply a demodulated data to the control circuit 344 through a signal line 318a.

The V.27 ter or V.29 demodulator 320 is for carrying out a demodulation operation according to V.27 ter or V.29, well-known CCITT standards. The demodulator 320 receives a modulated image signal supplied from the hybrid circuit 306. The demodulator 320 carries out a demodulation operation and supplies a demodulated data to a memory circuit 322 and a decoding circuit 330 through a signal line 320a.

The memory circuit 322 stores the demodulated data transmitted on the signal line 320a in accordance with the control made by the control circuit 344 through a signal line 344c. The memory circuit 322 transmits the stored data to a decoding circuit 324 through a signal line 322a.

The decoding circuit 324 decodes (MH decoding or MR decoding) the data supplied from the memory circuit 322 through the signal line 322a. The decoding circuit 324 supplies a decoded data to a magnification conversion recording position designation circuit 326 for reception information through a signal line 324a.

The magnification conversion recording position designation circuit 326 receives a signal on the signal line 324a and converts it at a magnification transmitted on a signal line 344d for the main scanning direction and at a magnification transmitted on a signal line 344e for the sub scanning direction to supply the conversion result to a signal line 326a. In addition, a signal line 344n designates at which position in the main scanning direction the information at the upper left corner is to be recorded on the recording paper. A signal line 344o designates at which position in the sub scanning direction the information at the upper left corner is to be recorded on the recording paper.

The recording circuit 328 is a circuit that receives successively signals transmitted on the signal line 326a to record the same by one line. The recording circuit 328 records on a plain paper of A4 size when a signal in the signal level of "0" is supplied to a signal line 344f. On the contrary, the recording circuit 328 records on a plain paper of B4 size when a signal in the signal level of "1" is supplied to the signal line 344f.

The decoding circuit 330 receives the signal supplied through the signal line 320a. The decoding circuit 330 decodes (MH decoding or MR decoding) the received data to supply a decoded data to a signal line 330a.

A reception length detection circuit 332 is a circuit for use in measuring a length of the received information in the sub scanning direction. When the control circuit 344 supplies a sub scanning linear density (for example, 3.852/mm, 7.71/mm, 15.41/mm) to a signal line 344g and counter start pulses are supplied to a signal line 344q, the reception length detection circuit 332 receives the decoded data on the signal line 330a to calculate successively the sub scanning length of the received information. The reception length detection circuit 332 supplies information indicative of the sub scanning length to a signal line 332a by the millimeter.

An effective area detecting circuit 334 is a circuit for detecting an effective area of the received information. When a main scanning linear density (for example, 8 pel/mm) is supplied to a signal line 344h and the sub scanning linear density (for example, 3.852/mm, 7.71/mm, 15.41/mm) is supplied to a signal line 344i, following which count start pulses are supplied to a signal line 344j, the effective area detecting circuit 334 receives the decoded data supplied to the signal line 330a. The effective area detecting circuit 334 calculates successively the main scanning length and the sub scanning length of the effective information and supplies it to signal lines 334a and 334b by the millimeter. As the effective information, in a binary data, the length of the effective information in the sub scanning direction is defined by a distance between the black dot located at the uppermost position and the black dot located at the lowermost position. The effective information in the main scanning direction is defined by a distance between the black dot located at the leftmost position and the black dot located at the rightmost position.

A filing selection button 336 is a button for use in selecting whether the received information is to be filed. When the filing selection button 336 is depressed, depression pulses are supplied to a signal line 336a.

A filing selection lamp 338 is a lamp indicate whether the receiving information is to be filed. The filing selection lamp 338 is turned off when clear pulses are generated on a signal line 344k. In this way, the filing selection lamp 338 is alternatively turned on and off in response to filing selection button depression pulses on the signal line 336a. When the filing selection lamp 338 is turned on, the received information or the received effective information is converted at an arbitrary magnification and recorded with a margin for filing being provided. If the filing selection lamp 338 is turned off, the received information or the received effective information is converted at an arbitrary magnification and recorded without margin for filing. The filing selection lamp 338 supplies to a signal line 338a a signal in the signal level of "0" when it is turned on, and supplies to the signal line 338a a signal in the signal level of "1" when it is turned off.

An operation unit 340 comprises automated dialing buttons, abbreviated dialing buttons, ten keys, an "*" key, a "#" key, ∇ and Δ keys, a filing position designation key, a filing length designation key, a filing size designation key, a filing front/back designation key and filing registration key. In response to depression of the key(s), the corresponding depression information is supplied to the signal line 340a.

A registering circuit 342 is a circuit for registering the filing position on the front and back sides as well as the filing length for every size of the recording paper. To register in this registering circuit 342, a signal line 342a is supplied with information regarding to a size of the recording paper (such as A4), the designation of the side (such as the back side), the filing position (such as the right end), the filing length (such as 1 cm), following which write pulses are supplied to a signal line 3441. On the contrary, to read data registered in the registering circuit 342, the signal line 342a is supplied with the size of the recording paper (such as A4) and the designation of the side (such as the back side), following which reading pulses are supplied to a signal line 344m. In response to this, the registering circuit 342 supplies to the signal line 342a the information regarding to the filing position (such as the right end) and the filing length (such as 1 cm) registered in correspondence with the designated size of the recording paper and the designated side.

The control circuit 344 mainly carries out the following control in the facsimile device according to this embodiment. When the filing function is not selected, the control circuit 344 reduces the information in the sub scanning direction up to the sub scanning length of the plain paper and records it on both side of the paper. (In this event, if the information length in the sub scanning direction is smaller than the sub scanning length of the plain paper, no reduction is made.) It is possible to register independently the filing position (left end, right end, upper end, lower end) and the length thereof in correspondence with the size of the recording paper (A4, B4) and the front/back side of the paper.

If the filing function is selected, the control circuit 344 records the information on both sides of the paper with the margin for filing provided according to the registration. For example, the control circuit 344 controls to record the front side at a linear variable power only in the sub scanning direction with a margin of 1 cm provided at the left side. The control circuit 344 also controls to record the back side at a linear variable power only in the sub scanning direction with a margin of 1 cm provided at the right side.

FIGS. 31 through 35 are flow charts illustrating operation of the fourth embodiment.

At step S952, a signal in the signal level of "0" is supplied to the signal line 344a to turn off the CML. At step S954, clear pulses are supplied to the signal line 344k to turn off the filing selection lamp 338.

At step S956, a signal on the signal line 344a is entered to determine whether registration regarding to filing is recorded. If the registration regarding to filing is selected, step S958 follows. If no registration regarding to filing is selected, step S960 is executed.

At the step S958, the filing position (upper end, lower end, left end or right end) and the length of the margin for filing are registered in the registering circuit 342 in correspondence with the size of the recording paper (A4 or B4) and the recording side (front or back).

At the step S960, it is determined whether the reception is selected. If the reception is selected, step S964 is carried out. If the reception is not selected, step S962 is executed to carry out other processing.

At the step S964, a signal in the signal level of "1" is supplied to the signal line 344a to turn on the CML. At step S966, pre-procedures are carried out. At step S968, the sub scanning linear density is supplied to the signal line 344g and the counter start pulses are supplied to the signal line 344p. At step S970, the main scanning linear density is supplied to the signal line 344h and the count start pulses are supplied to the signal line 344j.

Subsequently, at step S972, 1 is set into the page counter. At step S974, the received information is stored in the memory circuit 322 through the signal line 344c.

At step S976, it is determined whether the reception of one page is completed. If the reception is completed, step S978 is carried out, and otherwise, the step S974 is again executed.

At the step S978, the information regarding to the reception length supplied to the signal line 332a and the effective information area supplied to the signal lines 334a and 334b is recorded in correspondence with the page counter. At step S980, intermediate procedures are carried out.

At step S982, it is determined whether there is a subsequent page. If there is a subsequent page, step S984 is carried out. On the contrary, if no subsequent page is present, step S990 is carried out.

At the step S984, the value of the page counter is incremented by one. At step S986, a mode of the reception length detection circuit 332 is set or cleared as at the step S968. At step S988, a mode of the effective information area detection circuit 334 is set or cleared as at the step S970.

At the step S990, post-procedures are carried out. At step S992, a signal in the signal level of "0" is supplied to the signal line 334a to turn off the CML.

At step S994, a signal on the signal line 338a is entered to determine whether the filing selection lamp 338 is turned on. If it is turned on, step S996 is carried out. If not, step S1030 is executed.

At the step S996, 1 is set into the page counter. At step S998, it is determined whether the main scanning length of the received information corresponds to the A4 size. If it corresponds to the A4 size, step S1000 is executed. If it corresponds to the B4 size, step S1004 is carried out.

At the step S1000, a signal in the signal level of "0" is supplied to the signal line 344f. The recording circuit 328 designates recording on the plain paper of A4 size.

At the step S1002, it is set that received information can be stored in one page for the front side of the paper of A4 size with the margin provided that corresponds to the filing position (upper end, lower end, left end or right end) and the filing length registered in the registering circuit 342. For example, when 1 cm is registered for the length of the left margin, the signal line 344n is supplied with 10 (mm) and the signal line 344o is supplied with 0 (mm). In addition, the signal line 344d is supplied with 200/210 (magnification). The reception length corresponding to the (297/page counter) is calculated. If the calculation result is equal to or smaller than one, this value is supplied to the signal line 344e. If the value exceeds one, 1 is supplied to the signal line 344e.

At the step S1004, a signal in the signal level of "1" is supplied to the signal line 344f. The recording circuit 328 designates recording on the plain paper of B4 size. At the step S1006, it is set that received information can be stored in one page for the front side of the paper of B4 size with the margin provided that corresponds to the filing position (upper end, lower end, left end or right end) and the filing length registered in the registering circuit 342. For example, when 1 cm is registered for the length of the left margin, the signal line 344n is supplied with 10 (mm) and the signal line 344o is supplied with 0 (mm). In addition, the signal line 344d is supplied with 246/256 (magnification). The reception length corresponding to the (364/page counter) is calculated. If the calculation result is equal to or smaller than one, this value is supplied to the signal line 344e. If the value exceeds one, 1 is supplied to the signal line 344e.

Subsequently, at step S1008, the information in the memory circuit 322 is recorded on the front side through the signal line 344c according to the recording position and the reduction rate stored in the magnification conversion recording position designation circuit 326.

At step S1010, it is determined whether there is a subsequent page. If there is a subsequent page, step S1012 is carried out. If no subsequent page is present, the step S956 is again executed.

At the step S1012, the value of the page counter in incremented by one. At step S1014, it is determined whether the main scanning length of the received information corresponds to the A4 size. If it corresponds to the A4 size, step S1016 is carried out. If it corresponds to the B4 size, step S1020 is carried out.

At the step S1016, a signal in the signal level of "0" is supplied to the signal line 344f. The recording circuit 328 is designated to record on the A4 plain paper. At step S1018, it is set that received information can be stored in one page for the back side of the paper of A4 size with the margin provided that corresponds to the filing position (upper end, lower end, left end or right end) and the filing length registered in the registering circuit 342. For example, when 1 cm is registered for the length of the left margin, the signal lines 344n and 344o are supplied with 0 (mm). In addition, the signal line 344d is supplied with 200/210 (magnification). The reception length corresponding to the (297/page counter) is calculated. If the calculation result is equal to or smaller than one, this value is supplied to the signal line 344e. If the value exceeds one, 1 is supplied to the signal line 344e.

At the step S1020, a signal in the signal level of "1" is supplied to the signal line 344f. The recording circuit 328 designates recording on the plain paper of B4 size. At the step S1022, it is set that received information can be stored in one page for the back side of the paper of B4 size with the margin provided that corresponds to the filing position (upper end, lower end, left end or right end) and the filing length registered in the registering circuit 342. For example, when 1 cm is registered for the length of the left margin, the signal lines 344n and 344o are supplied with 0 (mm). In addition, the signal line 344d is supplied with 246/256 (magnification). The reception length corresponding to the (364/page counter) is calculated. If the calculation result is equal to or smaller than one, this value is supplied to the signal line 344e. If the value exceeds one, 1 is supplied to the signal line 344e.

Subsequently, at step S1024, the information in the memory circuit 322 is recorded on the front side through the signal line 344c according to the recording position and the reduction rate stored in the magnification conversion recording position designation circuit 326. At step S1026, it is determined whether there is a subsequent page. If there is a subsequent page, step S1028 is carried out. If no subsequent page is present, the step S956 is again executed.

At the step S1028, the value of the page counter in incremented by one and then control returns to the step S998.

At step S1030, 1 is set into the page counter. At step S1032, it is determined whether the main scanning length of the received information corresponds to the A4 size. If it corresponds to the A4 size, step S1034 is carried out. If it corresponds to the B4 size, step S1038 is carried out.

At the step S1034, a signal in the signal level of "0" is supplied to the signal line 344f. The recording circuit 328 is designated to record on the A4 plain paper.

At step S1036, the received information is recorded on the entire length and width of the plain paper without margin. More specifically, the signal lines 344n and 344o are supplied with 0 (mm) while the signal line 344d is supplied with one (magnification). The reception length corresponding to the (297/page counter) is calculated. If the calculation result is equal to or smaller than one, this value is supplied to the signal line 344e. If the value exceeds one, 1 is supplied to the signal line 344e.

At the step S1038, a signal in the signal level of "1" is supplied to the signal line 344f. The recording circuit 328 is designated to record on the B4 plain paper. At step S1040, the received information is recorded on the entire length and width of the plain paper without margin. More specifically, the signal line 344n is supplied with 0 (mm) while the signal line 344d is supplied with one (magnification). The reception length corresponding to the (364/page counter) is calculated. If the calculation result is equal to or smaller than one, this value is supplied to the signal line 344e. If the value exceeds one, 1 is supplied to the signal line 344e.

Subsequently, at step S1042, the information in the memory circuit 322 is recorded on the front side for the odd pages and on the back side for the even pages through the signal line 344c according to the recording position and the reduction rate stored in the magnification conversion recording position designation circuit 326.

At step S1044, it is determined whether there is a subsequent page. If there is a subsequent page, step S1046 is carried out. If no subsequent page is present, the step S956 is again executed. At the step S1046, the value of the page counter is incremented by one and then control returns to the step S1032.

In the above mentioned fourth embodiment, the margin of 1 cm is provided on the left and right ends of the front and back sides, respectively. However, the margin of 1 cm may be provided at the upper end of the front and back sides. More specifically, the margin of 1 cm at the upper end is set at the above mentioned steps S1002 and S1018. In addition, at the steps S1002 and S1018, the signal line 344n is supplied with 0 (mm) while the signal line 344o is supplied with 10 (mm). In addition, the signal line 344d is supplied with one (magnification). The reception length corresponding to the (287/page counter) is calculated. If the calculation result is equal to or smaller than one, this value is supplied to the signal line 344e. If the value exceeds one, 1 is supplied to the signal line 344e.

At the above mentioned steps S1006 and S1022, the margin of 1 cm at the upper end is set for both the front and the back sides. In this event, the signal line 344n is supplied with 0 (mm) and the signal line 344o is supplied with 10 (mm) at the steps S1006 and S1022. In addition, the signal line 344d is supplied with one (magnification). The reception length corresponding to the (354/page counter) is calculated. If the calculation result is equal to or smaller than one, this value is supplied to the signal line 344e. If the value exceeds one, 1 is supplied to the signal line 344e.

In the above mentioned fourth embodiment, the linear variable power is directed to the area except for the margin for binding of the received information area of the size of the plain paper. However, the effective received area rather than the received information area may be subjected to the similar processing.

More specifically, the effective areas in the main and sub scanning directions are obtained from the detecting circuit 334 upon receiving every one page. The linear variable power may be directed to the area obtained by means of excluding the margin for binding from this area and the size of the plain paper.

In addition, if the area used for the margin for binding is all white information, the received information may be recorded as it is without being processed. Further, the position and the length of the margin may be varied depending on the size of the plain paper such as A4 and B4.

Figure 36:
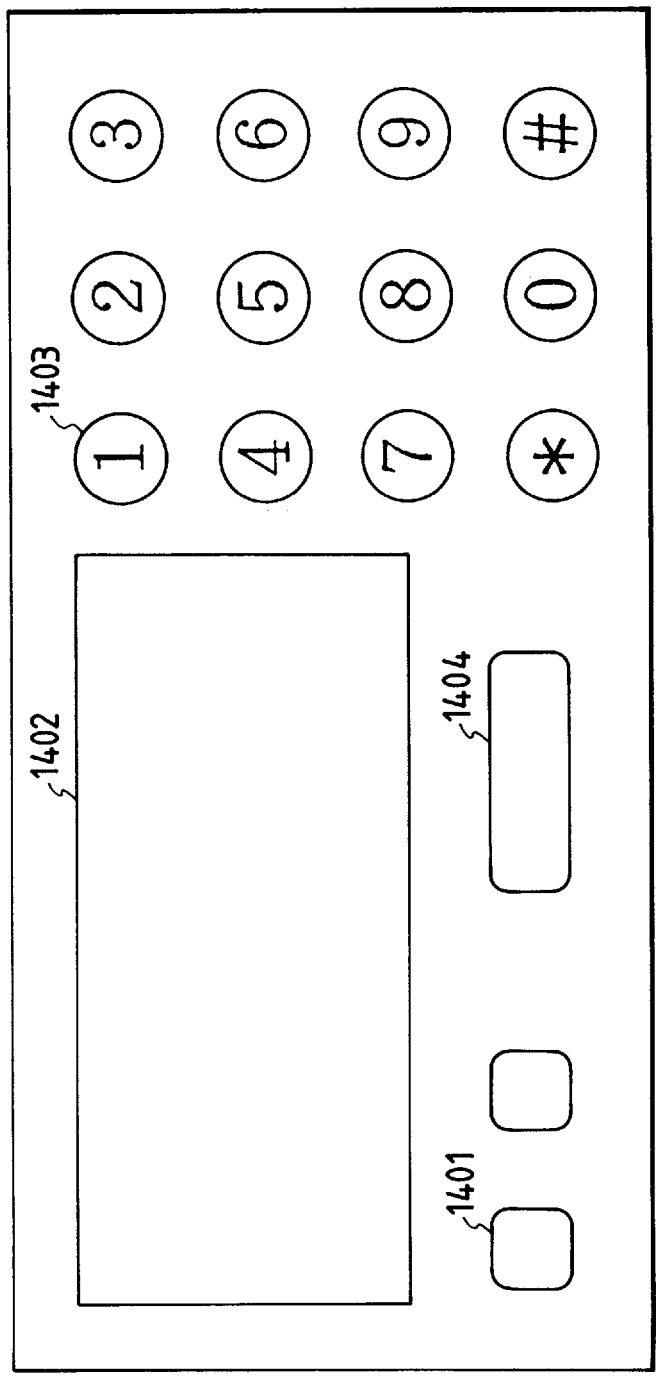
FIG. 36 is a plan view showing an operation panel according to a fifth embodiment of the present invention.

Next, a fifth embodiment of the present invention is described. FIG. 36 is a plan view showing an operation panel according to a fifth embodiment of the present invention. As apparent from the figure, the operation panel comprises a both sides original button 1401, a display unit 1402, ten keys 1403 and a start key 1404. By means of depressing the both sides original button 1401 upon transmission of the perfect original, the image data of the perfect original is stored in the memory and transmitted in the order of the pages.

Figure 37:
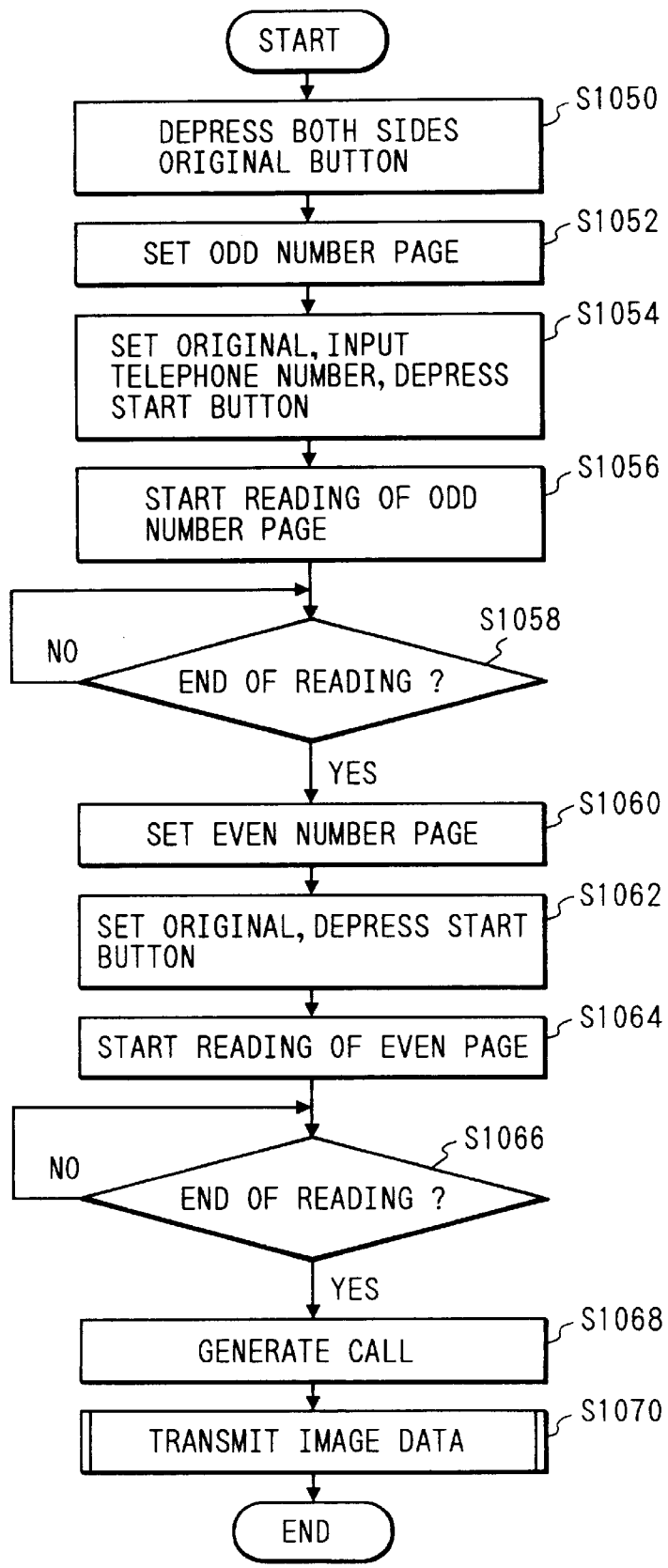
FIG. 37 is a flow chart illustrating operation of the fifth embodiment.

FIG. 37 is a flow chart illustrating a transmission operation according to this fifth embodiment of the present invention. In the following, described is a case where three perfect originals (i.e., six pages in total) are transmitted.

When an operator depresses the above mentioned both sides original button 1401 on the operation panel (S1050), the above mentioned display unit 1402 displays that "SET ODD PAGES" (S1052). In response to this, the operator put the odd pages of the original on the holder and enters a telephone number of the destination through the ten keys 1403. Then, the operator depresses the start button 1404 (S1054).

In response to this, reading operation on the odd pages is started. Image data for the first, third, fifth pages are stored in the memory (S1056).

When this reading operation is completed (S1058), the above mentioned display unit 1402 displays that "SET EVEN PAGES" (S1060). In response to this, the operator put the even pages of the original on the holder and depresses the start button 1404 (S1062).

As a result, reading operation on the even pages is started. Image data for the second, fourth and sixth pages are thus stored in the memory (S1064).

In the manner described above, the image data are stored in the memory in a form as shown in FIG. 39. After completion of reading of both sides of the original (S1068), the image data are transmitted to the destination (S1070). In this event, the image data are read out of the memory in the order of the pages from the first page. Accordingly, the data are recorded on the recording paper at the receiving side in the order of the pages.

Figure 38:
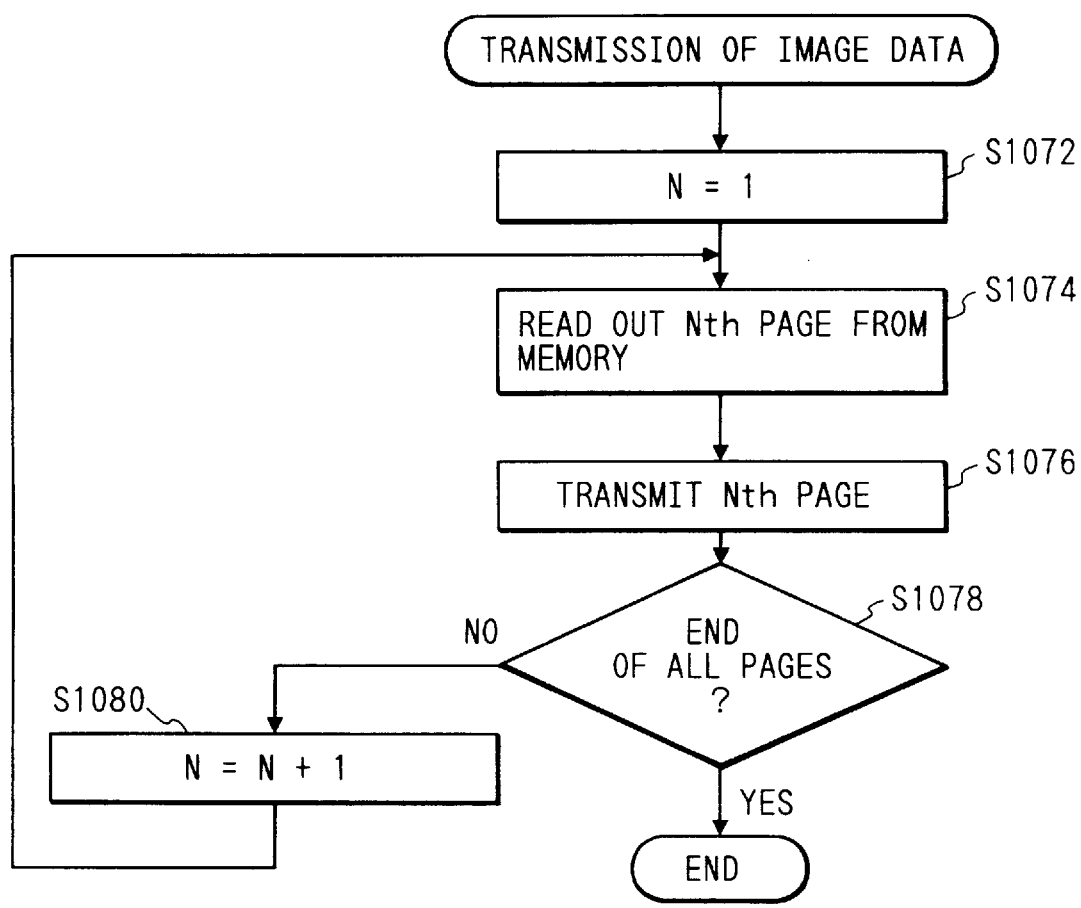
FIG. 38 is a flow chart illustrating operation of the fifth embodiment.

FIG. 38 is a flow chart illustrating a transmission operation at the above mentioned step S1070.

First, 1 is set into a page counter N (S1072). The N-th page is read out of the memory (S1074) and transmitted (S1076). When there is one or more pages left without being transmitted (S1078), the page counter N is incremented by one (S1080). Then, the control returns to the step S1074 to transmit the subsequent page.

Figure 40:
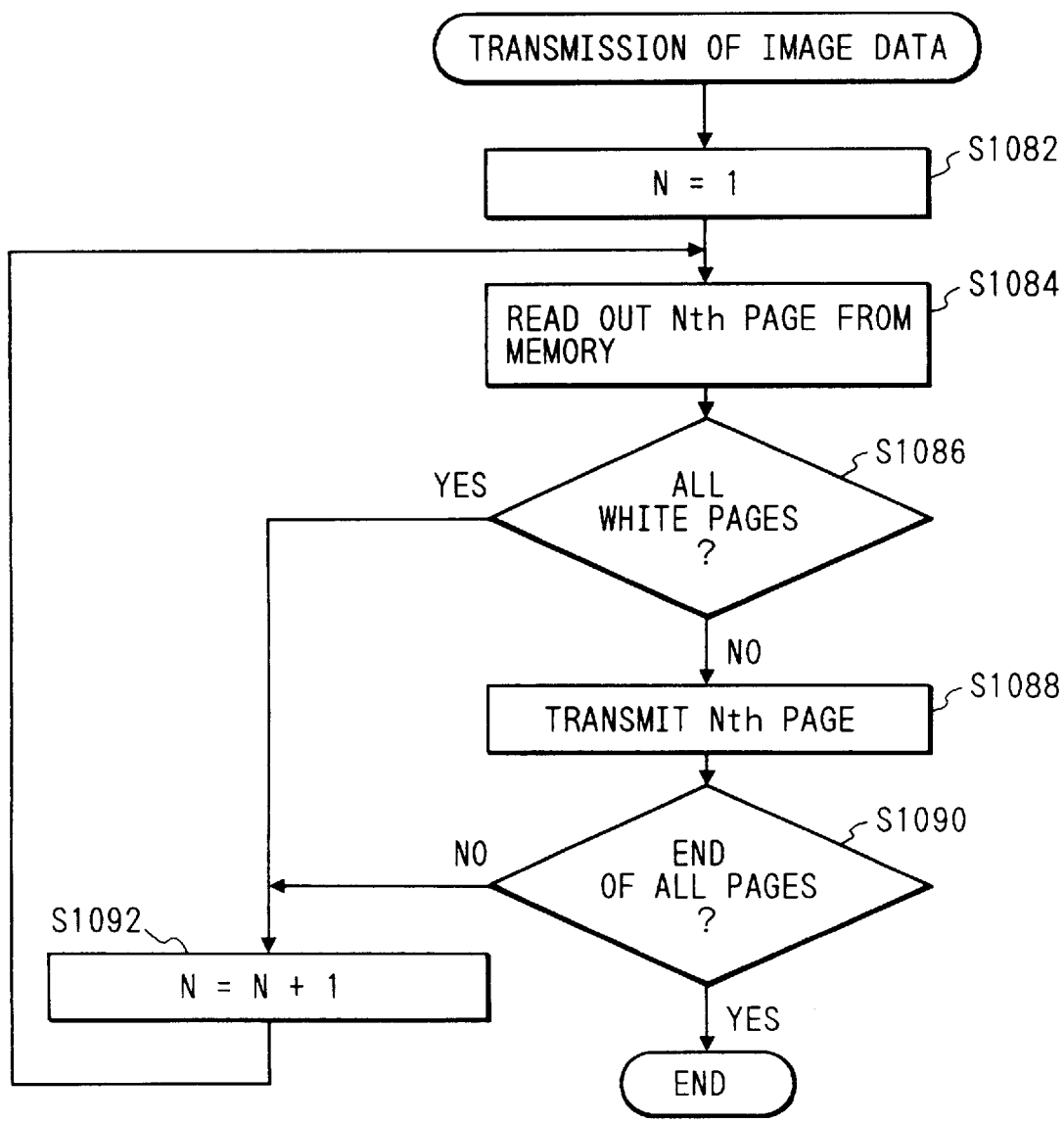
FIG. 40 is a flow chart illustrating operation of a first modification of the fifth embodiment.

If the perfect original and the one-side original are slipped or present together, a white page may be eliminated or discarded. FIG. 40 is a flow chart illustrating a transmission operation in such a case. As apparent from the figure, 1 is set into the page counter N (S1082). The N-th page is read out of the memory (S1084). If this is an all white data (S1086), the page counter N is incremented by one at step S1092 without transmission. The control returns to the step S1084 to transmit the subsequent page. If the N-th page is not the all white data at the step S1086, this is transmitted at step S1088. When there is one or more pages left without being transmitted (S1090), the page counter N is incremented by one (S1092). Then, the control returns to the step S1084 to transmit the subsequent page.

The above mentioned fifth embodiment is not limited to those illustrative description. If the memory becomes full with no empty area left during reading of the even pages, the original of which content is not stored into the memory may be directly transmitted. Alternatively, only the odd pages may be stored into the memory while the even pages may be directly transmitted.

Figures 41, 41A:
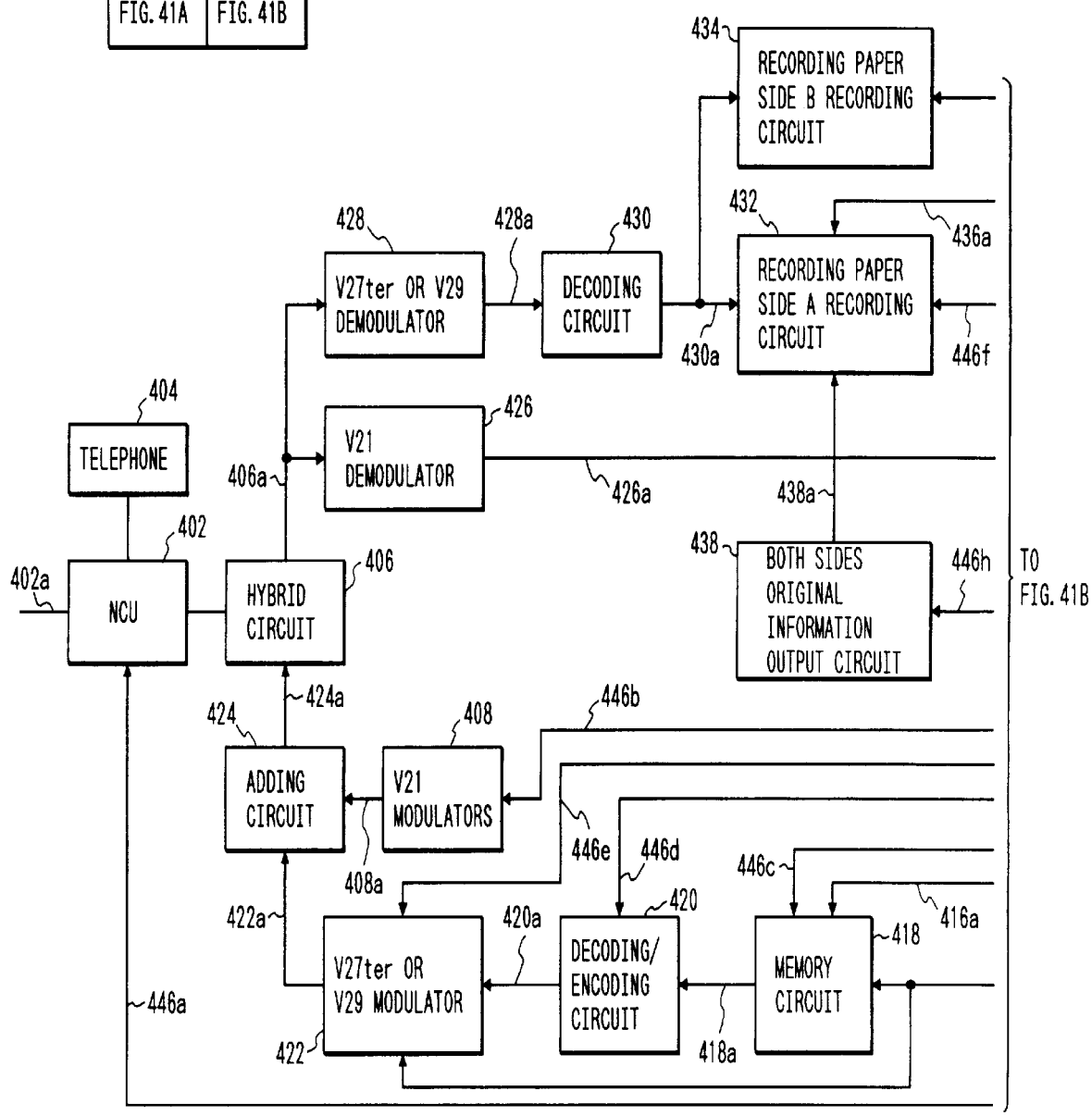
FIG. 41, comprised of FIGS. 41A and 41B, is a block diagram showing a sixth embodiment of the present invention.
Figure 41B:
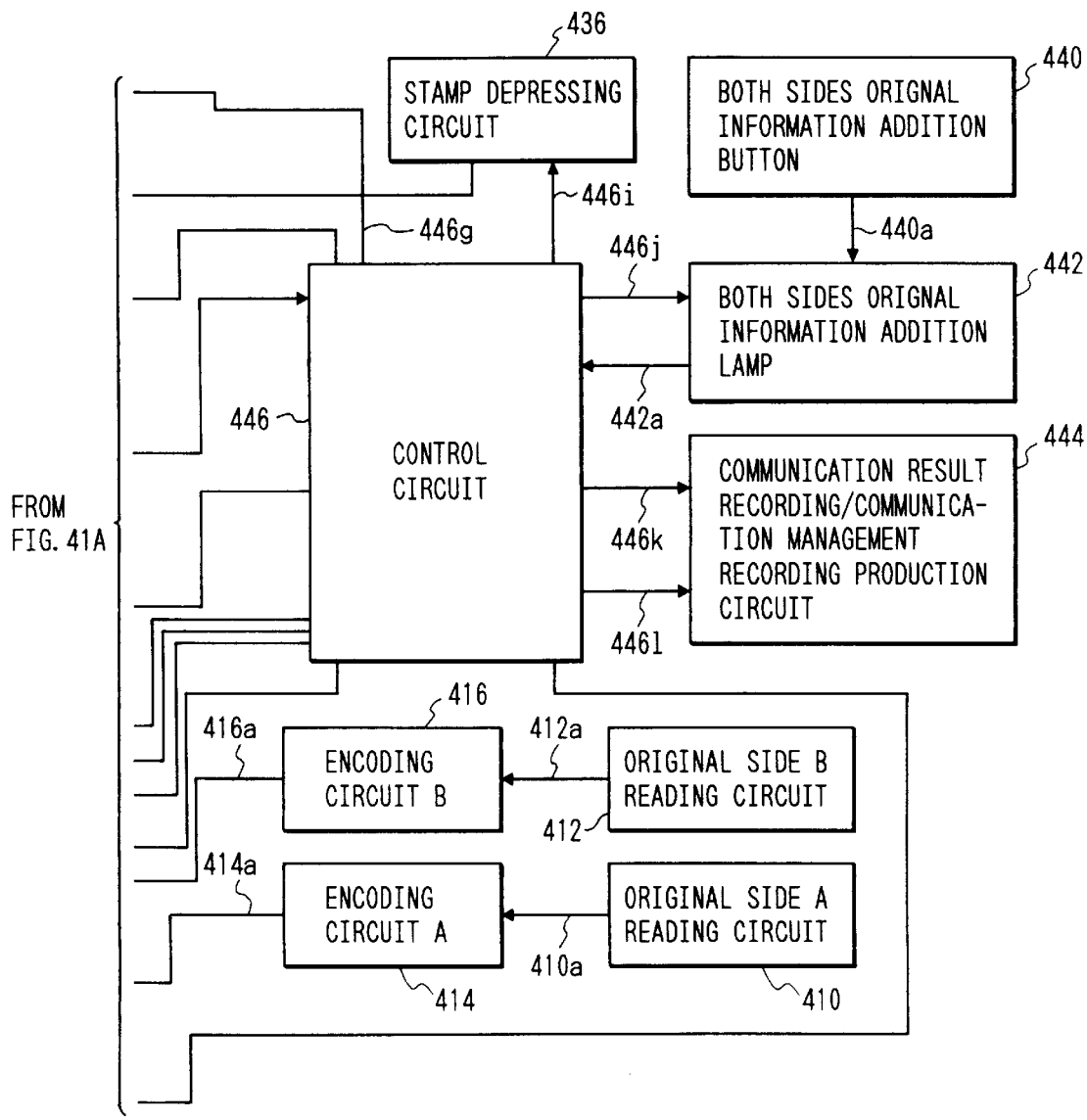
Figure 42:
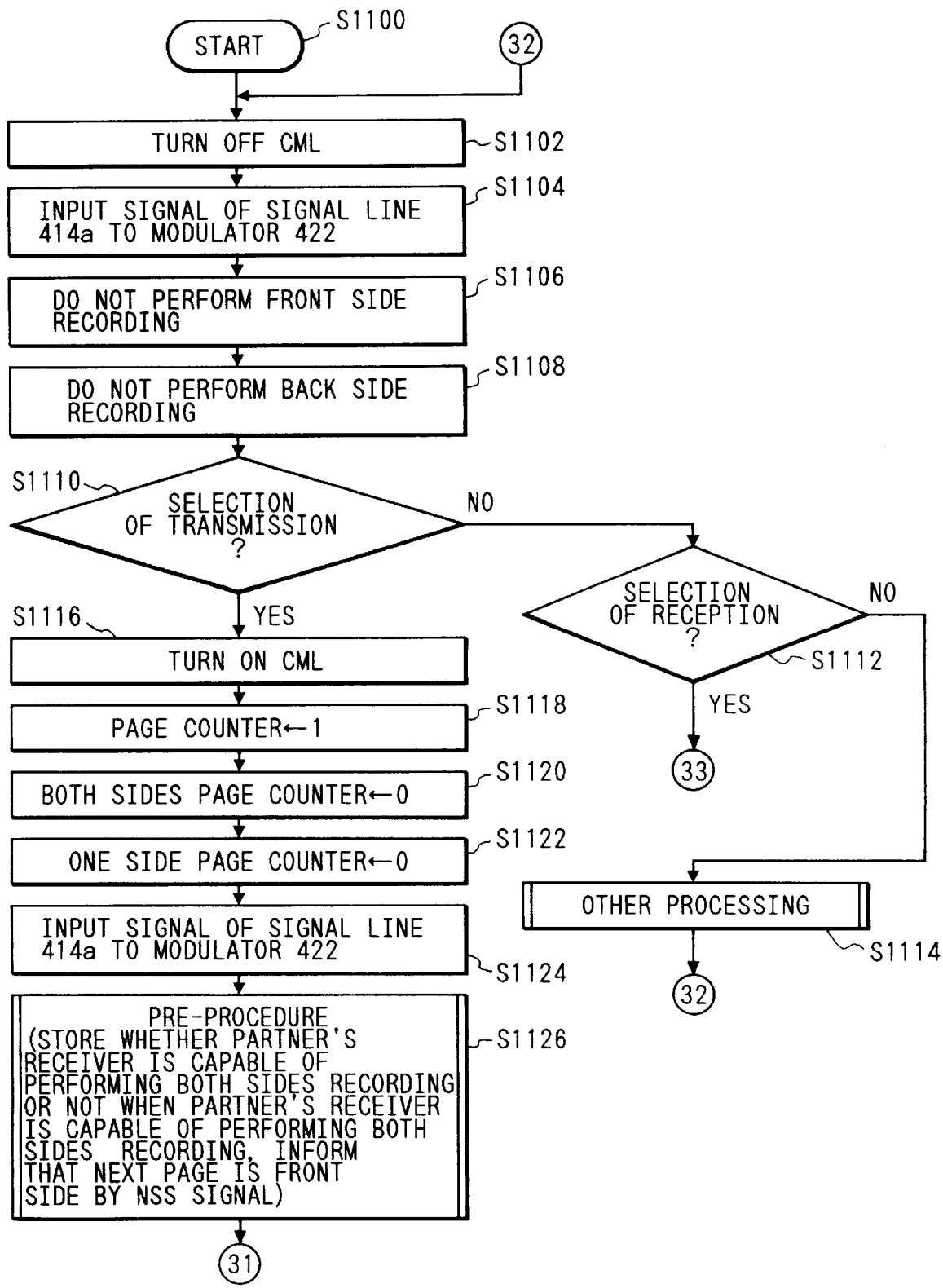
FIG. 42 is a flow chart illustrating operation of the sixth embodiment.
Figure 43:
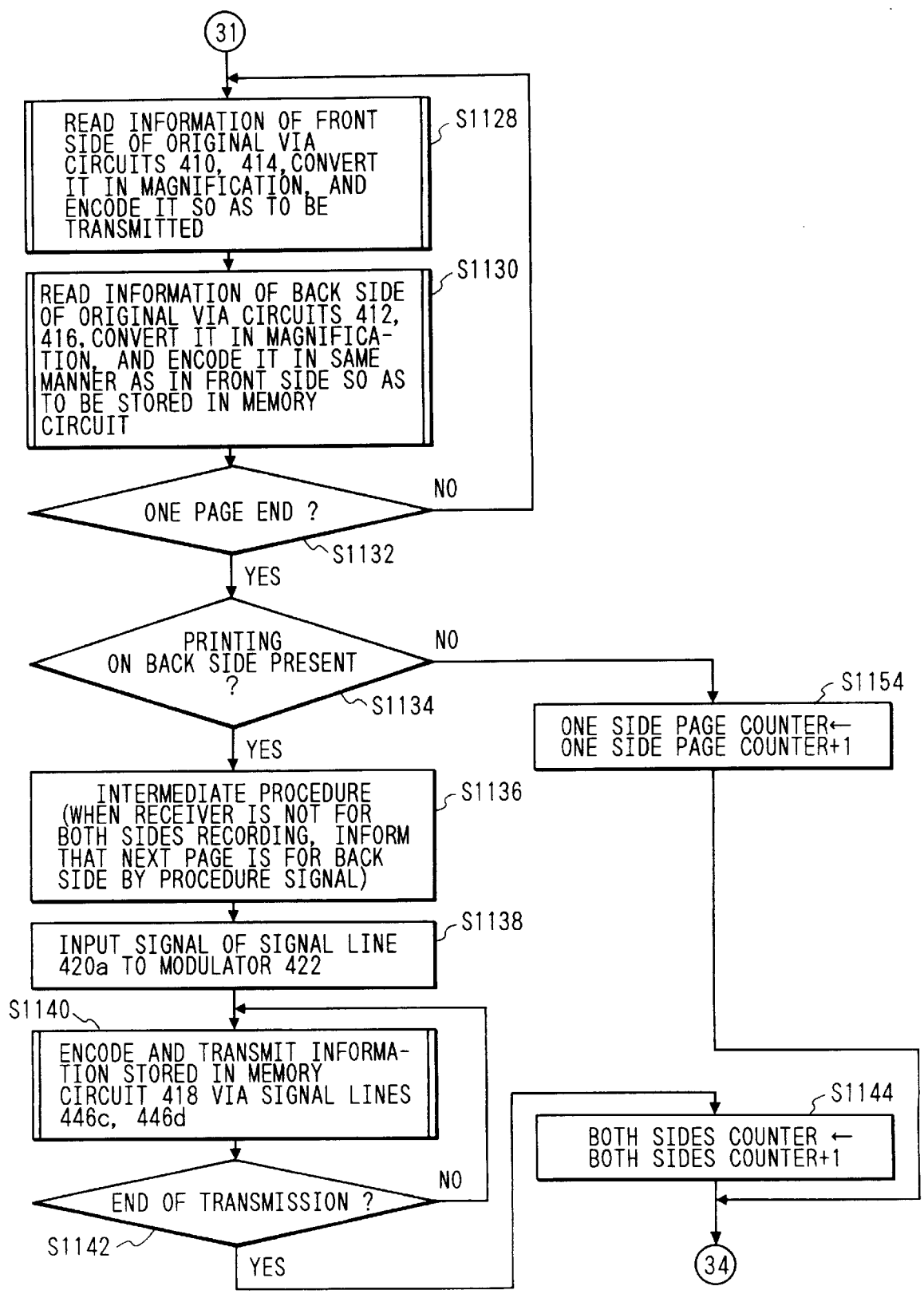
FIG. 43 is a flow chart illustrating operation of the sixth embodiment.
Figure 44:
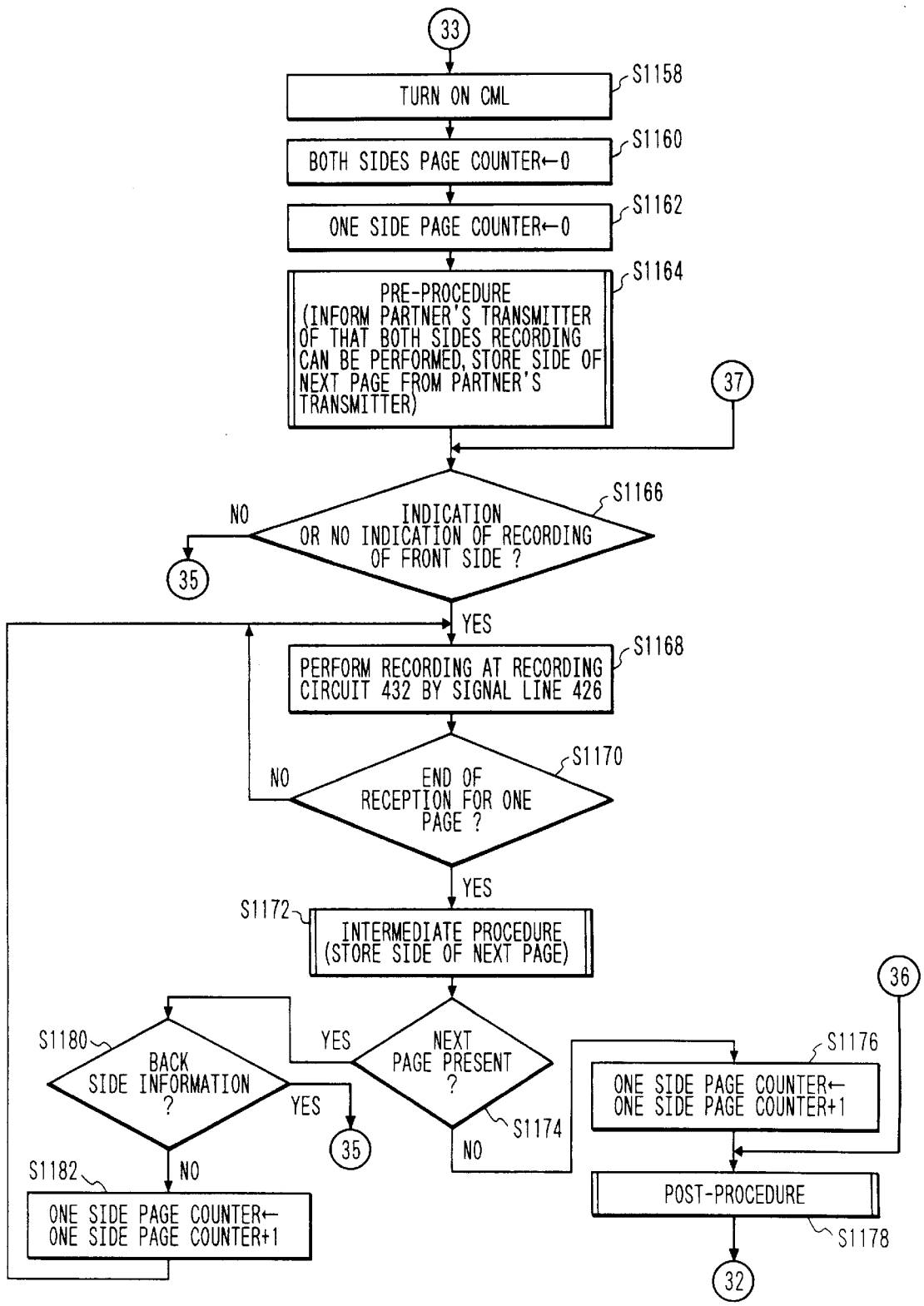
FIG. 44 is a flow chart illustrating operation of the sixth embodiment.
Figure 45:
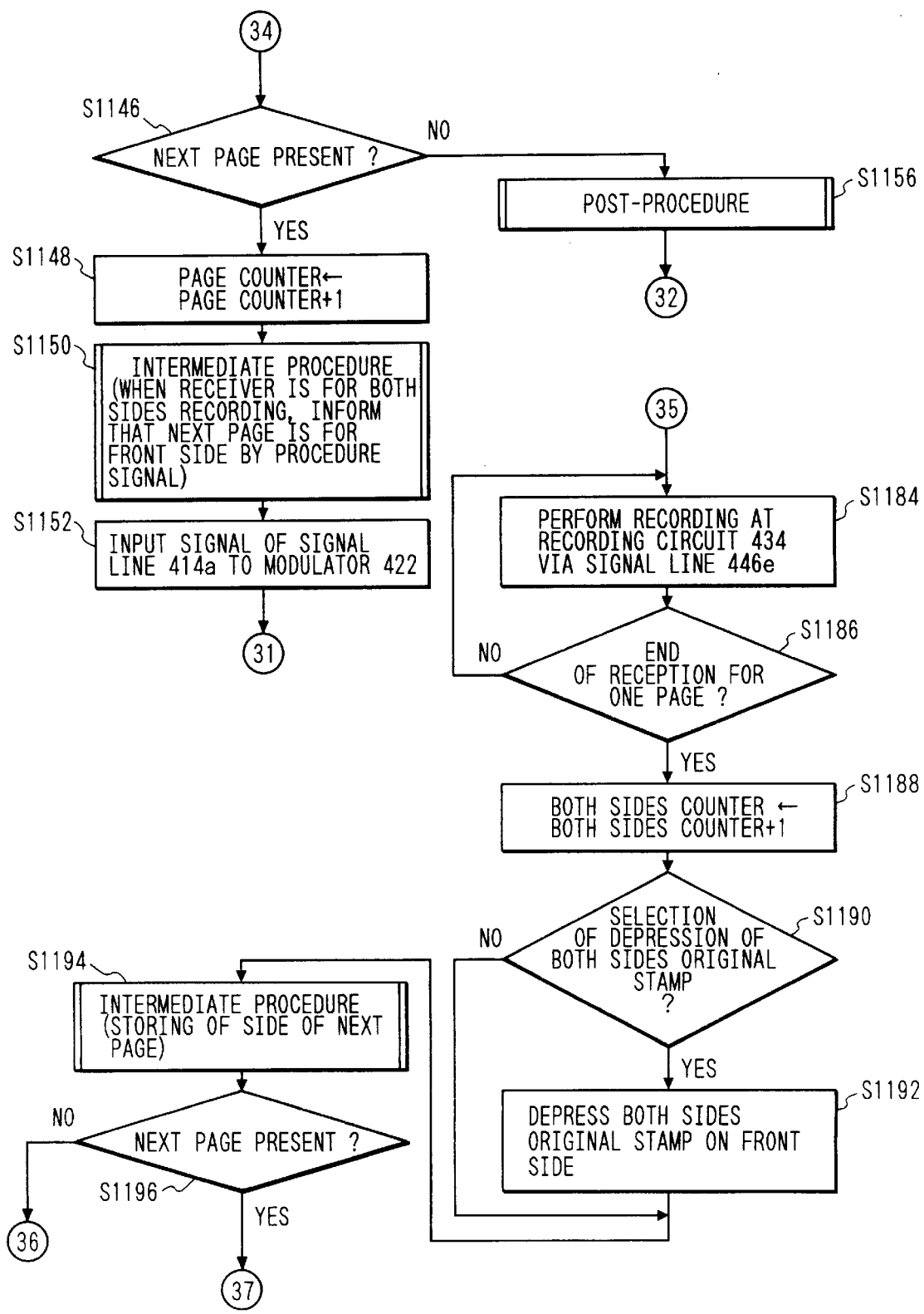
FIG. 45 is a flow chart illustrating operation of the sixth embodiment.

FIGS. 41A and 41B are block diagrams showing a sixth embodiment of the present invention.

A network control unit (NCU) 402 is provided for connecting a terminal of a telephone line, controlling connection of telephone switching network, switching data communication paths and holding a loop, thereby allowing use of a telephone network for data communication or the like. In addition, the NCU 402 is capable of connecting a telephone line 402a to a telephone 404 when a signal level (a signal line 446a) supplied from a control circuit 446 is in "0" while connecting the telephone line 402a to a facsimile device when the signal level is in "1". In a normal condition, the telephone line 402a is connected to the telephone 404.

A hybrid circuit 406 is provided for separating a transmitting signal from a receiving signal, transmitting a transmitted signal supplied from an adding circuit 424 to the telephone line 402a through the NCU 402, receiving through the NCU 402 a signal supplied from another device, and transmitting the received signal to a V.29 demodulator 428 and a V.21 demodulator 426 through a signal line 406a.

A V.21 modulator 408 is a modulator for carrying out a modulation operation according to V.21, a well-known CCITT standard. The V.21 modulator 408 modulates a procedure signal (signal line 446b) supplied from the control circuit 446 to transmit the same through a signal line 408a to the adding circuit 424.

An original side A (i.e., the front side of the original) reading circuit 410 is provided for reading successively image signals for one line in a main scanning direction of an A side (i.e., front side) of a transmitted original, creating a signal sequence of binary data indicative of white and black, and transmits the data through a signal line 410a to an encoding circuit A 414. The original side A reading circuit 410 comprises an image pick-up cell such as a charged-coupled device (CCD) and an optical system.

An original side B (i.e., the back side of the original) reading circuit 412 is provided for reading successively image signals for one line in a main scanning direction of a B side (i.e., back side) of a transmitted original, creating a signal sequence of binary data indicative of white and black, and transmits the data through a signal line 412a to an encoding circuit B 416. The original side B reading circuit 412 comprises an image pick-up cell such as a charged-coupled device (CCD) and an optical system.

The encoding circuit A 414 receives a data transmitted on the signal line 410a and carries out an encoding operation (MH coding or MR coding) to transmit the coded data through a signal line 414a.

The encoding circuit B 416 receives a data transmitted on the signal line 412a and carries out an encoding operation (MH coding or MR coding) to transmit the coded data through a signal line 416a.

A memory circuit 418 stores information transmitted on the signal line 414a or information transmitted on the signal line 416a in accordance with the control on a signal line 446c. The memory circuit 418 transmits the stored data through a signal line 418a.

A decoding/encoding circuit 420 receives and decodes the data transmitted on the signal line 418a in accordance with the control on a signal line 446d. The decoding/encoding circuit 420 converts the decoded data in a size or an encoding method suitable for the destination to produce a coded data through a signal line 420a.

A V.27 ter or V.29 modulator 422 receives the coded data supplied from the encoding circuit 414 through the signal line 414a when the signal supplied from the control circuit 446 through a signal line 446e is in the signal level of "0". Alternatively, the V.27 ter or V.29 modulator 422 receives the coded data supplied from the encoding circuit 416 through the signal line 416a when the signal supplied from the control circuit 446 through the signal line 446e is in the signal level of "1". The V.27 ter or V.29 modulator 422 carries out a modulation operation according to V.27 ter (differential phase modulation) or V.29 (orthogonal modulation), well-known CCITT standards to supply the modulated data to the adding circuit 424 through a signal line 422a.

The adding circuit 424 is a circuit for adding the outputs of the modulators 408 and 422. An output of the adding circuit 424 is supplied to the hybrid circuit 406.

A V.21 demodulator 426 is for carrying out a demodulation operation according to V.21, a well-known CCITT standard. The demodulator 426 receives a procedure signal supplied from the hybrid circuit 406 through a signal line 406a. The demodulator 426 carries out the V.21 demodulation operation to supply a demodulated data to the control circuit 446 through a signal line 426a.

The V.27 ter or V.29 demodulator 428 is for carrying out a demodulation operation according to V.27 ter or V.29, well-known CCITT standards. The demodulator 428 receives a modulated image signal supplied from the hybrid circuit 406. The demodulator 428 carries out a demodulation operation and supplies a demodulated data to a decoding circuit 430 through a signal line 428a.

The decoding circuit 430 decodes (MH decoding or MR decoding) the data supplied from the demodulator 428 through the signal line 428a. The decoding circuit 430 supplies a decoded data to recording circuits 432 and 434 through a signal line 430a.

A recording paper side A recording circuit 432 receives the signal transmitted on the signal lines 430a and 446a when a signal line 446f is supplied with a signal in the signal level of "1" to record successively by one line the data on an A side (i.e., front side) of a recording paper. The recording paper side A recording circuit 432 records nothing when the signal line 446f is supplied with a signal in the signal level of "0". In addition, the recording paper side A recording circuit 432 stamps a stamp mark of "PERFECT ORIGINAL" on the recording paper through a signal line 436a.

A recording paper side B recording circuit 434 receives the signal transmitted on the signal line 430a when a signal line 446g is supplied with a signal in the signal level of "1" to record successively by one line the data on a B side (i.e., back side) of a recording paper. The recording paper side B recording circuit 434 records nothing when the signal line 446g is supplied with a signal in the signal level of "0".

A stamp depressing circuit 436 is a circuit for stamping, on the front side of the recording paper, a stamp mark of "PERFECT ORIGINAL" indicating that the perfect recording is made at the receiving side. The stamp depressing circuit 436 stamps the stamp mark of "PERFECT ORIGINAL" on the A side of the recording paper through a signal line 436a in response to stamping pulses supplied to a signal line 446i.

A both sides original information output circuit 438 is a circuit for supplying to a signal line 438a information indicative of the perfect original (such as "PERFECT ORIGINAL") as a dot pattern when command pulses are supplied to a signal line 446h to make the circuit 438 produce information indicating that the original is the perfect one.

An information addition selecting button 440 is a button for use in determining whether information indicative of the perfect original is added when the perfect original is received and recorded on both sides of the recording paper at the receiving side. Upon depression of this button, depression pulses are supplied to a signal line 440a.

An information addition lamp 442 is a circuit for use in turning on a lamp indicating whether the information of the perfect original is added when the perfect original is received and recorded on both sides of the recording paper at the receiving side. The information addition lamp 442 is turned off when clear pulses are generated on a signal line 446j. In this way, the information addition lamp 442 is alternatively turned on and off in response to pulses on the signal line 440a. The information addition lamp 442 supplies to a signal line 442a a signal in the signal level of "0" when it is turned on to indicate that the original is the perfect one, and supplies to the signal line 442a a signal in the signal level of "1" when it is turned off without indication that the original is the perfect one.

A communication result/communication management recording production circuit 444 is a circuit for use in creating a recording on a communication result or a communication management condition. The communication result/communication management recording production circuit 444 records the communication result recording and the communication management recording supplied to a signal line 446k in response to recording command pulses supplied to a signal line 446l after supplying to the signal line 446k data for the communication result recording and the communication management recording.

The control circuit 446 transmits front and back sides of perfect originals alternatively while transmits only the front sides of one-side originals at the transmitting side of the facsimile device according to this embodiment. The control circuit 446 carries out processing for notifying the designated receiver of whether the front or back side (i.e., perfect original) is in transmission. The control circuit 446, at the receiving side capable of recording data on both sides of the recording paper, records data on the front side of the recording paper when it is notified by the transmitter of the transmission of the front side. The control circuit 446 records the data on the back side of the recording paper when it is notified by the transmitter of the transmission of the back side with indication of perfect original. In addition, the control circuit 446 at the receiving side stamps the stamp mark of "PERFECT ORIGINAL" on the front side of the perfect recording paper if addition of information is selected, determined according to selection whether the information of perfect original is added, when it receives the perfect original and records data on both sides of the recording paper.

FIGS. 42 through 45 are flow charts illustrating operation of this sixth embodiment.

First, at step S1102, a signal in the signal level of "0" is supplied to the signal line 446a to turn off the CML. At step S1104, a signal in the signal level of "0" is supplied to the signal line 446e to make the modulator 422 be ready for receiving the signal on the signal line 414a. At step S1106, a signal in the signal level of "0" is supplied to the signal line 446f not to perform recording on the A side (front side) of the recording paper. At step S1108, a signal in the signal level of "0" is supplied to the signal line 446g not to perform recording on the B side (back side) of the recording paper.

Subsequently, at steps S1110 and S1112, it is determined whether reception or transmission is selected. If transmission is selected, step S1116 follows. On the other hand, if reception is selected, step S1115 is executed. If neither transmission nor reception is selected, other processing is carried out at step S1114.

At the step S1116, a signal in the signal level of "1" is supplied to the signal line 446a, whereby turning on the CML. At step S1118, 1 is set into a page counter used for sender page or the like. At step S1120, 0 is set into a counter that counts the number of the perfect pages. At step S1122, 0 is set into a counter that counts the number of the one-side pages. At step S1124, a signal in the signal level of "0" is supplied to the signal line 446e to make the modulator 422 be ready for receiving the signal on the signal line 414a.

Next, at step S1126, pre-procedures are carried out. In this embodiment, it is notified during the pre-procedures whether the destination receiver is capable of perfect recording. Accordingly, this notification is received and recorded. In addition, if the destination receiver has the function of perfect recording, the destination receiver is notified that the subsequent page is on the front side through an NSS signal.

At step S1128, information on the front side of the original is received through the reading circuit 410 and the encoding circuit 414. The read information is subjected to magnification conversion, encoded and transmitted. At step S1130, information on the back side of the original is read through the reading circuit 412 and the encoding circuit 416. The read information is subjected to the magnification conversion and encoded in the same coding method as those used for the front side information. The coded information is stored in the memory circuit 418.

At step S1132, it is determined whether reading of one page is completed. If it has not completed yet, step S1128 is carried out. If completed, step S1134 is executed.

At the step S1134, it is determined whether the back side has printing printed thereon. If there is a back-side printing, step S1136 follows, and otherwise, step S1154 is carried out.

At the step S1136, intermediate procedures are performed. In this event, if the receiver is adapted to perfect recording, the receiver is notified through a procedure signal that the subsequent page is on the back side. At step S1138, a signal in the signal level of "1" is supplied to the signal line 446e to make the modulator 422 be ready for receiving the signal on the signal line 420a. At step S1140, the information stored in the memory circuit is encoded and transmitted through the signal lines 446c and 446d.

At step S1142, it is determined whether the transmission is completed. If completed, step S1144 is carried out to increment the both sides page counter by one because the transmitted original is the perfect one.

At step S1146, it is determined whether there is a subsequent page. If there is a subsequent page, step S1148 is carried out to increment by one the page counter that counts the number of pages. If no subsequent page is left, step S1156 follows to carry out post-procedures.

At step S1150, intermediate procedures are carried out. In this event, if the receiver is adapted for perfect receiving, it is notified through a procedure signal that the subsequent page is on the front side. At step S1152, a signal in the signal level of "0" is supplied to the signal line 446e. In response to this, the modulator 422 receives the signal on the signal line 414a. Then, the control returns to the step S1128.

At the step S1154, the one-side page counter is incremented by one because the original is the one-side one. Then the above mentioned step S1146 is carried out.

If reception is selected at the step S1112, a signal in the signal level of "1" is supplied to the signal line 446a at step S1158 to turn on the CML. At step S1160, 0 is set into the counter that counts the number of the perfect pages. In addition, at step S1162, 0 is set into the counter that counts the number of the one-side pages.

At step S1164, pre-procedures are carried out. In this event, the mating transmitter is notified that the perfect recording is available. Then, the receiver records the subsequent side (front or back) transmitted from the transmitter.

Next, at step S1166, it is determined whether the front side is indicated or recording with no indication. If it is recording with indication of the front side or without indication, step S1168 is carried out. If it is recording with indication of the back side, step S1184 follows.

At the step S1168, a signal in the signal level of "1" is supplied to the signal line 446f to record information on the A side (front side) of the recording paper through the recording circuit 432.

At step S1170, it is determined whether reception of one page is completed. If reception of the one page is completed, step S1172 is carried out, and otherwise, the step S1168 is again executed.

At the step S1172, intermediate procedures are carried out. In this event, the subsequent side (front or back) is recorded. Next, at step S1174, it is determined whether there is a subsequent page to be transmitted. If the subsequent page is to be transmitted, step S1180 is carried out. If there is no subsequent page to be transmitted, step S1176 is carried out to increment the one-side counter by one because the original is the one-side one. Next, at step S1178, post-procedures are carried out, and the control returns to the step S1102.

In addition, at the step S1180, it is determined whether the transmitted one is the back side information. If it is the front side information or there is no indication regarding to the side, step S1182 is carried out to increment the one-side page counter by one because the original is the one-side one. On the other hand, if it is the back side information, step S1184 is carried out.

At the step S1184, a signal in the signal level of "1" is supplied to the signal line 446e to record the information on the B side (back side) of the recording paper through the recording circuit 434. Next, at step S1186, it is determined whether reception of one page is completed. If completed, step S1188 is carried out to increment the both sides page counter by one because the original is the perfect one. If reception of one page is not competed, the step S1184 is carried out.

At step S1190, a signal on the signal line 442a is received to determine whether the signal is in the signal level of "1". In other words, it is determined whether to stamp the stamp mark indicating the perfect original is selected if the transmitted original is the perfect one. If to stamp the stamp mark is selected, the stamping pulses are supplied to the signal line 446i to stamp the stamp mark on the front side of the original indicating the perfect original through the stamp depression circuit 436 (S1192) and step S1194 follows. If to stamp the stamp mark is not selected, the step S1194 is carried out.

At the step S1194, intermediate procedures are carried out. In this event, the subsequent side (front or back) is recorded. Next, at step S1196, it is determined whether there is a subsequent page. If there is a subsequent page, the step S1166 is again executed. On the other hand, if no subsequent page is left, the step S1178 is carried out.

In the above mentioned sixth embodiment, the stamp mark is stamped only when selection is made whether it is recorded that the receiver carries out perfect recording. However, "PERFECT RECORDING" may be recorded through character sequence information. More specifically, command pulses may be supplied to the signal line 446h at the step S1192 rather than supplying the stamping pulses to the signal line 446i.

In addition, both transmitting and receiving sides may record, as the communication result report and the communication management report, the number of total pages transmitted (the above mentioned page counter) and the details thereof, i.e., the number of the pages with the one-side information (the above mentioned one-side page counter) and the number of pages with the perfect information (the both sides page counter).

In the above mentioned sixth embodiment, the direct communication has been described. In such a case, one-side or perfect of a proceeding page to be communicated may be notified during the pre-procedures prior to transmission of the image information when the receiver is capable of perfect recording. Recording may be facilitated at the receiver with this information received before starting of recording. In other words, the recording becomes more easily if the original is only the one-side one. In addition, to stamp the stamp mark of the perfect original may be readily.

Figure 46B:
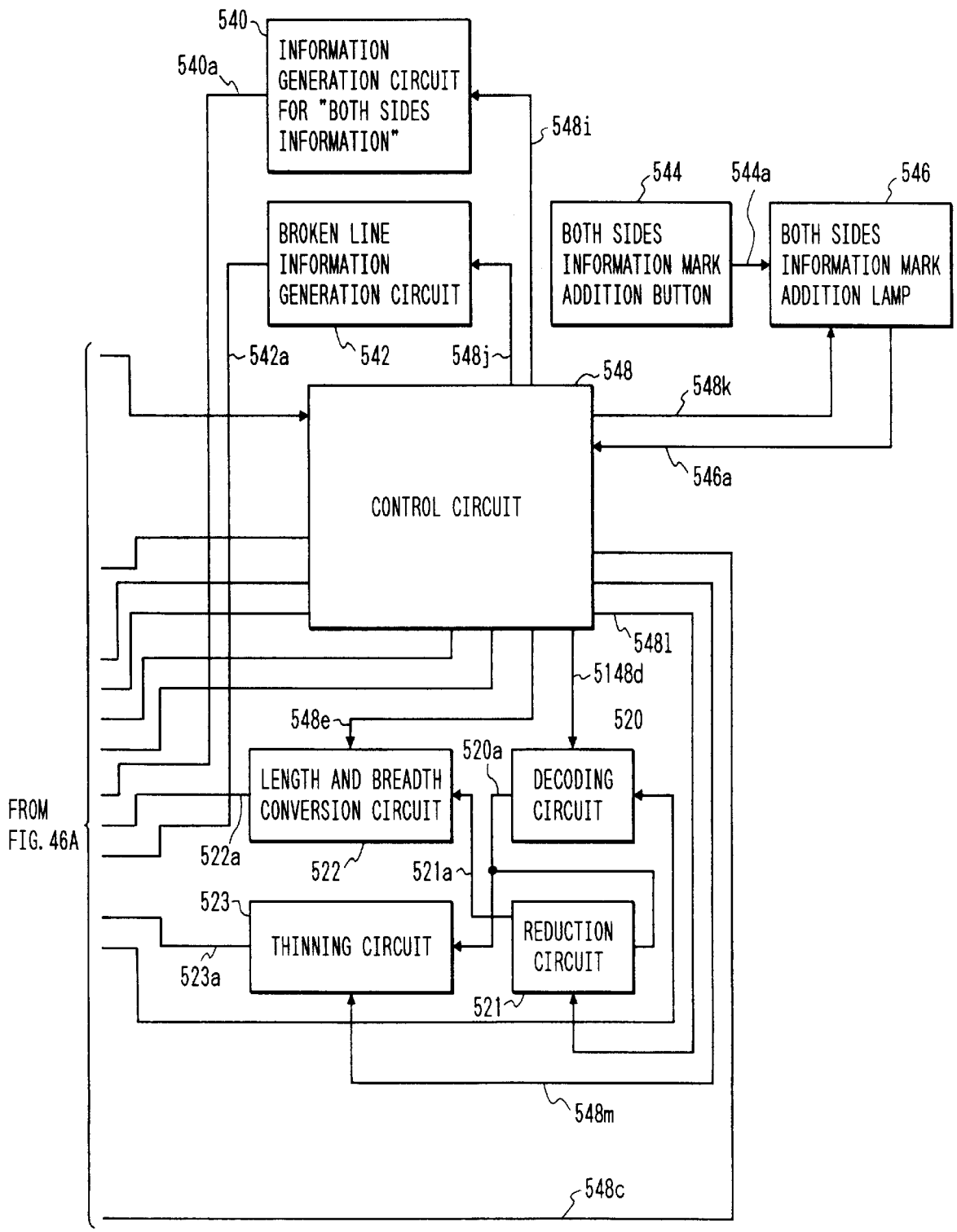
FIG. 46, comprised of FIGS. 46A and 46B, is a block diagram showing a seventh embodiment of the present invention.
Figure 47B:
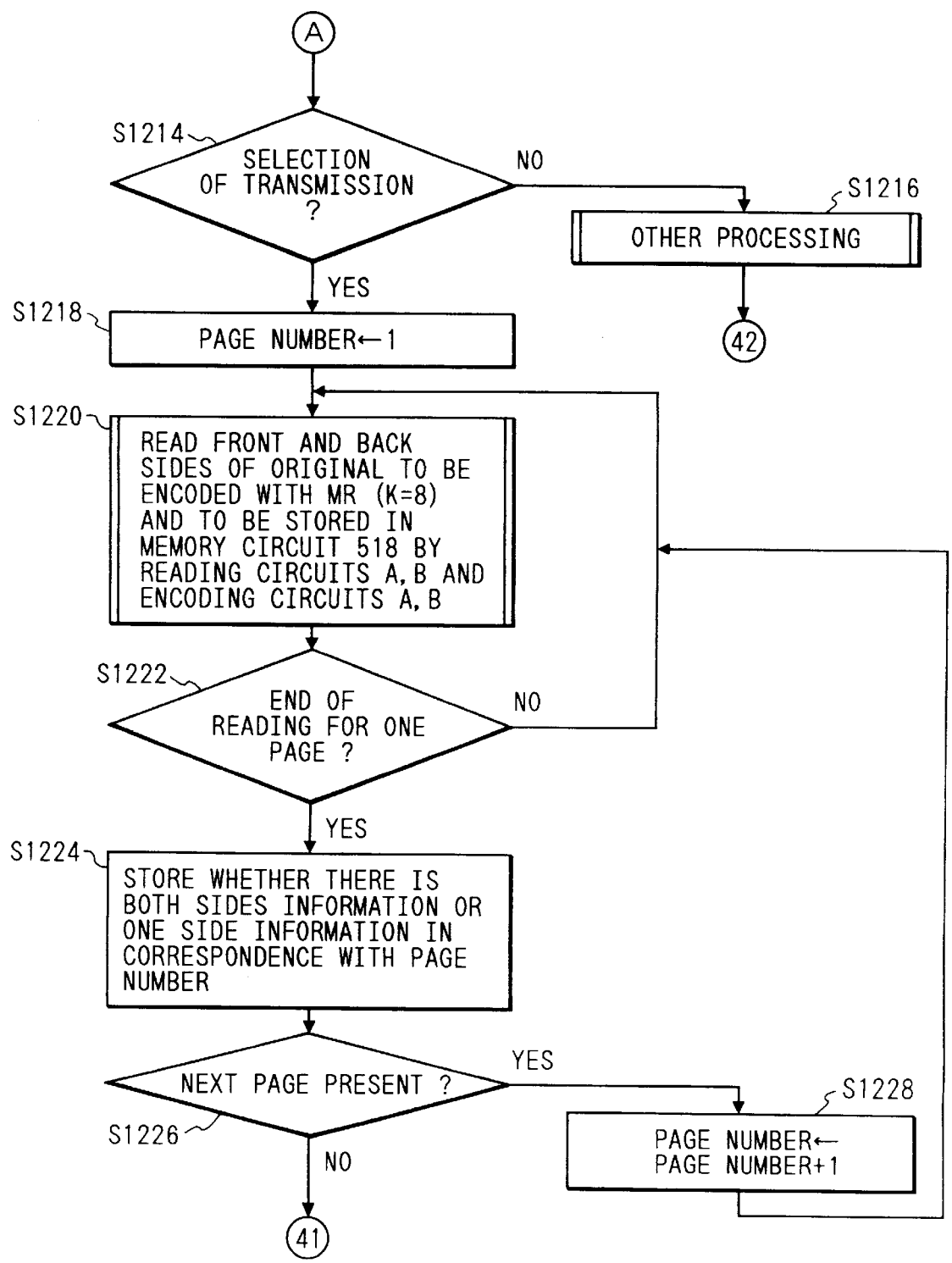
FIG. 47, comprised of FIGS. 47A and 47B, is a flow chart illustrating operation of the seventh embodiment.
Figure 48B:
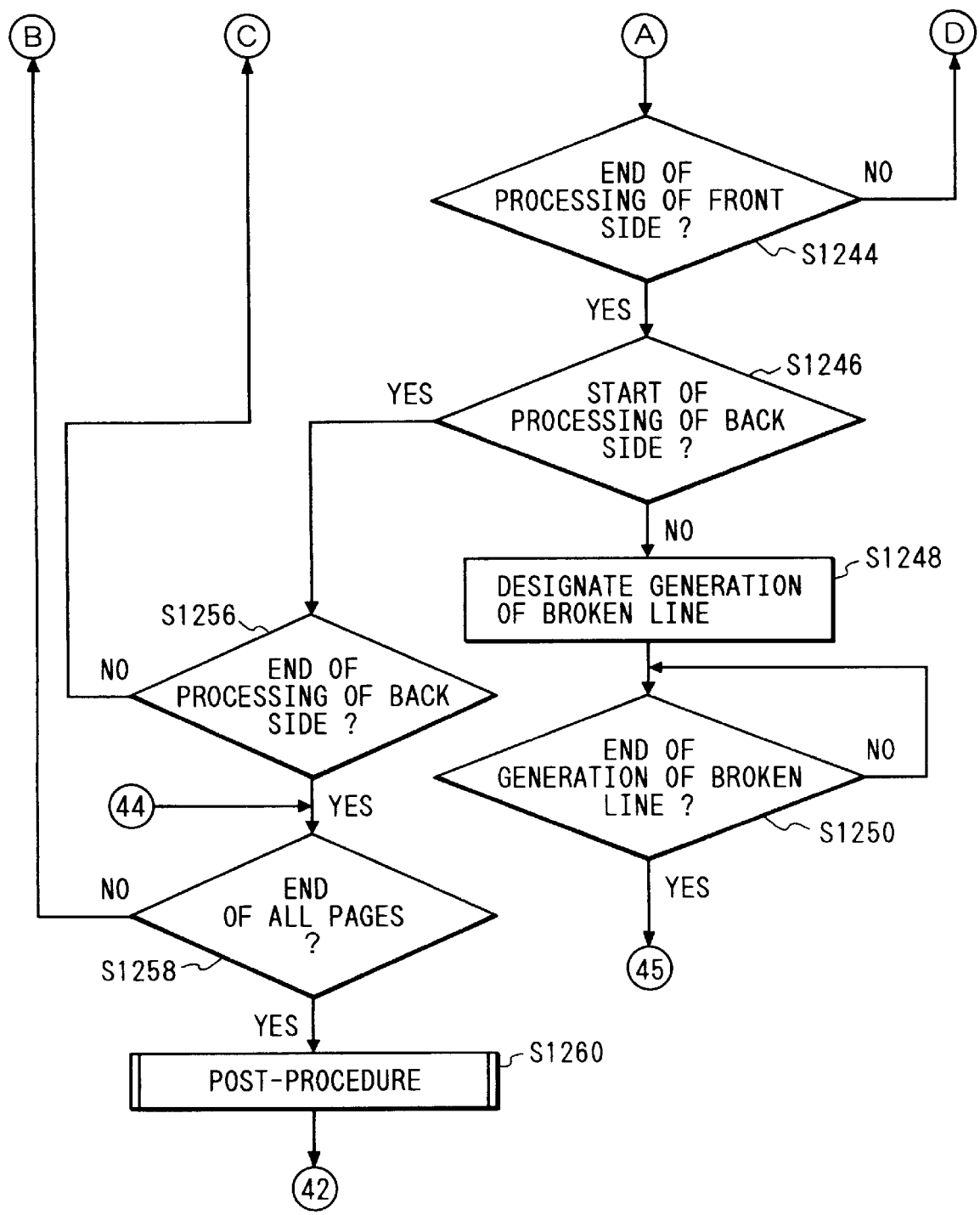
FIG. 48, comprised of FIGS. 48A and 48B, is a flow chart illustrating operation of the seventh embodiment.
Figure 49:
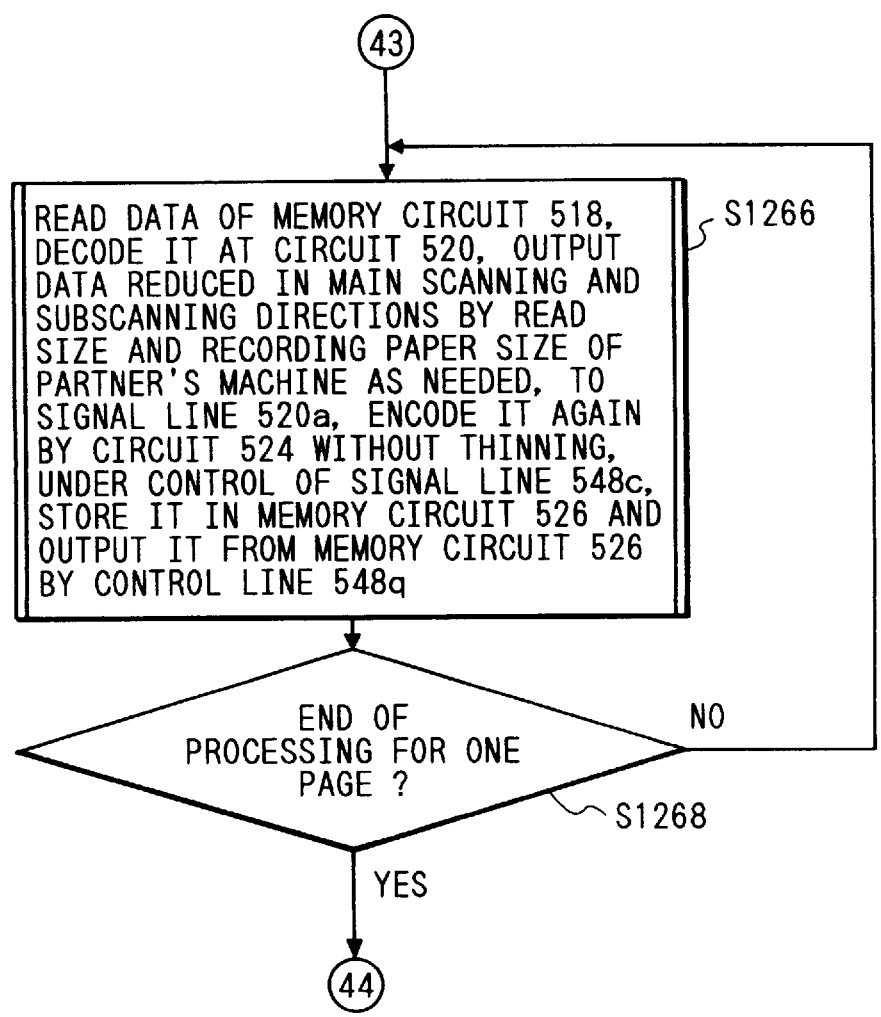
FIG. 49 is a flow chart illustrating operation of the seventh embodiment.

Next, a seventh embodiment of the present invention is described. FIGS. 46A and 46B are block diagrams showing this seventh embodiment.

A network control unit (NCU) 502 is provided for connecting a terminal of a telephone line, controlling connection of telephone switching network, switching data communication paths and holding a loop, thereby allowing use of a telephone network for data communication or the like. In addition, the NCU 502 is capable of connecting a telephone line 502a to a telephone 504 when a signal level (a signal line 548a) supplied from a control circuit 548 is in "0" while connecting the telephone line 502a to a facsimile apparatus when the signal level is in "1". In a normal condition, the telephone line 502a is connected to the telephone 504.

A hybrid circuit 506 is provided for separating a transmitting signal from a receiving signal, transmitting a transmitted signal supplied from an adding circuit 530 to the telephone line 502a through the NCU 502, receiving through the NCU 502 a signal supplied from another apparatus, and transmitting the received signal to a V.29 demodulator 534 and a V.21 demodulator 532 through a signal line 506a.

A V.21 modulator 508 is a modulator for carrying out a modulation operation according to V.21, a well-known CCITT standard. The V.21 modulator 508 modulates a procedure signal (signal line 548b) supplied from the control circuit 548 to transmit the same through a signal line 508a to the adding circuit 530.

An original side A reading circuit 510 is provided for reading successively image signals for one line in a main scanning direction of an A side (i.e., front side) of a transmitted original, creating a signal sequence of binary data indicative of white and black, and transmits the data through a signal line 510a to an encoding circuit A 514. The original side A reading circuit 510 comprises an image pick-up cell such as a charged-coupled device (CCD) and an optical system.

An original side B reading circuit 512 is provided for reading successively image signals for one line in a main scanning direction of a B side (i.e., back side) of a transmitted original, creating a signal sequence of binary data indicative of white and black, and transmits the data through a signal line 512a to an encoding circuit B 516. The original side B reading circuit 512 comprises an image pick-up cell such as a charged-coupled device (CCD) and an optical system.

The encoding circuit A 414 receives a data transmitted on the signal line 510a and carries out an encoding operation (MH coding or MR coding) to send the coded data through a signal line 514a to a memory circuit 518 and a modulator 528.

The encoding circuit B 516 receives a data transmitted on the signal line 512a and carries out an encoding operation (MH coding or MR coding) to send the coded data through a signal line 516a to the memory circuit 518.

The memory circuit 518 stores the encoded data transmitted on the signal line 514a or 516a in accordance with the control made by the control circuit 548 through a signal line 548c. The memory circuit 518 sends the stored data through a signal line 518a to a decoding circuit 520.

The decoding circuit 520 is a circuit for use in carrying out a decoding operation (MH decoding or MR decoding) on the data supplied through the signal line 518a. The decoding circuit 520 supplies the decoded data through a signal line 520a to a reduction circuit 521 and a thinning circuit 523.

The reduction circuit 521 receives the signal supplied to the signal line 520a to reduce the same in both the main and sub scanning direction at the magnification supplied from the control circuit 548 to a signal line 5481. The reduction circuit 520 supplies the reduced data to a length and breadth conversion circuit 522 through a signal line 521a.

The length and breadth conversion circuit 522 stores the reduced data supplied from the reduction circuit 521 through the signal line 521a when a signal in the signal level of "1" is supplied from the control circuit 548 to the signal line 548e. The length and breadth conversion circuit 522 carried out a length and breadth conversion on the stored data and supplies it to a signal line 522a. When a signal in the signal level of "0" is supplied from the control circuit 548 to the signal line 548e, the length and breadth conversion circuit 522 supplies the signal from the signal line 521a to the signal line 522a without conversion.

The thinning circuit 523 receives the signal on the signal line 520a. The thinning circuit 523 supplies to a signal line 523a a signal obtained by means of thinning by one line from the input signal when a signal in the signal level of "1" is supplied to a signal line 548m. When a signal in the signal line of "0" is present on the signal line 548m, the thinning circuit 533 supplies the input signal to the signal line 523a without thinning.

An encoding circuit 524 receives and encodes (MH coding or MR coding) the signal on the signal line 522a, 523a, 540a or 542a in accordance with the control supplied from the control circuit 548 through a signal line 548f. The encoding circuit 524 supplies the coded signal to a memory circuit 526 through a signal line 524a.

The memory circuit 526 stores the data on the signal line 524a in accordance with the control supplied from the control circuit 548 through a signal line 548g. The memory circuit 526 supplies the stored data to a modulator 528 through a signal line 526a.

The V.27 ter or V.29 modulator 528 receives encoded data on the signal line 526a. The V.27 ter or V.29 modulator 528 carries out a modulation operation according to V.27 ter (differential phase modulation) or V.29 (orthogonal modulation), well-known CCITT standards to supply the modulated data to the adding circuit 530 through a signal line 528a.

The adding circuit 530 is a circuit for adding the outputs of the modulators 508 and 528. An output of the adding circuit 530 is supplied to the hybrid circuit 506.

A V.21 demodulator 532 is for carrying out a demodulation operation according to V.21, a well-known CCITT standard. The demodulator 532 receives a procedure signal supplied from the hybrid circuit 506 through a signal line 506a. The demodulator 532 carries out the V.21 demodulation operation to supply a demodulated data to the control circuit 548 through a signal line 532a.

The V.27 ter or V.29 demodulator 534 is for carrying out a demodulation operation according to V.27 ter or V.29, well-known CCITT standards. The demodulator 534 receives a modulated image signal supplied from the hybrid circuit 506. The demodulator 534 carries out a demodulation operation and supplies a demodulated data to a decoding circuit 536 through a signal line 534a.

The decoding circuit 536 decodes (MH decoding or MR decoding) the data supplied from the demodulator 534 through the signal line 534a. The decoding circuit 536 supplies a decoded data to a recording circuit 538 through a signal line 536a.

The recording circuit 538 receives the signal on the signal line 536a to record successively by one line the data.

An information generation circuit 540 for both sides information is a circuit for supplying to a signal line 540a information indicative of "PERFECT INFORMATION" as a dot pattern when pulses are supplied to a signal line 548i from the control circuit 548 to make the circuit 540 generate the "PERFECT INFORMATION".

A broken line information generation circuit 542 is for use in supplying to a signal line 542a broken information as a dot pattern when broken information generation pulses are supplied from the control circuit 548 to a signal line 548j.

A both sides information addition button 544 is a button for use in determining whether "PERFECT INFORMATION" is added to transmitted information when the perfect information is read and transmitted as information of one page with the front and back side combined together on one side. Upon depression of this button 544, depression pulses are supplied to a signal line 544a.

A both sides information mark addition lamp 546 is for use in indicating whether addition of a "PERFECT INFORMATION" mark to the transmitted information is selected. The both sides information mark addition lamp 546 adds the "PERFECT INFORMATION" mark when it is turned on. On the contrary, the both sides information mark addition lamp 546 does not add the "PERFECT INFORMATION" mark when it is turned off. The both sides information mark addition lamp 546 is turned off when clear pulses are generated on a signal line 548k. In this way, the both sides information mark addition lamp 546 is alternatively turned on and off in response to pulses on the signal line 544a. The both sides information mark addition lamp 546 supplies to a signal line 546a a signal in the signal level of "0" when it is turned off and supplies to the signal line 546a a signal in the signal level of "1" when it is turned on.

The control circuit 548 in the facsimile device capable of reading both side information according to this embodiment encodes the perfect information with the resolution in the sub scanning direction reduced into half for both the front and back sides. More specifically, the control circuit 548 encodes the information by means of thinning by one line. The control circuit 548 puts a broken line at the boundary between the front side and the back side, thereby transmitting the information for both the front and back sides as the information of one page. In this event, if the both sides information mark addition lamp 546 is turned on upon transmission of the perfect information as the information of one page, the control circuit 548 adds the information of "PERFECT INFORMATION" to the original information. On the contrary, if the both sides information mark addition lamp 546 is turned off, the control circuit 548 does not add the information of "PERFECT INFORMATION" to the original information.

FIGS. 47A through 49 are flow charts illustrating operation of this seventh embodiment.

At step S1202, the clear pulses are supplied to the signal line 548k to turn off the both sides information mark addition lamp. At step S1204, a signal in the signal level of "0" is supplied to the signal line 548a to turn off the CML.

Subsequently, at step S1206, a signal in the signal level of "0" is supplied to the signal line 548e. In response to this, the length and breadth conversion circuit 522 receives the signal on the signal line 521a and supplies it to the signal line 522a without carrying out the length and breadth conversion operation. At step S1208, a signal in the signal level of "0" is supplied to the signal line 548m. The thinning circuit 523 thus carries out no thinning operation.

At step S1210, the coding circuit 524 is so set as to receive the signal on the signal line 523a by the control on the signal line 548f. At step S1212, a signal in the signal level of "0" is supplied to the signal line 548h to make the modulation circuit 528 be ready for receiving the signal on the signal line 526a. At step S1213, a signal in the signal level of "1" is supplied to the signal line 548l to set the reduction circuit 521 for equal magnification.

At step S1214, it is determined whether transmission is selected. If the transmission is selected, step S1218 is carried out. If the transmission is not selected, step S1216 is executed to carry out other processing.

Following is described with the assumption of memory transmission processing as the transmission operation. First, at the step S1218, 1 is set as the page number. At step S1220, the front and the back sides of the original are read (at the set original size and at the set resolution) by means of the control on the signal line 548c as well as the encoding circuit A 514, the reading circuit B 512, and the encoding circuit B 516. The read data is encoded with MR of K=8 and stored in the memory circuit 518.

At step S1222, it is determined whether reading of one page is completed. If the reading is completed, step S1224 is carried out, and otherwise, the step S1220 is executed.

At the step S1224, whether it is the perfect information or the one-side information is recorded in correspondence with the page number. At step S1226, it is determined whether there is a subsequent page. If there is a subsequent page, step S1228 is carried out to increment the page number by one. On the contrary, if there is no subsequent page, step S1230 is carried out.

At the step S1230, call is made to a designated partner by means of a calling circuit which is not shown. At step S1232, pre-procedures are carried out. At step S1234, 1 is set as the page number.

Subsequently, at step S1236, it is determined whether the original corresponding to an empty page number is the perfect information. If the original corresponding to the page number is the perfect original, step S1238 is carried out, and otherwise, step S1240 is executed.

At the step S1238, a signal in the signal level of "1" is supplied to the signal line 548m to make the thinning circuit 523 thin by one line. At step S1242, the data in the memory circuit 518 is read out of it according to the control on the signal line 548c. The read data is decoded by the decoding circuit 520. The decoded data is reduced, if necessary, in the main and sub scanning direction depending on the read size and the size of the recording paper available at the destination. The reduced data is then supplied to the signal line 520a, which is subjected to thinning by one line by the thinning circuit 523. The thinned data is encoded again by the encoding circuit 524. The encoded data is stored in the memory circuit 526 and, in turn, supplied therefrom by the control on the control line 548g.

At step S1244, it is determined whether transmission of the front side is completed. If the transmission of the front side is not completed, the step S1242 is again executed. If the transmission is completed, step S1246 is carried out.

At the step S1246, it is determined whether transmission of the back side is started. If the transmission of the front side is started, step S1256 is carried out. On the other hand, if the transmission of the back side is started, step S1248 is executed. When the step S1244 is positive (YES), then the step S1246 becomes negative (NO) once, following which the step S1246 becomes affirmative (YES) before the subsequent page is directed to transmission.

At the step S1248, broken line information generation pulses are supplied to the signal line 548j to supply the broken line information is supplied to the signal line 524a as the dot pattern, indicating the boundary between the front and the back sides. At step S1250, it is determined whether generation of the broken line is completed. If the generation of the broken line is completed, step S1252 is carried out.

At the step S1252, a signal on the signal line 546a is received to determine whether the signal level thereof is in "1", i.e., whether the both sides information mark addition lamp 546 is turned on. If the both sides information mark addition lamp 546 is turned on, step S1254 is carried out. If the both sides information mark addition lamp is turned off, the step S1242 is again executed.

At the step S1254, pulses are supplied to the signal line 548i for generating the "PERFECT INFORMATION" information. The "PERFECT INFORMATION" data is supplied to the signal line 540a as dot pattern information. Then, the control returns to the step S1242.

At the step S1256, it is determined whether transmission of the back side is completed. If the transmission of the back side is completed, step S1258 is carried out. If the transmission of the back side is not completed, the step S1242 is again executed.

At the step S1258, it is determined whether transmission of all pages is completed. If the transmission of the all pages is completed, step S1260 is executed to carry out postprocedures. If there is one or more pages left without being transmitted, step S1262 is carried out to increment the page number by one. At following step S1264, intermediate procedures are carried out. Then, the control returns to the step S1236.

At the step S1240, a signal in the signal level of "0" is supplied to the signal line 548m. In response to this, the thinning circuit 523 is set not to perform the thinning operation. At step S1266, the data in the memory circuit 518 is read out of it by the control on the signal line 548c. The read data is decoded by the decoding circuit 520. The decoded data is reduced, if necessary, in the main and sub scanning direction depending on the read size and the size of the recording paper available at the destination. The reduced data is then supplied to the signal line 520a, which is not subjected to thinning by the thinning circuit 523. The thinned data is encoded again by the encoding circuit 524. The encoded data is stored in the memory circuit 526 and, in turn, supplied therefrom by the control on the control line 548g.

At step S1268, it is determined whether transmission of one page is completed. If the transmission of one page is completed, the step S1258 is again executed. If the transmission of one page is not completed, the step S1266 is again executed.

Figure 50:
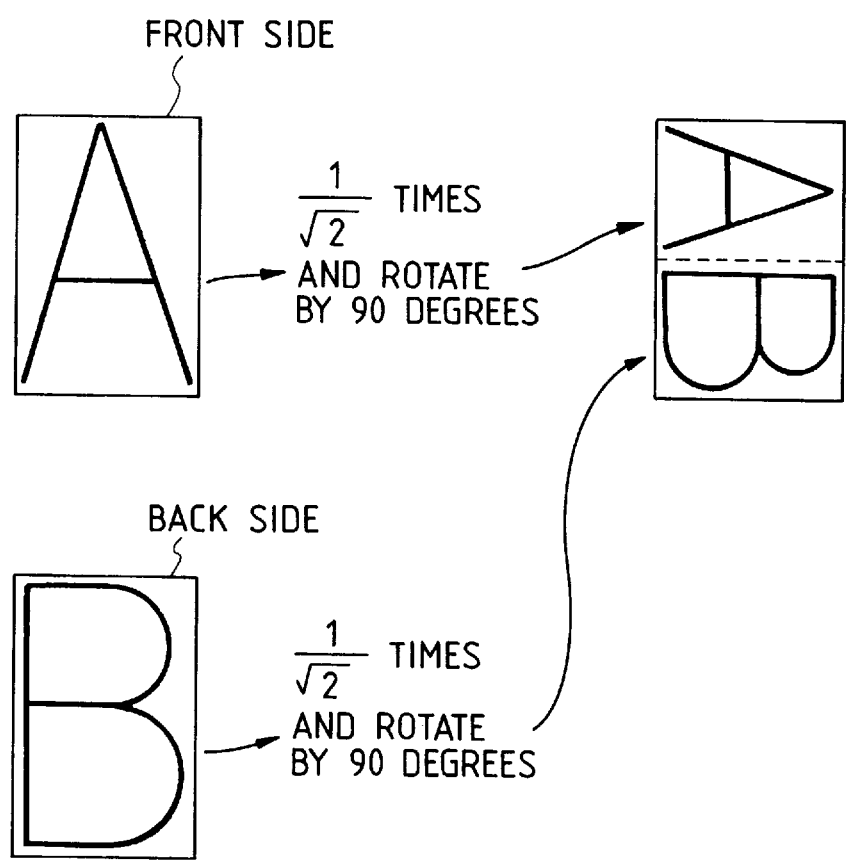
FIG. 50 is a view for use in describing a case where information on the face and that on the back of an original are rotated 90 degrees and transmitted as information for one page according to a first modification of the seventh embodiment, in which illustrated are exemplified images being transmitted.

In the above mentioned seventh embodiment, the data on the front and the back sides are rendered the information of one page by means of thinning by one line the data with the resolution in the sub scanning direction being reduced into half the perfect original. However, for the perfect original, both the front and the back sides may be reduced at a predetermined magnification (reduction to $2^{1/2}$, for example) in both the main and the sub scanning directions. The information may be rotated by 90° to transmit the information on the front and the back sides as the information of one page. An example of such transmission method is shown in FIG. 50.

Figure 51:
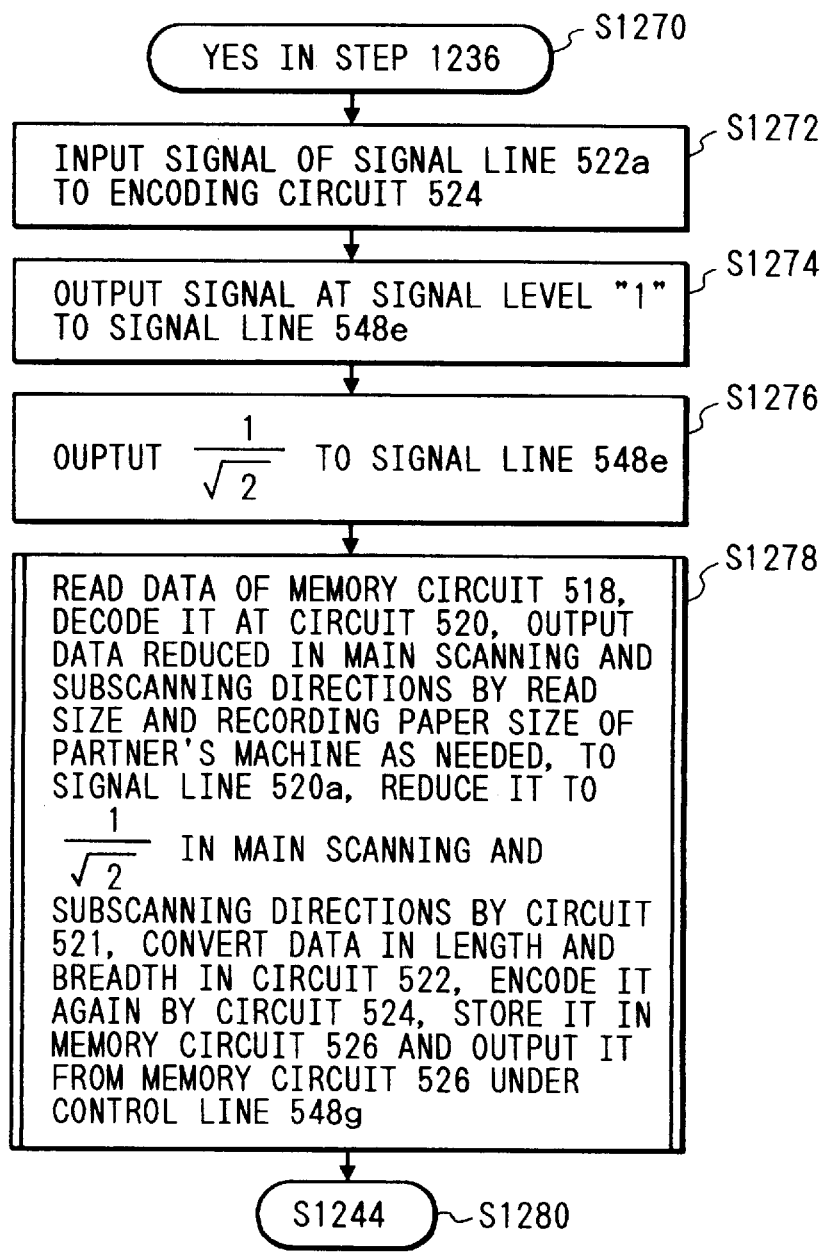
FIG. 51 is a flow chart illustrating operation of the first modification of the seventh embodiment.

FIG. 51 is a flow chart illustrating control in such a case. Illustrated is only the difference from the operation described above in conjunction with FIGS. 47A through 49.

In FIG. 51, step S1270 corresponds to the positive result (YES) at the step S1236. At step S1272, the encoding circuit 524 is ready for receiving the signal on the signal line 522 by the control on the signal line 548f.

At step S1274, a signal in the signal level of "1" is supplied to the signal line 548e to make the length and breadth conversion circuit 522 carry out the length and breadth conversion operation. At step S1276, $2^{1/2}$ is supplied to the signal line 548e to reduce at $2^{1/2}$ times in both the main and the sub scanning directions. This means that an A4 original is reduced into an A5 original.

At step S1278, the data in the memory circuit 518 is read out of it by the control on the control line 548c. The read data is decoded by the decoding circuit 520. The decoded data is reduced, if necessary, in the main and the sub scanning directions depending on the read size and the size of the recording paper at the destination. The reduced data is then supplied to the signal line 520a. This data is further reduced by the reduction circuit 521 to $2^{1/2}$ in both the main and the sub scanning directions. The resultant data is subjected to the length and breadth conversion by the length and breadth conversion circuit 522. The converted data is again encoded by the encoding circuit 524. The encoded data is stored in the memory circuit 526 and, in turn, supplied therefrom by the control on the control line 548g. Next, at step S1280, the control passes to the above mentioned processing at the step S1244.

In the above mentioned seventh embodiment, if the original is the perfect one, the read information is reduced to make it suitable for the size of the recording paper and subjected to the length and breadth conversion with the data being converted into ½ in the area. The reduction of $2^{1/2}$ in the main and the sub scanning directions to achieve this is made independently in the above mentioned embodiment. However, this reduction may be made at once by, for example, the reduction circuit 521.

In addition, if the information of the first page indicates that it is for the perfect original, the following pages may be transmitted as the perfect originals. In such a case, if a one-side original is slipped, the half may be transmitted as all-white information.

Figure 52:
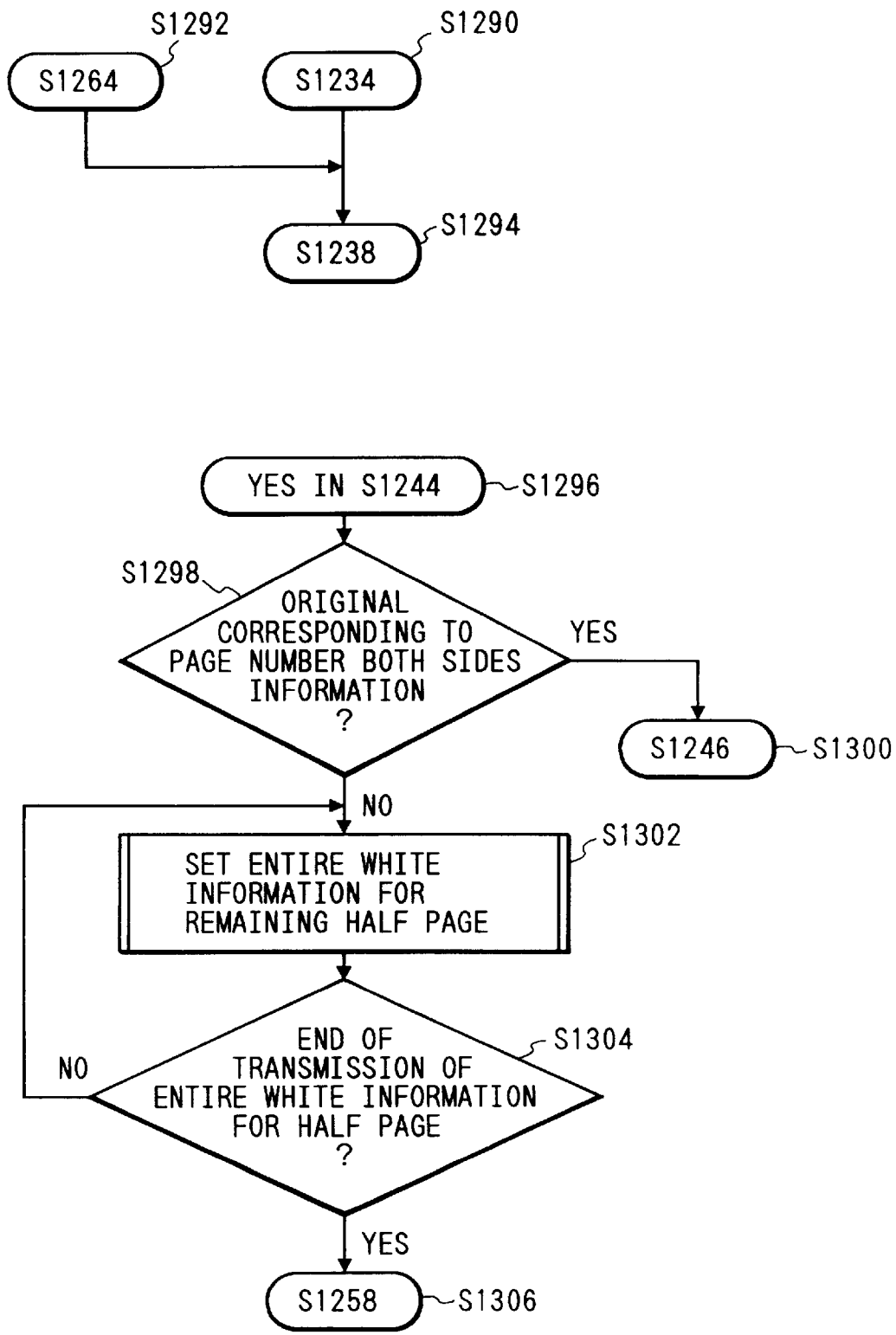
FIG. 52 is a flow chart illustrating operation of a second modification of the seventh embodiment.

FIG. 52 is a flow chart illustrating control in such a case. Illustrated is only the difference from the operation described above in conjunction with FIGS. 47A through 49.

In FIG. 52, steps S1290, S1292 and S1294 correspond to the above mentioned steps S1234, S1264 and S1238, respectively.

In addition, step S1296 corresponds to the positive result at the step S1244. At step S1298, it is determined whether the original corresponding to the page number is the perfect information. If the original corresponding to the page number is the perfect information, step S1300 (S1246) is carried out. If the original corresponding to the page number is the one-side information, step S1302 is carried out. At the step S1302, the remaining half page is dealt as entire white information.

Subsequently, at the step S1304, it is determined whether transmission of the entire white information of half page is completed. If the step S1304 is affirmative, step S1306 (the above mentioned step S1258) follows. If the step S1304 is negative, the step S1302 is again executed to repeat the processing.

Next, an eighth embodiment of the present invention is described.

In generally, it becomes possible to effectively use recording papers by means of recording the received information on both sides of the recording paper because two pages of the original is printed on one recording paper. However, if all pieces of the received information are recorded on both sides of the recording paper, the one on the back side may be overlooked. This may results in a serious problem if the back side has certain important information printed thereon. Such a problem may be caused more likely when a facsimile device that is capable of recording only on one side of the recording paper is disposed near a facsimile apparatus adapted for perfect recording.

With this respect, this eighth embodiment is directed to avoid the problem of overlooking of the back side especially in an important document by means of distinguishing between the use of perfect recording and the use of one-side recording depending on the received information.

Figure 53B:
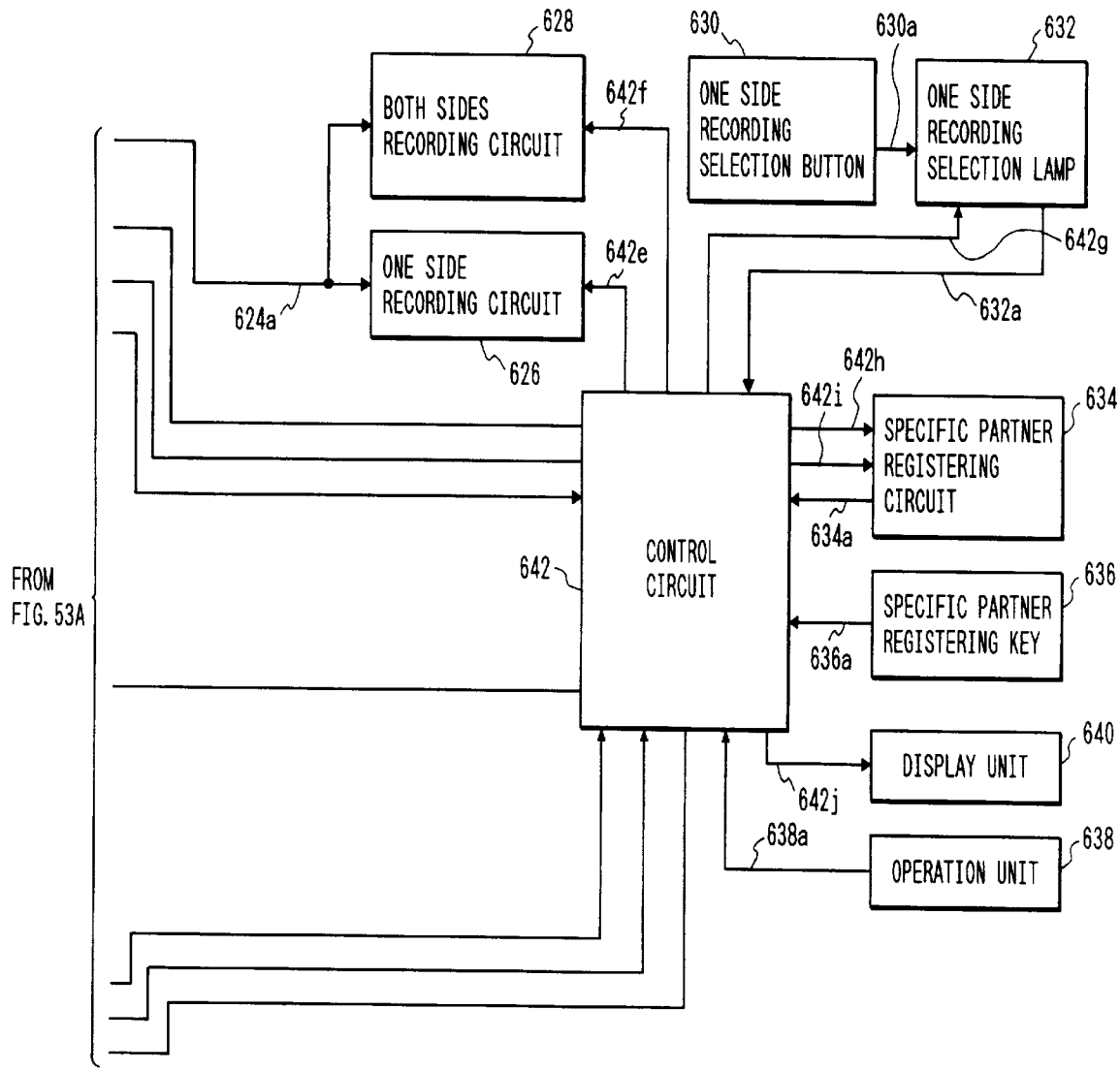
FIG. 53, comprised of FIGS. 53A and 53B, is a block diagram showing an eighth embodiment of the present invention.

FIGS. 53A and 53B are block diagrams showing the eighth embodiment.

A network control unit (NCU) 602 is provided for connecting a terminal of a telephone line, controlling connection of telephone switching network, switching data communication paths and holding a loop, thereby allowing use of a telephone network for data communication or the like. A signal lines 602a is a telephone line from line wires while a signal line 602b is a telephone line from extensions.

The NCU 602 connects the telephone line 602a from the line wires to a telephone 604 when a signal supplied from a control circuit 642 to a signal line 642a is in the signal level of "0" while it connects the telephone line 602a from the line wires to a facsimile when the signal level is in "1". In addition, the NCU 602 connects the telephone line 602b from the extensions to the telephone 604 when the signal level is in "2" while it connects the telephone line 602b from the extensions to the facsimile when the signal level is in "3".

Further, the NCU 602 supplies a signal in the signal level of "1" to a signal line 602e if there is an incoming signal on the telephone line 602a from the line wires. The NCU 602 supplies a signal in the signal level of "0" to the signal line 602e if there is no incoming data on the telephone line 602a. Likewise, the NCU 602 supplies a signal in the signal level of "1" to a signal line 602f if there is an incoming signal on the telephone line 602b from the extensions. The NCU 602 supplies a signal in the signal level of "0" to the signal line 602f if there is no incoming data on the telephone line 602b.

A hybrid circuit 606 is provided for separating a transmitting signal from a receiving signal, transmitting a transmitted signal supplied from an adding circuit 616 to the telephone lines 602a and 602b through the NCU 602, receiving through the NCU 602 a signal supplied from another device, and transmitting the received signal to a V.29 demodulator 620 and a V.21 demodulator 618 through a signal line 606a.

A V.21 modulator 608 is a modulator for carrying out a modulation operation according to V.21, a well-known CCITT standard. The V.21 modulator 608 modulates a procedure signal (signal line 642b) supplied from the control circuit 642 to transmit the same through a signal line 608a to the adding circuit 616.

A reading circuit 610 is provided for reading successively image signals for one line in a main scanning direction of a transmitted original, creating a signal sequence of binary data indicative of white and black, and transmits the data through a signal line 610a to an encoding circuit 612. The reading circuit 610 comprises an image pick-up cell such as a charged-coupled device (CCD) and an optical system.

The encoding circuit 612 receives a read data transmitted on the signal line 610a and carries out an encoding operation (MH coding or MR coding) to transmit the coded data through a signal line 612a.

A V.27 ter or V.29 modulator 614 receives the coded data supplied from the encoding circuit 612 through the signal line 612a. The V.27 ter or V.29 modulator 614 carries out a modulation operation according to V.27 ter (differential phase modulation) or V.29 (orthogonal modulation), well-known CCITT standards to supply the modulated data to the adding circuit 616 through a signal line 614a.

The adding circuit 616 is a circuit for adding the outputs of the modulators 608 and 614. An output of the adding circuit 616 is supplied to the hybrid circuit 606.

A V.21 demodulator 618 is for carrying out a demodulation operation according to V.21, a well-known CCITT standard. The demodulator 618 receives a procedure signal supplied from the hybrid circuit 606 through a signal line 606a. The demodulator 618 carries out the V.21 demodulation operation to supply a demodulated data to the control circuit 642 through a signal line 618a.

The V.27 ter or V.29 demodulator 620 is for carrying out a demodulation operation according to V.27 ter or V.29, well-known CCITT standards. The demodulator 620 receives a modulated image signal supplied from the hybrid circuit 606. The demodulator 620 carries out a demodulation operation and supplies a demodulated data to a memory circuit 622 and a decoding circuit 624 through a signal line 620a.

The memory circuit 622 stores the demodulated data transmitted on the signal line 620a or the signal line 612a in accordance with the control made by the control circuit 642 through a signal line 642c. The memory circuit 622 transmits the stored data to a decoding circuit 624 through a signal line 622a.

The decoding circuit 624 receives the data on the signal line 620a when a signal in the signal level of "0" is supplied from the control circuit 642 to a signal line 642d. On the other hand, the decoding circuit 624 receives the data on the signal line 622a when a signal in the signal level of "1" is supplied from the control circuit 642 to the signal line 642d. The decoding circuit 624 decodes (MH decoding or MR decoding) the data and supplies a decoded data to a one side recording circuit 626 and a both sides recording circuit 628 through a signal line 624a.

The one side recording circuit 626 receives the signal on the signal line 624a when a signal in the signal level of "1" is present on a signal line 642e to successively records by one line on one side of the recording paper. The one side recording circuit 626 carries out no recording operation when a signal in the signal level of "0" is supplied to the signal line 642e.

The both sides recording circuit 628 receives the signal on the signal line 624a when a signal in the signal level of "1" is present on a signal line 642f to successively records by one line on both sides of the recording paper. The both sides recording circuit 628 carries out no recording operation when a signal in the signal level of "1" is supplied to the signal line 642f.

A one side recording button 630 is a button depressed to select forcedly one side recording. When the one side recording button 630 is depressed, depressing pulses are supplied to a signal line 630a.

A one side recording selection lamp 632 is a lamp to indicate that the one side recording will be/is made forcedly. The one side recording selection lamp 632 is turned off when clear pulses are generated on a signal line 642g. In this way, the one side recording selection lamp 632 is alternatively turned on and off in response to filing selection button depression pulses on the signal line 630a. The lamp 632 supplies to a signal line 632a a signal in the signal level of "0" when it is turned off, and supplies to the signal line 632a a signal in the signal level of "1" when it is turned on.

A specific partner registering circuit 634 is a circuit for use in recording a specific partner where the one side recording is forcedly made. To register one where the one side recording is made in this specific partner registering circuit 634, any one (such as 01) of destination numbers (such as one hundred destinations from 00 to 99) is supplied to a signal line 634a. The signal line 634a is then supplied with a space and a telephone number (such as 03-3123-4567). Then, write pulses are supplied to a signal line 642h. To read the data registered in the specific partner registering circuit 634, the destination number (such as 01) is first supplied to the signal line 634a. Then, read pulses are supplied to a signal line 642i. In response to this, the called telephone number (such as 03-3123-4567) stored in the destination number (such as 01) is supplied to the signal line 634a.

A specific partner registering key 636 is a key used for registering a specific partner or destination. When being depressed, the specific partner registering key 636 supplies depression pulses to a signal line 636a.

An operation unit 638 comprises keys such as ten keys, a start key, an "*" key, a "#" key, automated dialing buttons, abbreviated dialing buttons, a confident key, a set key or the like. In response to depression of the key(s), the corresponding depression key information is supplied to the signal line 638a.

A display unit 640 receives the information on a signal line 642j to display the same.

The control circuit 642 in this embodiment compares, especially when reception is selected, a TSL signal transmitted from the partner transmitter with the telephone number registered in the specific partner registering circuit 634. When the TSL signal transmitted from the partner transmitter is registered in the specific partner registering circuit 634, the control circuit 642 carries out a control operation to record the received information forcedly on one side of the recording paper. If the TSL signal transmitted from the partner transmitter is not registered in the specific partner registering circuit 634, the control circuit 642 carries out a control operation to record the received information on both sides of the recording paper.

Figure 54B:
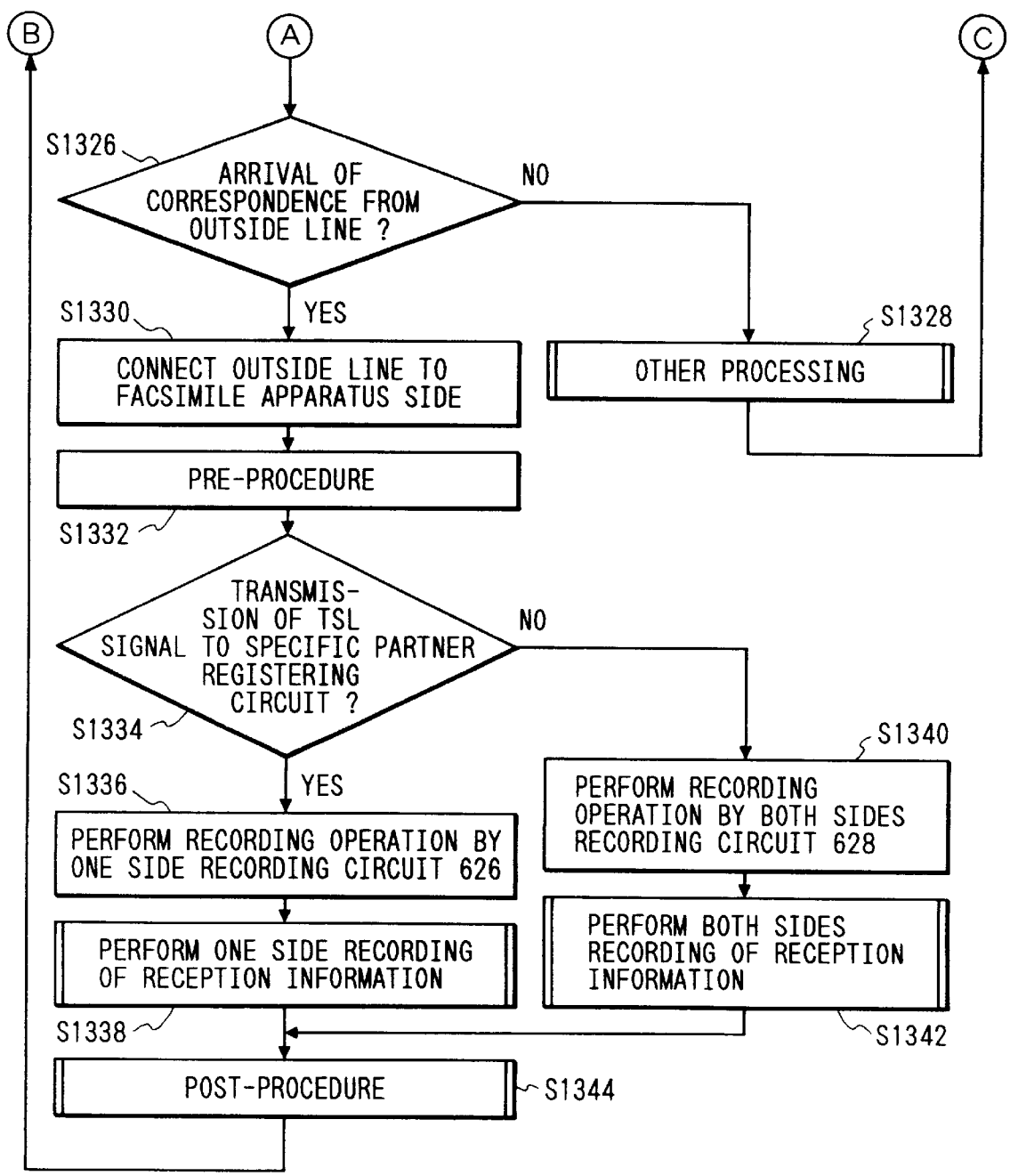
FIG. 54, comprised of FIGS. 54A and 54B, is a flow chart illustrating operation of the eighth embodiment.

FIGS. 54A and 54B are flow charts illustrating operation of the eighth embodiment.

First, at step S1312, a signal in the signal level of "0" is supplied to the signal line 642a to connect the line wire 602a to the telephone 604. At step S1314, a signal in the signal level of "0" is supplied to the signal line 642d to make the decoding circuit 624 be ready for receiving the signal on the signal line 620a. At step S1316, a signal in the signal level of "0" is supplied to the signal line 642e to prevent the one side recording circuit 626 from performing a recording operation.

At step S1318, a signal in the signal level of "0" is supplied to the signal line 642f to prevent the both sides recording circuit 628 from performing a recording operation. In addition, clear pulses are supplied to the signal line 642g to turn off the one side recording selection lamp 632.

Next, at step S1322, it is determined whether registration of the specific destination where the one side recording is made. If registration of specific partner or destination where the one side recording is made is selected, step S1324 is carried out, and otherwise, step S1326 is executed.

At the step S1324, the specific destination where the one side recording is made is registered in the specific partner registering circuit 634 and then the control passes to the step S1326.

At the step S1326, the signal on the signal line 602e is received to determine whether arrival of correspondence from the line wire is selected. If it is selected, step S1330 is carried out. If it is not selected, step S1328 is executed to carry out other processing.

At the step S1330, a signal "1" is supplied to the signal line 542a to connect the line wire 602a to the facsimile device. Then, pre-procedures are carried out at step S1332.

At step S1334, it is determined whether the TSL signal supplied from the partner is registered in the specific partner registering circuit 634. If it is registered, step S1336 is carried out. If it is not registered, step S1340 follows.

At the step S1336, a signal in the signal level of "1" is supplied to the signal line 642e to make the one side recording circuit 626 be ready for recording operation. At step S1338, the received information is recorded on one side of the recording paper through the signal line 642c.

On the other hand, at the step S1340, a signal in the signal level of "1" is supplied to the signal line 642f to make the both sides recording circuit 628 be ready for recording operation. At step S1342, the received information is recorded on both sides of the recording paper through the signal line 642c.

Subsequently, post-procedures are carried out at step S1344. Then, the control returns to the initial condition (S1312).

While the above eighth embodiment has thus been described in conjunction that the received information from a specific partner is recorded on one side of the paper, the information may be recorded on one side of the paper only when the one side recording selection lamp 632 is turned on.

Figure 55:
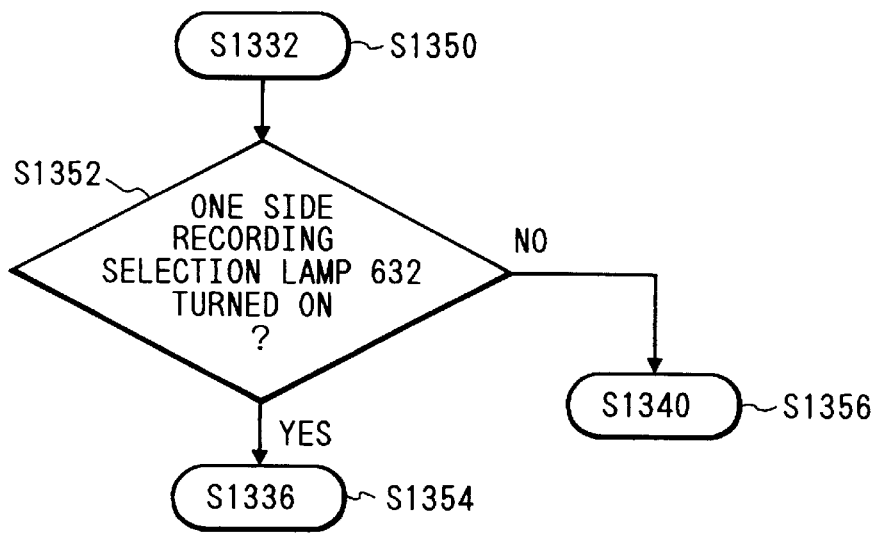
FIG. 55 is a flow chart illustrating operation of a first modification of the eighth embodiment.

FIG. 55 is a flow chart illustrating a difference from FIGS. 54A and 54B in the operation in such a case.

Step S1350 corresponds to the above mentioned step S1332. At step S1352, the signal on the signal line 632a is received to determine whether the one side recording selection lamp 632 is turned on, i.e., whether the signal on the signal line 632a is in the level of "1". If the one side recording selection lamp 632 is turned on, step S1354 (the above mentioned step S1336) is carried out. If the one side recording selection lamp 632 is not turned on, step S1356 (the above mentioned step S1340) is carried out.

Figure 56:
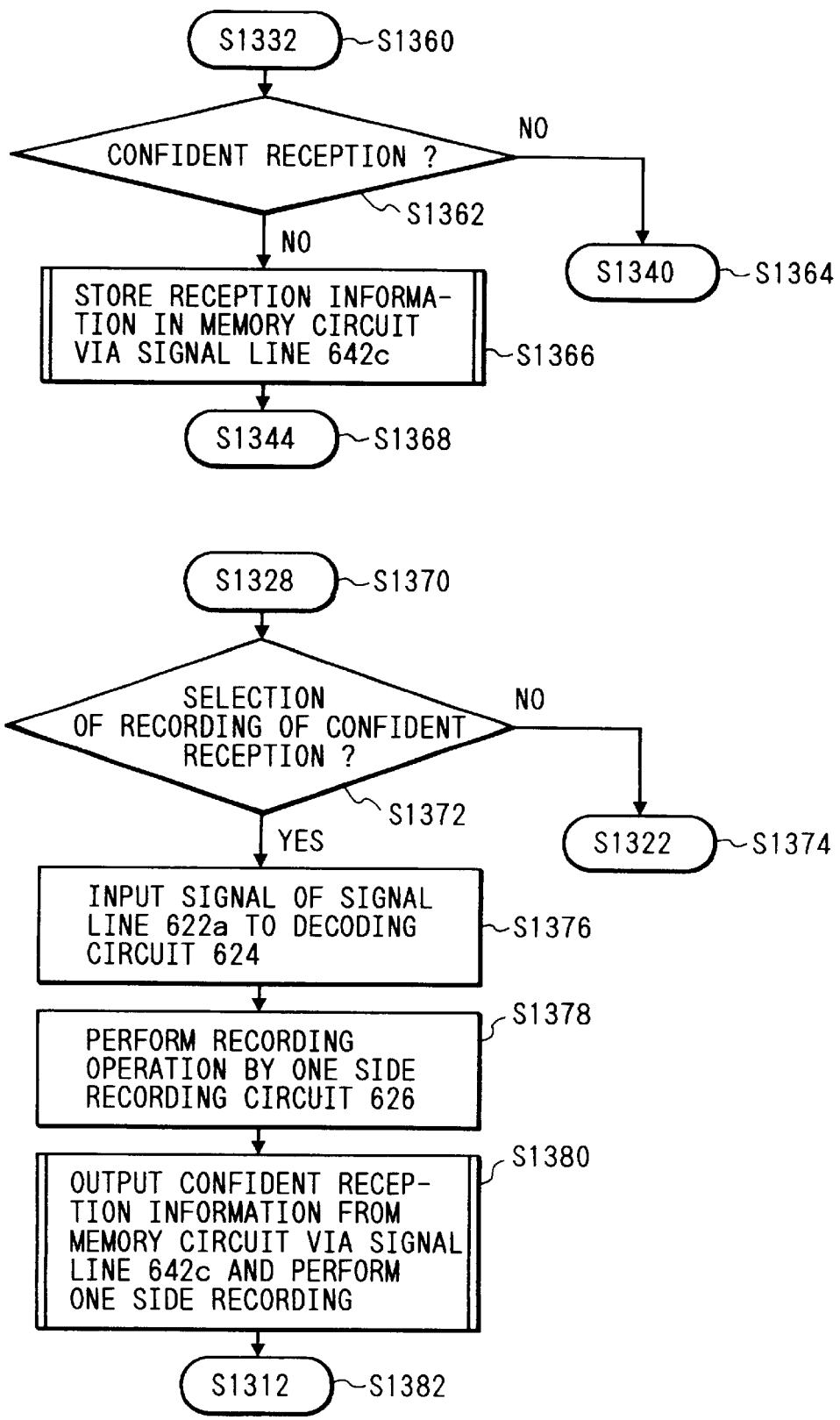
FIG. 56 is a flow chart illustrating operation of a second modification of the eighth embodiment.

The one side recording may be performed only upon recording of confident received information. FIG. 56 is a flow chart illustrating a difference from FIGS. 54A and 54B in the operation in such a case.

Step S1360 corresponds to the above mentioned step S1332. At step S1362, it is determined whether reception is confident reception. If it is not the confident reception, step S1364 (the above mentioned step S1340) is carried out. On the other hand, if it is the confident reception, the received information is stored in the memory circuit 622 through the signal line 642c at step S1366. Then, step S1368 (the above mentioned step S1344) follows.

Step S1370 corresponds to the above mentioned step S1328. At step S1372, it is determined whether recording of confident reception is selected. If recording of the confident reception is not selected, tep S1374 (the above mentioned step S1322) is carried out.

If recording of the confident reception is selected, step S1376 is carried out to supply to the signal line 642d a signal in the signal level of "1" and make the decoding circuit 624 be ready for receiving the signal on the signal line 622a. At step S1378, a signal in the signal level "1" is supplied to the signal line 642e to make the one side recording circuit 626 perform the recording operation. Subsequently, at step S1380, the confident reception information is read out of the memory circuit 622 through the signal line 642c to perform the one side recording. Then, the control returns to the above mentioned step S1312 at step S1382.

Figure 57:
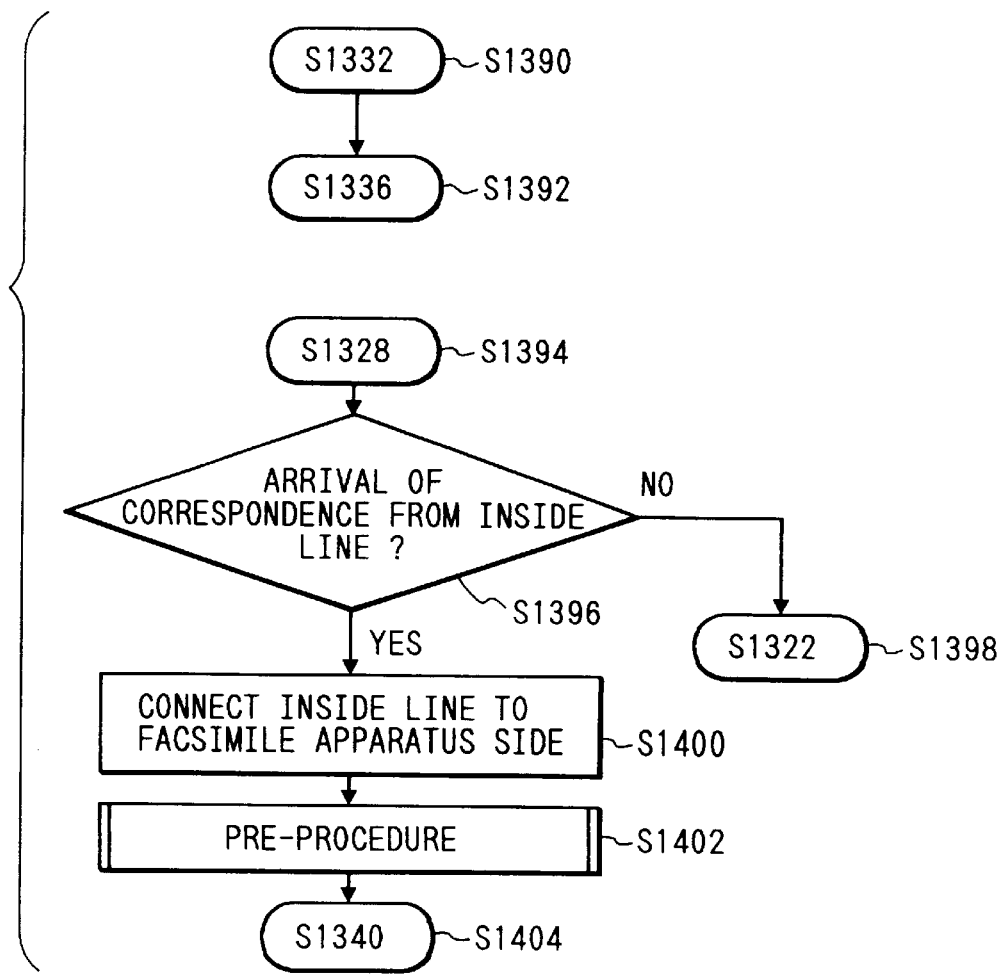
FIG. 57 is a flow chart illustrating operation of a third modification of the eighth embodiment.

In addition, it may be determined whether the incoming call is from a company telephone or from a line wire outside the company. Forced one side recording may be performed only when the information is received from outside the company. FIG. 57 is a flow chart illustrating a difference from FIGS. 54A and 54B in the operation in such a case.

Step S1390 corresponds to the above mentioned step S1332, which is followed by step S1392. The one side recording is performed at and after the above mentioned step S1336.

Step S1394 corresponds to the above mentioned step S1328. At step S1398, the signal on the signal line 602f is received to determine whether there is an incoming call from the extension 602b. If there is no incoming call from the extension, step S1398 (the above mentioned step S1322) is carried out. If there is an incoming call from the extension, step S1400 follows. A signal "3" is supplied to the signal line 642a to connect the extension 602b to the facsimile apparatus. At step S1402, pre-procedures are carried out. At step S1404, processing after the above mentioned step S1340 is carried out.

While various conditions for performing the one side recording forcedly have thus been described, two or more conditions may be combined to carry out, for example, an OR condition. Alternatively, processing under an AND condition may be available. Further, a part of processing may be performed under the OR condition and other part may be performed under the AND condition.

In addition, in the above mentioned embodiments, the both sides recording circuit 628 may be provided with white recording papers while the one side recording circuit 626 may be provided with color recording papers. By means of this a user can obtain important information printed on one side of a colored paper, allowing discrimination of important documents from others.

In addition, according to the present invention, there is provided an apparatus in which the above mentioned embodiments may be conbined.

In addition, the above mentioned embodiments are applicable to a copying apparatus and the like.

It should be understood that the present invention is not limited to the particular embodiments shown and described above, and various changes and modifications may be made without departing from the spirit and scope of the appended claims.

What is claimed is:

1. An original reading apparatus comprising:

reading means for reading a side of an original sheet set therein to provide a corresponding image;

control means for controlling said reading means to read, in a first order, a plurality of sheets, having first and second sides, set in a page order in said reading means, where all of the first sides are set facing a first direction and all of the second sides are set facing a second, opposite direction, said first order being all of the first sides in the page order followed by all the second sides in the page order;

storing means for storing the images provided by said reading means corresponding to each of the sides read in the first order; and output means for outputting the images stored in said storing means in a second order, said second order being, for each sheet in the page order, the image corresponding to the first side followed by the image corresponding to the second side.

2. An apparatus according to claim 1, further comprising input means for inputting an instruction to read double sided sheets, wherein said control means performs its control function only when the instruction is input.

3. An apparatus according to claim 1, further comprising display means for displaying prompts to a user to set the plurality of sheets in a first orientation to enable said reading means to read the first sides of the sheets and to set the plurality of sheets in a second orientation to enable said reading means to read the second sides of the sheets after the first sides are read.

4. An apparatus according to claim 1, wherein said page order is from a first page to a last page in sequential order, and wherein said first order is from the first side of the first page to the first side of the last page in sequential order, followed by the second side of the last page to the second side of the first page in reverse sequential order.

5. An apparatus according to claim 1, further comprising:

first counting means for counting the sheets while the first sides thereof are being read to produce a first number for each first side; and second counting means for counting the sheets while the second sides thereof are being read to produce a second number for each second side, wherein said storing means stores the image corresponding to each first or second side in accordance with the respective first or second number.

6. An apparatus according to claim 5, further comprising:

comparison means for comparing the first numbers with the second numbers to detect whether there is an inconsistency; and alarm means for providing an alarm to a user in response to an inconsistency detected by said comparison means.

7. An apparatus according to claim 5, wherein said output means alternately outputs the images corresponding to the first and second sides, with the images corresponding to the first sides being output in accordance with the first numbers in increasing order and the images corresponding to the second sides being output in accordance with the second numbers in decreasing order.

8. An apparatus according to claim 1, further comprising transmitting means for transmitting the images output by said output means.

9. An apparatus according to claim 8, wherein said transmitting means is facsimile transmitting means.

10. An apparatus according to claim 1, further comprising recording means for recording the images output by said output means to provide a copied set of the plurality of sheets.

11. An original reading method comprising the steps of:

reading a side of an original sheet set in a reading means to provide a corresponding image;

controlling said reading step to read, in a first order, a plurality of sheets, having first and second sides, set in a page order in the reading means, where all of the first sides are set facing a first direction and all of the second sides are set facing a second, opposite direction, said first order being all of the first sides in the page order followed by all the second sides in the page order;

storing the images provided by said reading step corresponding to each of the sides read in the first order in a memory; and outputting the images stored in the memory in a second order, said second order being, for each sheet in the page order, the image corresponding to the first side followed by the image corresponding to the second side.

12. A method according to claim 11, further comprising an input step of inputting an instruction to read double sided sheets, wherein said control step performs its control function only when the instruction is input.

13. A method according to claim 11, further comprising a display means of displaying prompts to a user to set the plurality of sheets in a first orientation to enable said reading step to read the first sides of the sheets and to set the plurality of sheets in a second orientation to enable said reading step to read the second sides of the sheets after the first sides are read.

14. A method according to claim 11, wherein said page order is from a first page to a last page in sequential order, and wherein said first order is from the first side of the first page to the first side of the last page in sequential order, followed by the second side of the last page to the second side of the first page in reverse sequential order.

15. A method according to claim 11, further comprising:

a first counting step of counting the sheets while the first sides thereof are being read to produce a first number for each first side; and a second counting step of counting the sheets while the second sides thereof are being read to produce a second number for each second side, wherein the memory stores the image corresponding to each first or second side in accordance with the respective first or second number.

16. A method according to claim 15, further comprising:

a comparison step of comparing the first numbers with the second numbers to detect whether there is an inconsistency; and an alarm step of providing an alarm to a user in response to an inconsistency detected by said comparison step.

17. A method according to claim 15, wherein said output step alternately outputs the images corresponding to the first and second sides, with the images corresponding to the first sides being output in accordance with the first numbers in increasing order and the images corresponding to the second sides being output in accordance with the second numbers in decreasing order.

18. A method according to claim 11, further comprising a transmitting step of transmitting the images output by said output step.

19. A method according to claim 18, wherein said transmitting step is facsimile transmitting step.

20. A method according to claim 11, further comprising a recording step of recording the images output by said output step to provide a copied set of the plurality of sheets.

* * * * *

UNITED STATES PATENT AND TRADEMARK OFFICE
CERTIFICATE OF CORRECTION

PATENT NO. : 5,815,289
DATED : September 29, 1998
INVENTOR(S) : TAKEHIRO YOSHIDA, ET AL.

Page 1 of 5

It is certified that error appears in the above-identified patent and that said Letters Patent is hereby corrected as shown below:

COLUMN 1

Line 13, "of" (second occurrence) should read --of the--.
    Line 34, "results" should read --result--.

COLUMN 6

Line 54, "while" should read --while it--.

COLUMN 8

Line 3, "not" should read --not been--.
    Line 14, "representation" should read --representations--.

COLUMN 9

Line 62, "has" should read --has been--.

COLUMN 14

Line 14, "generates" should read --generate--.

UNITED STATES PATENT AND TRADEMARK OFFICE
CERTIFICATE OF CORRECTION

PATENT NO. : 5,815,289
DATED     : September 29, 1998
INVENTOR(S): TAKEHIRO YOSHIDA, ET AL.

Page 2 of 5

It is certified that error appears in the above-identified patent and that said Letters Patent is hereby corrected as shown below:

COLUMN 19

Line 56, "is" should read --are--.

COLUMN 21

Line 20, "that" should be deleted.
    Line 32, "rearrange" should read --rearranges--.
    Line 33, "number" should read --numbers--.

COLUMN 24

Line 60, "added" should read --added to--.

COLUMN 27

Line 7, "not" should read --not been--.

COLUMN 29

Line 3, "coincides" should read --coincide--.
    Line 59, "to" (first occurrence) should read --and--.

UNITED STATES PATENT AND TRADEMARK OFFICE
CERTIFICATE OF CORRECTION

PATENT NO. : 5,815,289

DATED : September 29, 1998

INVENTOR(S) : TAKEHIRO YOSHIDA, ET AL.

It is certified that error appears in the above-identified patent and that said Letters Patent is hereby corrected as shown below:

COLUMN 30

Line 16, "few" should read --little--; and "space" should read --space is.

COLUMN 32

Line 38, "indicate" should read --indicating--.

COLUMN 33

Line 17, "side" should read --sides--.

COLUMN 35

Line 3, "in" should read --is--.
    Line 49, "in" should read --is--.

COLUMN 37

Line 66, "description." should read --descriptions.--.

UNITED STATES PATENT AND TRADEMARK OFFICE
CERTIFICATE OF CORRECTION

PATENT NO. : 5,815,289
DATED : September 29, 1998
INVENTOR(S) : TAKEHIRO YOSHIDA, ET AL.

It is certified that error appears in the above-identified patent and that said Letters Patent is hereby corrected as shown below:

COLUMN 40

Line 37, "while" should read --while it--.

COLUMN 41

Line 36, "not" should read --not been--.

COLUMN 49

Line 29, "generally," should read --general,--.
Line 32, "is" should read --are--.
Line 35, "results" should read --result--.

COLUMN 51

Line 11, "records" should read --record--.
Line 18, "records" should read --record--.

COLUMN 53

Line 30, "tep" should read --step--.

UNITED STATES PATENT AND TRADEMARK OFFICE
CERTIFICATE OF CORRECTION

PATENT NO. : 5,815,289
DATED : September 29, 1998
INVENTOR(S) : TAKEHIRO YOSHIDA, ET AL.

It is certified that error appears in the above-identified patent and that said Letters Patent is hereby corrected as shown below:

<u>COLUMN 54</u>

Line 3, "other" should read --another--.
　　　Line 14, "conbined." should read --combined.--.

Signed and Sealed this

Fourteenth Day of September, 1999

Attest:

Q. TODD DICKINSON

*Attesting Officer*　　　*Acting Commissioner of Patents and Trademarks*